(12) United States Patent
Bailey et al.

(10) Patent No.: US 7,744,102 B2
(45) Date of Patent: Jun. 29, 2010

(54) STEERABLE CARRIAGE APPARATUS

(76) Inventors: Eric Shawn Bailey, 2207 Limekiln Rd., Gravette, AR (US) 72736; Edward John Grimberg, Jr., 4545 Holman St., Golden, CO (US) 80403; Matthew C. Emenheiser, 740 Entrada Dr., Golden, CO (US) 80401; Michael C. Messaros, 4854 Franklin Dr., Boulder, CO (US) 80301

( * ) Notice: Subject to any disclaimer, the term of this patent is extended or adjusted under 35 U.S.C. 154(b) by 0 days.

(21) Appl. No.: 11/859,788

(22) Filed: Aug. 31, 2008

(65) Prior Publication Data

US 2008/0309039 A1 Dec. 18, 2008

Related U.S. Application Data

(63) Continuation-in-part of application No. 11/160,797, filed on Jul. 9, 2005, now abandoned.

(51) Int. Cl.
*B62B 7/04* (2006.01)

(52) U.S. Cl. .................... 280/47.38; 280/442

(58) Field of Classification Search ............. 280/5.521, 280/5.522, 5.52, 263, 267, 269, 288, 87.1, 280/87.21, 47.34, 47.35, 47.38, 47.41, 124.11, 280/400, 414.5, 442, 481, 483, 488
See application file for complete search history.

(56) References Cited

U.S. PATENT DOCUMENTS

| | | | | |
|---|---|---|---|---|
| 5,660,435 A * | 8/1997 | Eichhorn | ............... | 297/219.12 |
| 5,713,585 A * | 2/1998 | Curtis et al. | ............. | 280/47.38 |
| 7,083,175 B1 * | 8/2006 | Liu | ......................... | 280/47.38 |
| 7,213,818 B2 * | 5/2007 | Chang | ..................... | 280/47.38 |
| 2005/0140105 A1 * | 6/2005 | Hernandez | ................... | 280/62 |
| 2006/0181040 A1 * | 8/2006 | Dunney et al. | ............ | 280/47.38 |
| 2006/0267303 A1 * | 11/2006 | Golias | ...................... | 280/47.34 |
| 2007/0241525 A1 * | 10/2007 | Van Dijk | ................ | 280/47.38 |

* cited by examiner

*Primary Examiner*—Hau V Phan
*Assistant Examiner*—John D Walters
(74) *Attorney, Agent, or Firm*—Roger A. Jackson

(57) ABSTRACT

A steerable carriage apparatus for manually transporting a payload across a surface, that includes frame multiple end portions that include rotating elements rotationally attached to each of the frame multiple end portions, with the rotating elements forming contacts on the surface. Additionally, the frame multiple end portions have a pivotal attachment to one another being operational to steer the carriage, with the pivotal attachment having a pivotal axis forming an angle to the surface, the pivotal attachment having the option of selectively controlling the urging, dampening, or locking of the pivotal movement.

50 Claims, 38 Drawing Sheets

STEERABLE CARRIAGE APPARATUS

RELATED APPLICATION

This is a continuation in part application of U.S. patent application Ser. No. 11/160,797 filed Jul. 9, 2005 now abandoned by Eric Shawn Bailey, Edward John Grimberg, Jr., and Michael C. Messaros.

TECHNICAL FIELD

The present invention generally relates to carriages that include baby strollers; both walking and jogging, wheel chairs, hand carts, and the like that are operated manually by an individual or individuals moved across a surface, being steerable by an individual or individuals while the carriage is either stopped at rest or moving across the surface. More particularly, the present invention relates to steerable carriages that are manually moved along a surface at varying speeds from a slow walk to a fast run, primarily wherein the steering mechanism, if present on the carriage is designed to substantially accommodate the changing dynamics of steering the carriage at varying speeds across the surface.

BACKGROUND OF INVENTION

As human society ever evolves into a more health conscious state and with the desire to become more efficient or to optimize the use of an individual's time, multitasking has become the metaphor for efficiency, wherein an individual performs a number of tasks simultaneously or in parallel to accomplish more tasks in a given amount of time as opposed to performing a number of tasks in a series manner that requires considerably more time. However, multitasking is not without its problems, as performing tasks simultaneously can require more versatility on the part of the individual and/or the related device or apparatus being used. As an example with a cell phone, the multitasking involves driving and making/receiving phone calls and phone conversation. The versatility required on the part of the individual is to safely split their attention between driving and making/receiving phone calls and phone conversation, in addition the cell phone must have more versatility than a home phone in being self contained and small in size neither of which are required in a home phone. Thus, along with the need or desire of an individual to manually move a carriage across a surface which can be for the purpose of moving the carriage from one location to another, or including a payload disposed on or in the carriage, such as items to carry in the using of a hand cart, a person(s) to carry in the using of a wheel chair, or a baby(s) or child to carry in the using of a stroller, while at the same time performing another task such as jogging or running for either physical fitness or to simply move the carriage from one location to another location in a more timely fashion resulting in the carriage being manually moved along a surface at a velocity varying from a slow walk to a fast run.

This results in examining the versatility required in the carriage, focusing specifically on the changing dynamics of turning/steering the carriage at varying velocities (speeds) across the surface in going from a slow walk to a fast run. As an introduction, one of the most significant problems is related to the current turning/steering ability in prior art jogging strollers is that it is highly burdensome to the individual using the jogging stroller by the constant lifting, adjusting, and/or lateral skidding of the fixed position front wheel (as prior art jogging strollers are without a steering mechanism, having typically three fixed wheels that rotate only and do not steer) for directional changes on jogging paths and the like, in fact when the current prior art jogging strollers are used on a concrete or asphalt surface, the skidding of the front wheel (to turn the prior art jogging stroller) is so difficult that many user's resort to pushing down on the jogging stroller handle thus suspending the single front wheel above the surface (to facilitate easy turning) with the jogging stroller only riding on its two rear wheels, resulting in awkward jogging stroller pushing across the surface by the user. Thus, the major issues are being in controlling the jogging stroller steering and smooth (vibration free) operation of the jogging stroller, when the jogging stroller is manually moved across the surface at varying speeds from a slow walk to a fast run.

The reason that the prior art jogging strollers shun the use of a conventional castor to steer or turn with (as in common on walking strollers) is that when the conventional castor is pushed across a surface (or a rough surface such as gravel) at higher than walking speed the conventional castor oscillates laterally (termed resonance) making the use of conventional castors on a jogging stroller untenable as the laterally oscillating castor wheel adds significant vibration to the stroller frame and results in turning the stroller being very difficult in being too quick or responsive. Perhaps, the most common analogy to draw upon is in the use of a conventional grocery shopping cart that is normally moved across a surface at a slow to moderate walking pace. Wherein, the grocery cart is steerable through a pair of front castors that have a fixed castor or fixed trail length, with the trail length being defined as the length or distance between the wheel contact point on the surface to the wheel vertical pivot axis, thus being where the vertical pivot axis theoretically intersects the surface, with the wheel vertical pivot axis adjacent to the grocery cart frame. With fixed trail length being defined as that the trail length does not change with the castor wheel pivoting through the vertical pivot axis and with the castor assembly being without any bias, urging, or dampening related to the wheel vertical pivot steering movement in positioning or controlling steering movement of the wheel. Also, a pair of grocery cart rear wheels that are affixed to the grocery cart frame in the sense that they are not steerable with the wheels only being rotatable about a fixed rotational axis. As most people are familiar, when moving the grocery cart along the surface at a slow to moderate walking pace the castor wheels steer adequately as the trail creates a rotational moment (being defined as an engineering moment in units of inch-pounds) to turn the wheel in the same direction as the individual turns the grocery cart and when the individual returns the grocery cart along the surface in a forward fashion (not turning) the wheel returns to being in a parallel position to the fixed wheels from the trail rotational moment (resulting in wheel pivoting movement along the vertical pivot axis) of the castor as the individual turns the grocery cart in an opposite direction. Both during the turning and non turning states of operation the grocery cart castor wheels operate substantially smoothly being without resonance, with resonance being defined as uncontrolled two way lateral movement or vibration parallel to the surface related to movement of the castor wheel about the vertical pivot axis.

However, as is well known to a number of grocery cart using individuals, when the grocery cart is manually moved across the surface at a higher velocity, i.e. when the individual is running, the front castor wheels go into resonance (sometimes called wheel shimmy or steering wobble) resulting in uncontrolled movement related to movement of the castor wheel about the vertical pivot axis with the wheel swinging side to side laterally, being parallel to the surface making the grocery cart difficult to move across the surface as the front castor wheel is virtually skidding sideways in its contact with the surface in an oscillating manner as opposed to the wheel properly rolling across the surface with minimal forward movement frictional resistance, i.e. making the grocery cart easy to push. The cause of this resonance of the castor wheel on the grocery cart when being moved across the surface at a velocity higher than a normal walking pace is that the pivotal (steering) instantaneous moment of the castor increases as a function of the velocity approximately squared, in addition the resonance can be excited by an undulation in the surface (surface unevenness, bumps, ruts, cracks, and the like) that the wheel comes in to rolling contact with. Thus, in taking the grocery cart from a velocity of about two (2) miles per hour (moderate walking pace) to about six (6) miles per hour (moderate jogging pace) the rotational moment of the castor increases about nine (9) times. Also, the frequency of the castor wheel resonance proportionally increases with the velocity of the grocery cart being in conjunction with the increase of the rotational moment. With the significant increase in the rotational moment of the castor there is a tendency for the wheel to overshoot in vertical pivot movement further causing a reactionary vertical pivot movement of the wheel from the rotational moment in the opposite direction. Further, in continuing the wheel overshoots in vertical pivot movement in the opposite direction causing a reactionary rotational moment and further continuing, thus resulting in lateral or horizontal resonance or uncontrolled movement of the castor wheel being highly undesirable as interfering with the smooth operation and steering ability of the grocery cart. However, this problem of castor resonance is not limited to grocery carts, as wheel chairs, hand carts, baby strollers, and the like typically are structurally very similar to grocery carts related to the castor wheels and affixed wheels as previously described. Note that this problem of castor resonance is not universal as long as the carriage is manually moved along the surface at a typical moderate walking velocity or slower as the castor resonance is rarely present due to the reduced rotational moment of the castor not causing the overshooting of the vertical pivot movement of the wheel that results in a reactionary and opposite rotational moment that ultimately leads to resonance of the castor wheel as previously described. However, if there is potential that the carriage will be manually moved across the surface at a velocity greater than the moderate walking pace then the aforementioned problem of castor resonance will most likely appear as in the case of jogging strollers and racing wheel chairs, being typical of manually operated carriages that are moved along a surface at a velocity higher than a moderate walking pace.

The problem of castor wheel resonance in carriages is recognized in the prior art for strollers particularly due to the advent of the "jogging stroller" and racing wheel chair wherein suddenly manually moving a carriage across a surface at a velocity substantially faster than moderate walking speed became an issue with the accompanying castor wheel resonance problems as previously described, that were not a problem with a traditional stroller or wheel chair that was typically manually moved along a surface at a moderate walking velocity. An example of a traditional "walking" stroller that is designed for moving along a surface at a moderate walking velocity utilizing castor wheels similar to the aforementioned grocery cart is found in U.S. Pat. No. 5,215,320 to Chen that discloses a walking stroller with the novel portion being the pivoting handlebar that automatically converts the front wheels into castor type wheel sets when pushing the stroller either forward or backward. Further, a typical example of a "walking" wheel chair is in U.S. Pat. No. 2,669,289 to Usher et al. that discloses a folding wheelchair that collapses width wise, with the novelty in the folding X type frame, having only standard type castor wheels. On the typical jogging stroller, due to the previously described castor resonance when the carriage is manually moved along a surface at a higher velocity being around running or jogging speed, the prior art jogging stroller overcomes the resonance issue simply by eliminating the castor and making the front wheel(s) affixed to the stroller frame with no castor or turning capabilities much the same as the rear wheels. Of course jogging strollers have other features such as longer extending handles to provide clearance for the jogger's feet and legs longer stride to minimize interference with the stroller frame and wheels and having larger diameter wheels that will rotate slower at higher velocities across the surface to reduce wheel imbalance vibration and give the stroller the capability roll upon more undulated or uneven surfaces at higher velocities with less chance of a sudden vertical force upon the stroller frame that could result in upsetting the stroller (causing the jogging stroller to potentially roll on its side) resulting from the wheel coming into contact with the uneven surface at a higher velocity from manually moving the stroller across the surface at jogging or running speed.

An example of a typical jogging stroller is given in U.S. Pat. No. 6,585,802 B2 to Sheehan, which discloses a jogging stroller as previously described being a conventional three fixed wheel design, wherein the novelty is in the ability to be a single seat or interchangeably a two seat design. Even though Sheehan is very representative of a typical jogging stroller, a number of design deficiencies become apparent in the jogging stroller arts, firstly, inherent rolling instability along an axis parallel to the direction of travel, as jogging strollers negotiate turns at higher velocity than walking strollers, roll over stability is important, however, ironically jogging strollers fare worse in this area than walking strollers by typically placing the child at a higher position above the surface increasing the composite roll over moment of the jogging stroller and child combined, due to larger diameter wheels and the stroller frame being higher above the surface (similar to a Sport Utility Vehicle [SUV] as compared to a passenger car), with the composite center of gravity of the child and the jogging stroller combined being vertically higher above the surface.

Secondly, addressing another typical jogging stroller design deficiency, as most jogging stroller designs have a single front wheel and two rear wheels as represented by Sheehan, further adds to roll over instability by reducing the effective "track" being the width of the wheel contacts upon the surface positioned transverse to the direction of travel of the stroller, depending upon the composite center of gravity for the child and the stroller combined as positioned between the front and rear wheel axles. As a way of partially overcoming the roll over instability as previously described, most jogging strollers place the composite center of gravity substantially adjacent to the rear wheel axle to allow the wider track of the rear wheels to have more influence on the effective track to regain some roll over stability. Also, as the typical jogging stroller has no wheel steering capability (castor or otherwise), as all the jogging stroller wheels are fixed to not allow steering having only wheel rotation, the only way the jogging stroller can be turned is by "skidding" or by lifting, or a combination thereof of the single fixed front wheel side to side or laterally transverse to the stroller direction of travel and in order to do this skidding easily the majority of weight should be removed from the front wheel with this being accomplished by two items. First, being the design center of gravity of the jogging stroller and child that is adjacent to the rear wheel axle and with the long jogging stroller handle giving the individual manually pushing the jogging stroller a longer moment arm to pivot the jogging stroller on the rear wheels thus making the contact of the front wheel to the surface very lightly loaded or even removing the front wheel contact with the surface temporarily. The method of currently steering present art jogging strollers is burdensome to the individual using the jogging stroller by the constant lifting, adjusting, and/or skidding the fixed position front wheel for directional changes on jogging paths and the like, especially in the case of a large child in the jogging stroller or with the use of twin (two) children jogging strollers.

Thirdly, addressing yet another typical jogging stroller design deficiency, again as most jogging stroller designs have a single front wheel and two rear wheels as represented by Sheehan, when maneuvering the jogging stroller up or down street curbs or steps, the single front wheel is placed either up or down as required by pivoting on the rear wheel axle the stroller frame being lifted or lowered via the extended length handle, wherein the single front wheel is placed on the curb or step (i.e. the new surface where the individual using the jogging stroller wants to go) and then using the handle the individual lifts the two rear wheels resulting in the entire jogging stroller weight resting upon the single front wheel. At this point a highly unstable situation exists, requiring the user to maintain a firm grip on the stroller handle, with all the weight and balance being on a single front wheel (similar to a unicycle) especially along the roll axis that is parallel to the jogging stroller direction of travel wherein the entire jogging stroller could roll sideways very easily being only resisted by the individual holding the handle until the two rear wheels are safely placed back on the new surface making the jogging stroller more stable about the roll axis.

Thus, the stroller arts have evolved into two distinct groupings based upon their use, being the walking strollers and the jogging strollers as represented by Chen and Sheehan respectively as previously described. Wherein, walking strollers cannot be easily used as jogging strollers having small diameter castored wheels that would result in undesirable castor resonance and vertical stroller frame shock loads from surface irregularities that are encountered at higher velocities along the surface, that increase the potential for a roll axis upset thus risking that the walking stroller could end up on its side if used on undulated surfaces at velocities higher that a moderate walking pace. The result of this is to have potential discomfort, injury, or death to the occupant of the stroller and to damage the stroller itself, in addition also potential injury or death to the user manually pushing the stroller. However, as most walking strollers have four wheels (two equally tracking front wheels and two equally tracking rear wheels), walking strollers are more stable along the roll axis during turns and are more stable when maneuvering the walking stroller up or down street curbs or steps, as the two front wheels are placed either up or down as required by pivoting on the rear wheels with the stroller frame being lifted or lowered via the handle, wherein the two front wheels are placed on the curb or step (i.e. the new surface where the individual using the walking stroller wants to go) and then using the handle the individual lifts the two rear wheels resulting in the entire jogging stroller weight resting upon the two front wheels, thus not having any compromise in roll axis stability than exists with all four wheels resting upon the surface. Conversely, if a jogging stroller is used as a walking stroller the lack of any steerable wheels is very inconvenient, requiring the individual using the jogging stroller to frequently lift or drag the single front wheel to move the front wheel sideways or transverse to the stroller direction of travel. Also, the jogging stroller has the previously described design deficiencies of turning or roll axis instability (however less critical at walking speed across the surface) and curb/step negotiating instability from the three wheel design. In addition, note that the three wheel All Terrain Vehicle (ATV) in no longer manufactured due to safety issues related to roll axis instability while turning resulting in rider injury or death, wherein the ATV design has been replaced using four wheels for enhanced roll axis stability.

There has been some recognition in the prior art as to the dichotomy in the stroller arts in looking at U.S. Pat. No. 6,779,804 B1 to Liu that discloses a jogging stroller that has a control block that can lock and unlock the front wheel from swivel (castor) movement. Liu recognizes the problem of steering a jogging stroller with a fixed front wheel, and claims to solve this problem by selectively allowing the front wheel to swivel for turning and then relocking the front wheel from swivel movement while going straight ahead with the stroller. Liu does not teach specifics related to rake, trail, pivot angles, on the front swivel wheel, as the Liu front swivel wheel is a design similar to the aforementioned grocery cart. Wherein, if the Liu front swivel wheel were unlocked (allowing swivel movement) when being used as a jogging stroller the front wheel would not only have resonance (defined as uncontrolled vacillating swivel movement of the wheel) but would also have excessively quick steering that would make control of the stroller difficult. It could be stated that Liu has a "hybrid" stroller that can lock the front swivel wheel for jogging mode and unlock the swivel wheel to turn in walking mode. However, as Liu has the conventional three wheel jogging stroller design the aforementioned turning instability and curb/step instability issues remain with Liu not improving upon the current separate functions of strollers that are designed for either walking or jogging. Some additional recognition of this dichotomy is shown in U.S. Pat. No. 6,449,801 B1 to Durrin that discloses add on front wheel castors for a jogging stroller, the add on castors are standard type castors, with the novel feature being only the attachment structure of the add on castors to the jogging stroller, which of course converts the jogging stroller to a walking stroller. Also, similarly in U.S. Pat. No. 6,443,467 B1 to Black disclosed is a functionally similar arrangement to Durrin, however, except that the jogging stroller is originally manufactured with interchangeable front wheels, with the walking stroller front wheels being of standard castor design and the jogging front wheel being of standard fixed design. Wherein, Black further recognizes the problem of castor front wheels on jogging strollers, reference Black's FIGS. 2 and 3.

What is needed is a stroller that substantially overcomes the aforementioned dichotomy in the stroller arts to allow a single stroller to function with substantial success as both a walking stroller and a jogging stroller without the need for structural hardware change outs between a jogging mode of use and a walking mode of use. This would include having several enhancements to overcome the identified deficiencies with the current jogging stroller arts related to having slower more controlled steering capabilities for a jogging stroller, enhanced roll axis stabilities, higher stability when negotiating curbs and steps with a jogging stroller, and retaining the current stroller arts capabilities of walking strollers that include steering, roll axis stability, and curb/step negotiating roll axis stability. In particular, enhancing the jogging stroller steering capability related to overcoming castor wheel resonance at higher velocities that accompany jogging velocities or speeds of the jogging stroller across the surface. Additionally, having enhanced roll axis stability while turning the stroller at speeds above walking, improved curb/step negotiating stability, and having the capability to have smooth and stable turning and non turning modes at speeds from walking to running.

SUMMARY OF INVENTION

Broadly, the present invention of a steerable carriage apparatus for manually transporting a payload across a surface, includes a frame having a frame first end portion and a frame second end portion, also included is a first rotating element rotationally attached to the frame first end portion and forming a first contact on the surface. Additionally, an arm having a pivotal attachment to the frame second end portion, the pivotal attachment having a pivotal axis that is at an obtuse angle in relation to the surface, the pivotal attachment is operational to allow pivotal movement of the arm in relation to the frame second end portion. A second rotating element is included that is rotationally attached to the arm and forming a second contact on the surface, wherein the obtuse angle is adjacent to the second contact, with the second rotating element being steerable.

These and other objects of the present invention will become more readily appreciated and understood from a consideration of the following detailed description of the exemplary embodiments of the present invention when taken together with the accompanying drawings, in which;

REFERENCE NUMBER IN DRAWINGS

Figure 1:
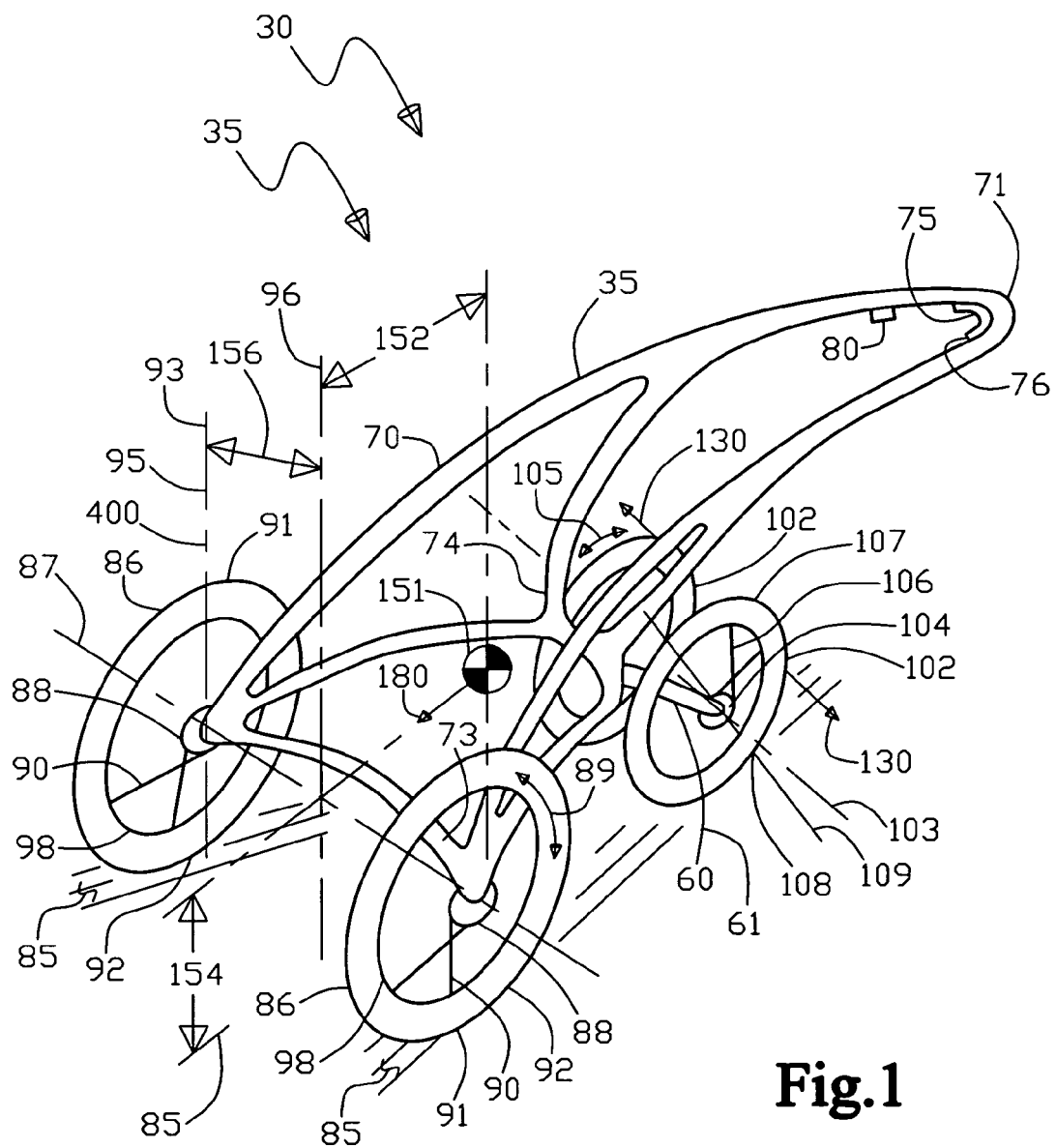
FIG. 1 is a perspective view of the steerable carriage apparatus.

30 Steerable carriage apparatus
31 Steerable apparatus with adjustable arm 62, including a single second rotating element 102
32 Steerable apparatus with fixed arm 61, including a single second rotating element 102
33 Steerable apparatus with two adjustable arms 62, including two second rotating elements 102
34 Steerable apparatus with two fixed arms 61, including two second rotating elements 102
35 Carriage
39 Means for urging the steerable assembly 31, 32, 33, or 34 to a turn angle 186 substantially equaling zero, wherein the second rotating element 102 is in the non turning mode
40 Fixed dampener
42 Variable dampener
43 Pivotal movement 130 restriction pin
44 Fixed movement aperture
45 Pivotal movement aperture
46 Pivotal movement restriction assembly
52 Means for manual selectable adjusting of an obtuse rake angle 119
53 Outer tube
54 Inner tube
55 Axial movement of inner tube 54 within outer tube 53
56 Rod
57 Apertures in outer tube
58 Apertures in inner tube
59 Rotational or angular movement of inner tube 54 in outer tube 53
60 Arm assembly
61 Arm assembly fixed
62 Arm assembly adjustable
63 First pivot of adjustable arm 62
64 Second pivot of adjustable arm 62
65 First fork of adjustable arm 62
66 Structure assembly
67 Structure first end portion
68 Structure second end portion
69 Second fork of adjustable arm 62
70 Frame assembly
71 Frame hand grip portion
72 Frame pivotal axis for adjusting a rake angle 118
73 Frame assembly first end portion
74 Frame assembly second end portion
75 Means for an automatic conditional substantial restriction of a first rotating element 86 rotational movement 89
76 Means for an automatic conditional substantial restriction of a second rotating element 102 rotational movement 105
80 Means for manual selectable substantial restriction of pivotal movement 130
84 Payload (not shown)
85 Surface
86 First rotating element or first wheel assembly
87 First rotating element 86 rotational axis
88 First wheel 86 hub
89 First rotating element 86 rotational movement
90 First wheel 86 spokes
91 First wheel 86 tire
92 First wheel 86 tire 91 contact or contact patch on the surface 85
93 Axis that is perpendicular to the surface 85 and that intersects the contact patch 92 on the surface 85 from the first rotating element 86
94 First wheel tire 91 rotational plane that is co planar with axis 93
95 Axis that perpendicularly intersects the first rotating element 86 rotational axis 87 and bisects a first rotating element 86 rotational plane 94 with the axis 95 being coplanar with the axis 93
96 Axis that is perpendicular to the surface 85 and that has a perpendicular intersection with the first rotating element 86 rotational axis 87
98 First wheel rim
99 Slidable engagement between the first fork 65 and the second fork 69
102 Second rotating element or second wheel assembly
103 Second rotating element 102 rotational axis
104 Second wheel 102 hub
105 Second rotating element 102 rotational movement
106 Second wheel 102 spokes
107 Second wheel 102 tire
108 Second wheel 102 tire 107 contact or contact patch on the surface 85
109 Axis that is perpendicular to the surface 85 and that intersects the contact patch 108 on the surface 85 from the second rotating element 102
110 Second wheel tire 107 rotational plane that is co planar with axis 109 only when the turn angle 186 substantially equals zero, wherein the second rotating element 102 is in the non turning mode
112 Axis that perpendicularly intersects the second rotating element 102 rotational axis 103 and bisects the second rotating element 102 rotational plane 110, with axis 112 being coplanar with axis 109
113 Second wheel rim
114 Steering pivotal axis at a rake angle 118
116 Axis that is substantially perpendicular to the surface 85 with axis 116 being coplanar with the axis 114
118 Acute rake angle, being defined as the rake angle 118 between the axis 114 and the axis 116
119 Obtuse rake angle associated with acute rake angle 118, defined as the obtuse rake angle 119 between the axis 114 and the surface 85
120 Effective trail distance, being defined as the effective trail distance 120 along the surface 85 between the contact patch 108 and the intersection of the steering pivotal axis 114 with the surface 85
121 Pivotal attachment
129 Axis extending from frame 70 hand grip 71 parallel to axes 93 and 109
130 Steering or pivotal movement
131 Initial moment arm of hand grip 71
132 Reactionary moment arm of hand grip 71
133 Net moment arm of hand grip 71
151 Composite center of gravity
152 Composite center of gravity X axis position
154 Composite center of gravity Y axis position 156 Composite center of gravity Z axis position
160 Steering inertia
162 Fixed steering dampening
164 Variable steering dampening
170 Roll movement
171 Movement substantially parallel to the surface 85
172 Movement substantially perpendicular to the surface 85
173 Force substantially parallel to the surface 85 in an axis substantially parallel to the carriage 30, a prior art castor 300, an adapted carriage 636, an adapted carriage 638, or a motorcycle 360 movement
174 Pitch movement
175 Force substantially parallel to the surface 85 in an axis substantially transverse to the carriage 30, the prior art castor 300, an adapted carriage 636, an adapted carriage 638, or the motorcycle 360 movement, only having an effect when turn angles 186, 336, and 386 do not equal zero
176 Yaw movement
180 Movement of the steerable carriage apparatus 30, 500, 504, 636, or 638 including the frame assembly 70, wherein the movement 180 is substantially along the surface 85 in a non turning mode, wherein the turn angle 186 or 640 substantially equals zero
182 Axis perpendicular to and intersecting the steering pivotal axis 114 and co planar to the movement 180 of the frame assembly 70 in the non turning mode, wherein the turn angle 186 substantially equals zero
184 Axis that is perpendicular to and intersecting the steering pivotal axis 114 denoting angular pivotal movement of the fork assembly 60 about the steering pivotal axis 114 to indicate the turn angle 186
186 Turn angle about the steering pivotal axis 114, defined as the turn angle 186 between the axis 182 and the axis 184
188 Distance of the frame assembly 70 from the surface 85
200 Resonance of the second rotating element 102, prior art castor wheel 304, or prior art motorcycle wheel 364
215 Hand of individual 250 or user 250
250 Individual or user of the steerable carriage apparatus 30 or the steerable apparatus 31, 32, 33, 34, 500, or 504
252 Lateral movement of the frame hand grip portion 71 by the user 250 hand 215
300 Prior art castor steerable wheel assembly
302 Prior art castor frame assembly
304 Prior art castor steerable rotating element or wheel
305 Prior art castor fork assembly
306 Prior art castor steerable rotating element 304 rotational axis
307 Prior art castor steerable wheel contact patch on the surface 85
308 Axis that is perpendicular to the surface 85 and that intersects the contact patch 307 on the surface 85 from the prior art castor rotating element 304
312 Prior art castor steerable rotating element 304 rotational plane
314 Axis that perpendicularly intersects the prior art castor steerable rotating element 304 rotational axis 306 and bisects the prior art castor steerable rotating element 304 rotational plane 312 with the axis 314 being coplanar with the axis 308
316 Prior art castor steering pivotal axis
318 Prior art castor steering movement
330 Movement of the prior art castor steerable wheel assembly 300 substantially along the surface 85 in a non turning mode, wherein a turn angle 336 equals zero
332 Axis substantially parallel to the surface 85 and substantially parallel to the movement 330 of the prior art castor steerable wheel assembly 300 in the non turning mode, wherein the turn angle 336 equals zero
334 Axis that is perpendicular to and intersecting the steering pivotal axis 316 denoting angular pivotal movement of the prior art castor steerable wheel assembly 300 fork assembly 305 about the steering pivotal axis 316 to indicate the turn angle 336
336 Turn angle about the steering pivotal axis 316, defined as the turn angle 336 between the axis 332 and the axis 334
338 Effective trail distance of the prior art castor steerable wheel assembly 300, being defined as the effective trail distance 338 along the surface 85 between the contact patch 307 and the intersection of the prior art castor steering pivotal axis 316 with the surface 85
340 Distance of the prior art castor frame assembly 302 from the surface 85
360 Prior art motorcycle steerable wheel assembly
362 Prior art motorcycle frame assembly
364 Prior art motorcycle steerable rotating element or wheel
365 Prior art motorcycle steerable fork assembly
366 Prior art motorcycle steerable rotating element 364 rotational axis
367 Prior art motorcycle steerable wheel contact patch on the surface 85
368 Axis that is perpendicular to the surface 85 and that intersects the contact patch 367 on the surface 85 from the prior art motorcycle steerable rotating element 364
372 Prior art motorcycle steerable rotating element 364 rotational plane
374 Axis that perpendicularly intersects the prior art motorcycle steerable rotating element 364 rotational axis 366 and bisects the prior art motorcycle steerable rotating element 364 rotational plane 372 with the axis 374 being coplanar with the axis 368
375 Axis perpendicular to the surface 85 and co planar with axis 376
376 Prior art motorcycle steering pivotal axis
377 Prior art motorcycle rake angle defined as angle 377 between axis 376 and axis 375
378 Prior art motorcycle steering movement
379 Acute angle associated with rake angle 377, with angle 379 between axis 376 and the surface 85
380 Movement of the prior art motorcycle steerable wheel assembly 360 substantially along the surface 85 in a non turning mode, wherein a turn angle 386 equals zero
382 Axis perpendicular to and intersecting the steering pivotal axis 376 and co planar to the movement 380 of the prior art motorcycle steerable wheel assembly 360 in the non turning mode, wherein the turn angle 386 equals zero
384 Axis that is perpendicular to and intersecting the steering pivotal axis 376 denoting angular pivotal movement of the prior art motorcycle steerable wheel assembly 360 fork assembly 365 about the steering pivotal axis 376 to indicate the turn angle 386
386 Turn angle about the steering pivotal axis 376, defined as the turn angle 386 between the axis 382 and the axis 384
388 Effective trail distance of the prior art motorcycle steerable wheel assembly 360, being defined as the effective trail distance 388 along the surface 85 between the contact patch 367 and the intersection of the prior art motorcycle steering pivotal axis 376 with the surface 85
390 Distance of the prior art motorcycle frame assembly 362 from the surface 85
400 Camber angle of the first rotating element 86, being defined as the angle 400 between the axis 93 and the axis 95

Figure 26:
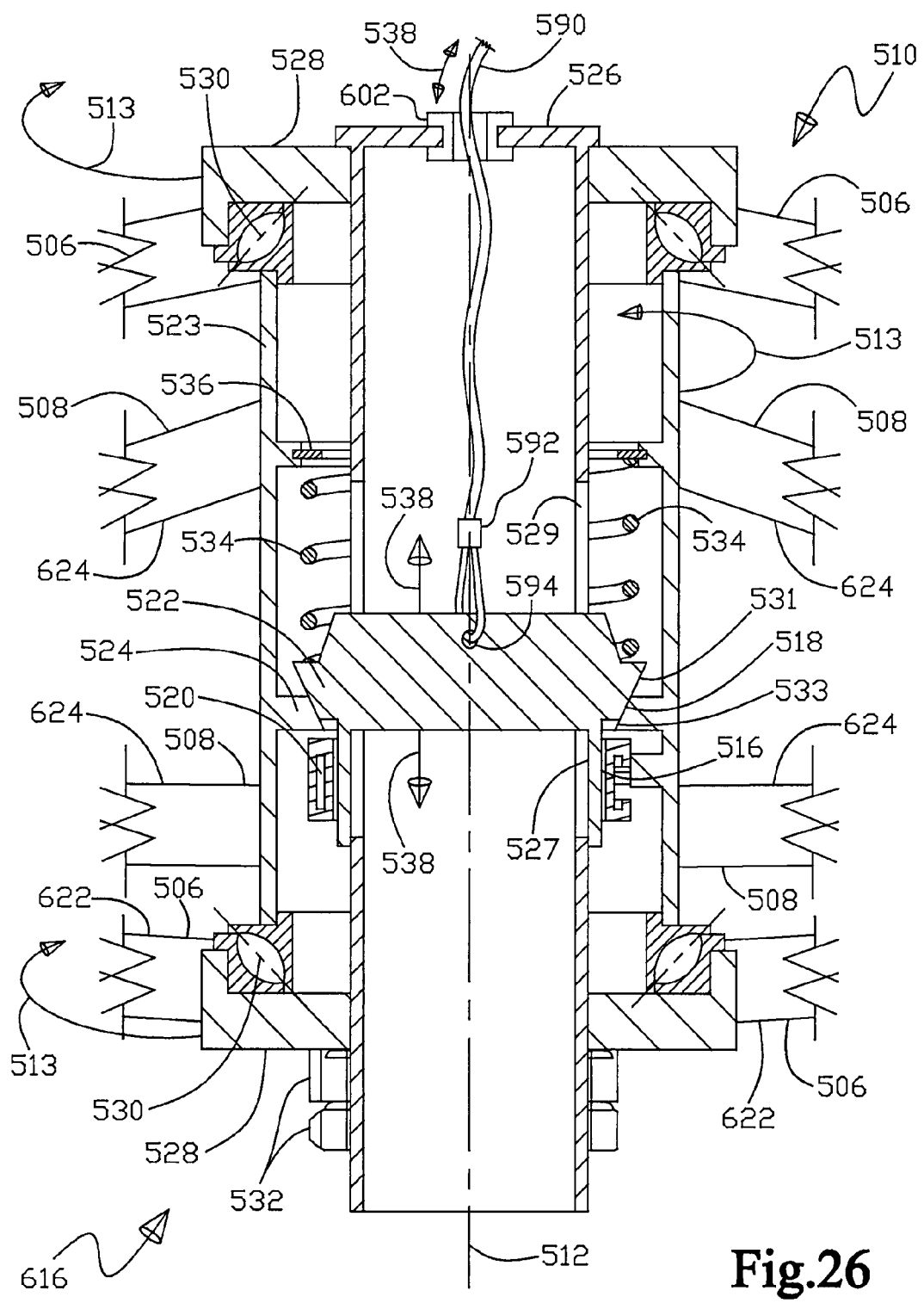
FIG. 26 shows yoke cross section 26 from FIGS. 22 and 25 including a shuttle ring positioned to place the yoke in a pivotal movement substantially locked state.

402 Camber angle of the second rotating element 102, being defined as the angle 402 between the axis 109 and the axis 112
404 Camber angle of the prior art castor rotating element 304, being defined as the angle 404 between the axis 308 and the axis 314
405 Camber angle of the prior art motorcycle rotating element 364, being defined as the angle 405 between the axis 368 and the axis 374
406 Camber angle overturning moment of the second rotating element 102
408 Camber angle overturning moment of the motorcycle rotating element 364
500 Articulated steerable carriage apparatus rear turning
502 Manually transporting a payload 84 across a surface 85
504 Articulated steerable carriage apparatus front turning
506 First frame portion
508 Second frame portion
510 Yoke assembly
512 Axial axis of yoke assembly 510
513 Pivotal movement of yoke 510
514 Rotational plane of second wheel tire 107
516 Means for urging the yoke pivotal movement 513 into a non-turning mode
518 Means for a pivotal movement 513 lock
520 Torsional spring pack
522 Shuttle ring
523 Outer tube
524 Portion of outer tube that selectively removably engages the shuttle ring 522
525 Web of shuttle ring 522
526 Inner tube
527 Extension of shuttle ring 522
528 Outer bracket
529 Aperture of inner tube 526
530 Neck bearing
531 Frustroconical outside diameter of shuttle ring 522
532 Retaining nut set for yoke assembly 510
533 Frustroconical inside diameter of outer tube 523
534 Spring
536 Slip joint retaining ring for spring 534
538 Movement of shuttle ring 522 along the axial axis 512
590 Cable for control of shuttle ring 522 position along the axial axis 512
592 Swivel for cable 590
594 Attachment for swivel 592 to shuttle ring 522
595 Handlebar
596 Means for auto brake control at handle 595 for articulated stroller assembly 500 and 504
597 Gable for auto brake control 596
598 Auto brake at wheel 102
600 Control for yoke 510
602 Bushing for cable 590
610 Payload frame portion
612 Pivotal connection of payload frame portion 610 to first frame portion 506
614 Shock absorber (spring/dampener) between payload frame portion 610 and first frame portion 506
616 Pivotally substantially locked state of yoke assembly 510 resulting in restricted pivotal movement 513 as between the first frame portion 506 and the second frame portion 508, also the head frame portion 624 and the fork 622, plus the wheel frame portion 626 and the support element 628
618 Biased state of the yoke assembly 510 resulting in pivotal movement 513 urging toward a non-turning mode as shown in FIGS. 20, 23, 36, and 37 as between the first frame portion 506 and the second frame portion 508, also the third frame portion 624 and the fork 622, plus the wheel frame portion 626 and the support element 628
620 Free state pivotal movement 513 of the yoke assembly 510
622 Fork for first rotating element 86, the fork 622 taking the place of the first frame portion 506 in FIG. 26
624 Head frame portion taking the place of the second frame portion 508 in FIG. 26
626 wheel frame portion taking the place of the second frame portion 508 in FIG. 26
628 Support element between outer bracket 528 and second rotating element 102
630 Linkage assembly between second rotating elements 102
631 Axis that is substantially perpendicular to the surface 85
632 Rake angle that is between axis 631 and axis 512
633 Axis that is substantially perpendicular to the surface 85 and intersecting the contact patch 92
634 Trail distance along the surface 85 between the contact patch 92 at axis 633 and the intersection of the axial axis 512 and the surface 85
636 Adapted carriage for first rotating element 86
638 Adapted carriage for second rotating element 102
639 Central axis of 624
640 Turn angle between first rotating element rotational axis 94 and central axis 639
641 Pivotal movement to adjust rake angle 632
642 Selectively lockable pivot for allowing pivotal movement 631 relative to head frame portion 624
644 Trail distance along the surface 85 between the contact patch 108 at axis 109 and the intersection of the axial axis 512 and the surface 85

DETAILED DESCRIPTION

Figure 2:
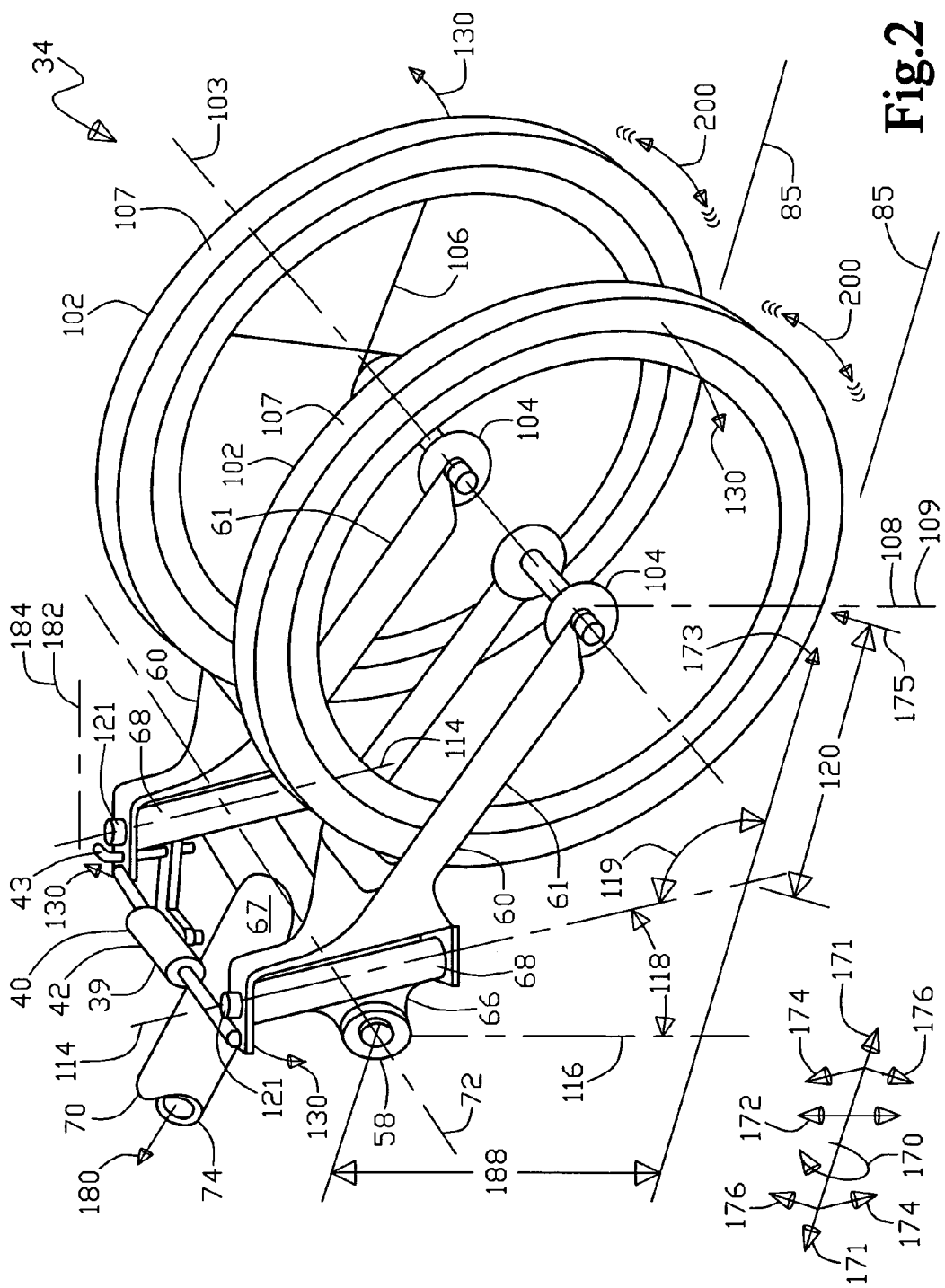
FIG. 2 is a perspective view of the steerable apparatus with fixed arms in the non turning mode.
Figure 3:
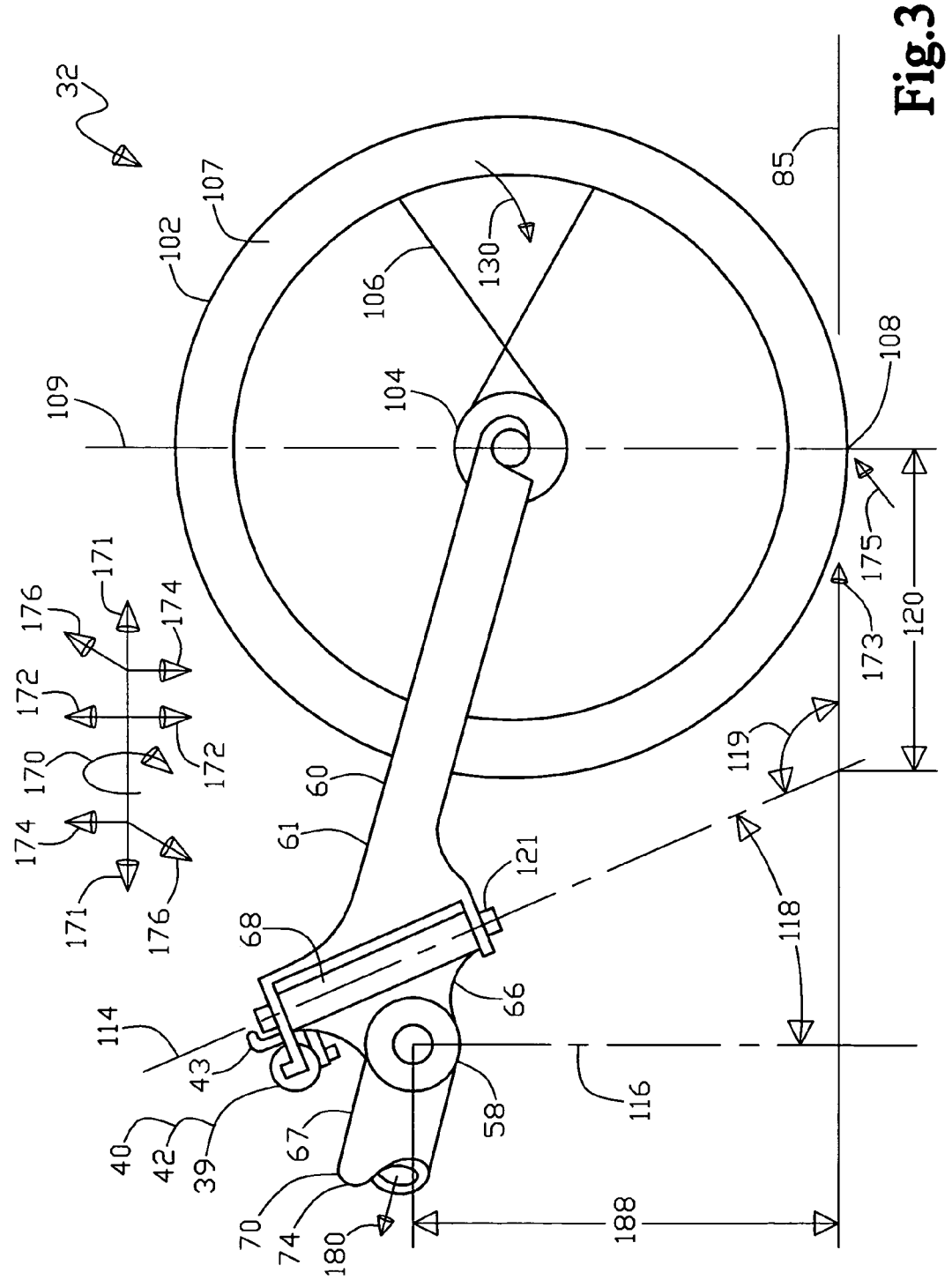
FIG. 3 is a side view of the steerable apparatus with a fixed arm in the non turning mode.

With initial reference to FIG. 1 shown is a perspective view of the steerable carriage apparatus 30, FIG. 2 shows a perspective view of the steerable apparatus 34 with fixed arms 61 in the non turning mode, being defined as the turn angle 186 substantially equaling zero, and FIG. 3 shows a side view of the steerable apparatus 32 with a fixed arm 61 in the non turning mode, being defined as previously described.

Figure 4:
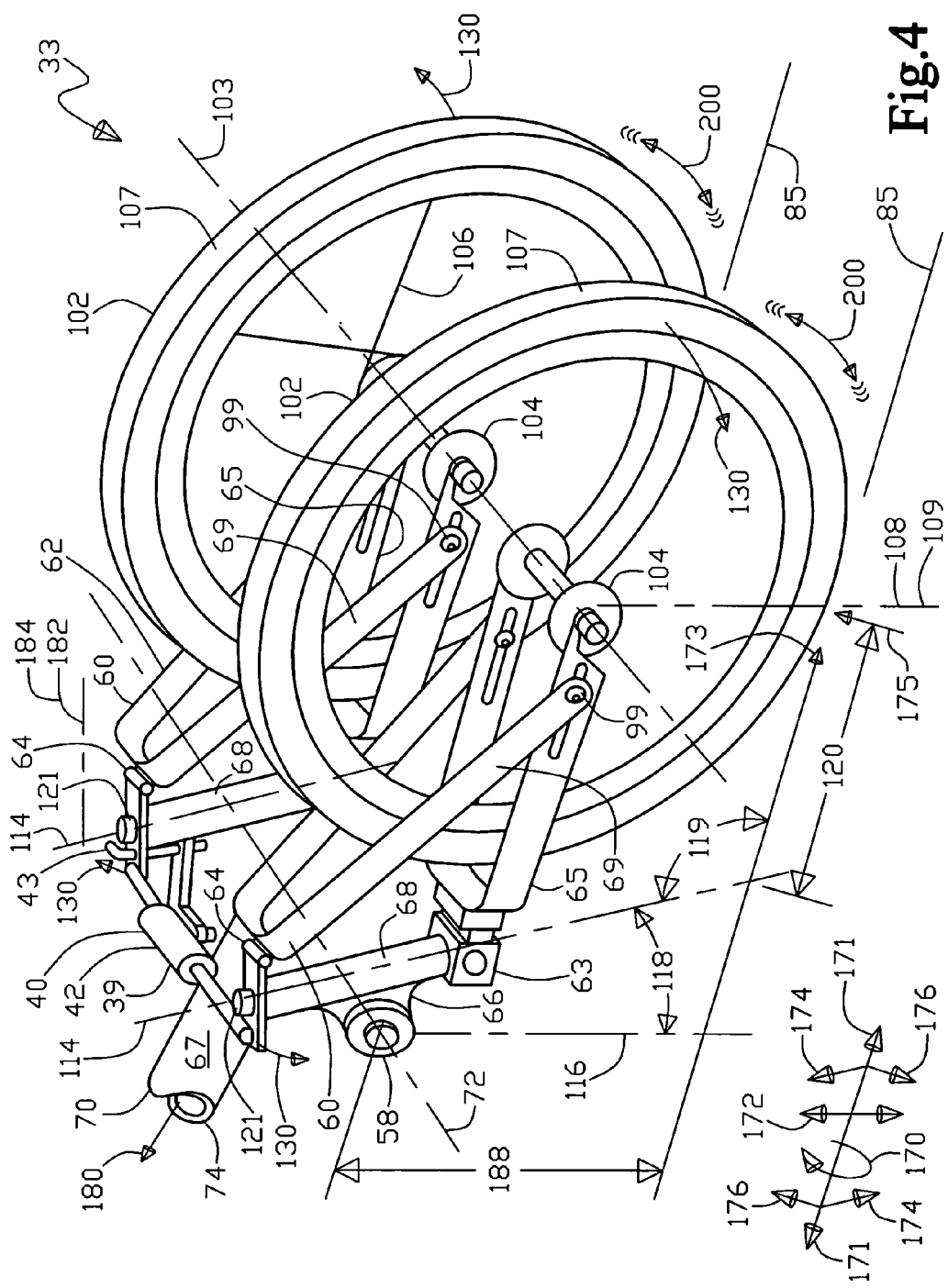
FIG. 4 is a perspective view of the steerable apparatus with two adjustable arms in the non turning mode.
Figure 5:
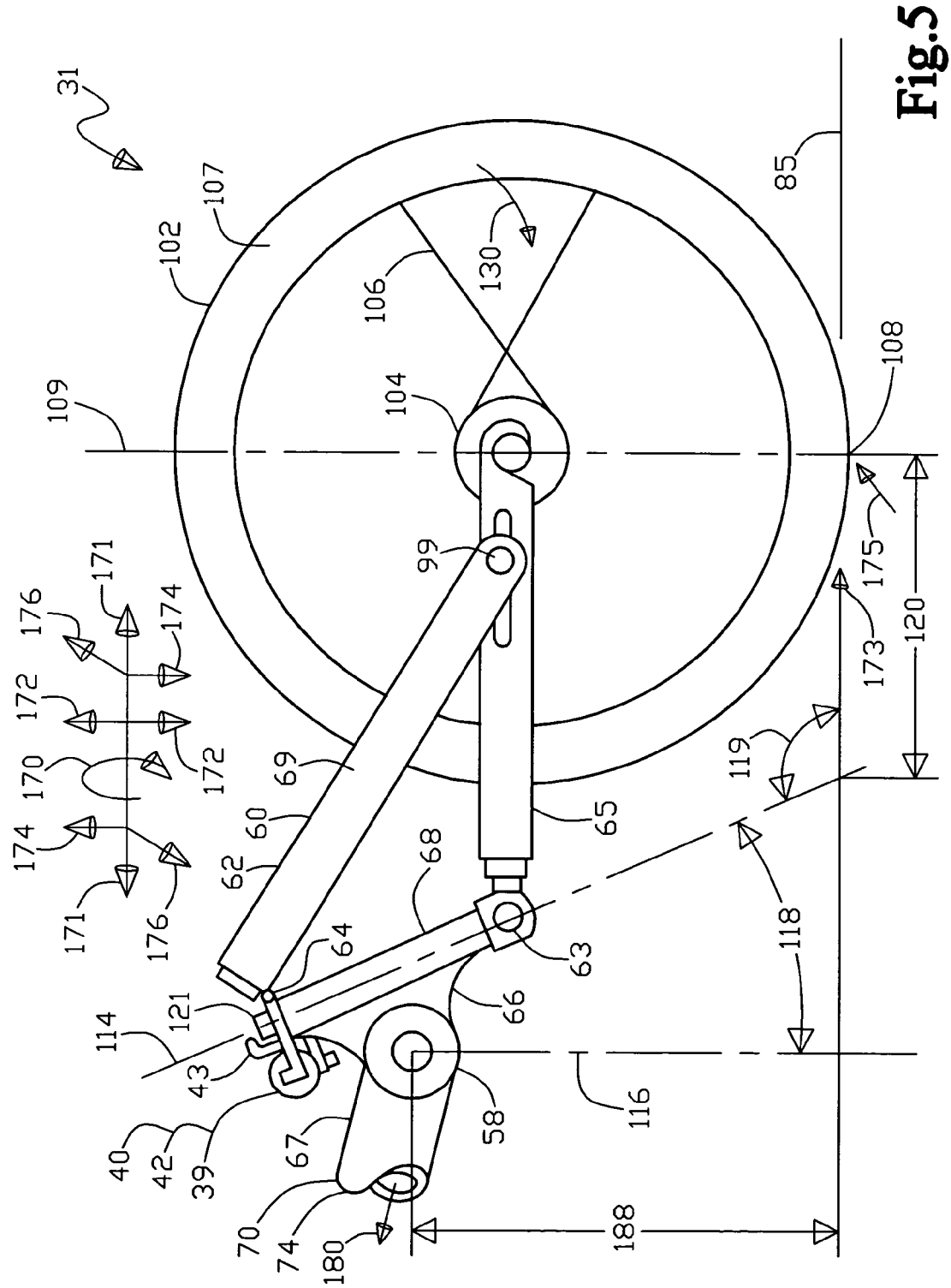
FIG. 5 is a side view of the steerable apparatus with an adjustable arm in the non turning mode.
Figure 6:
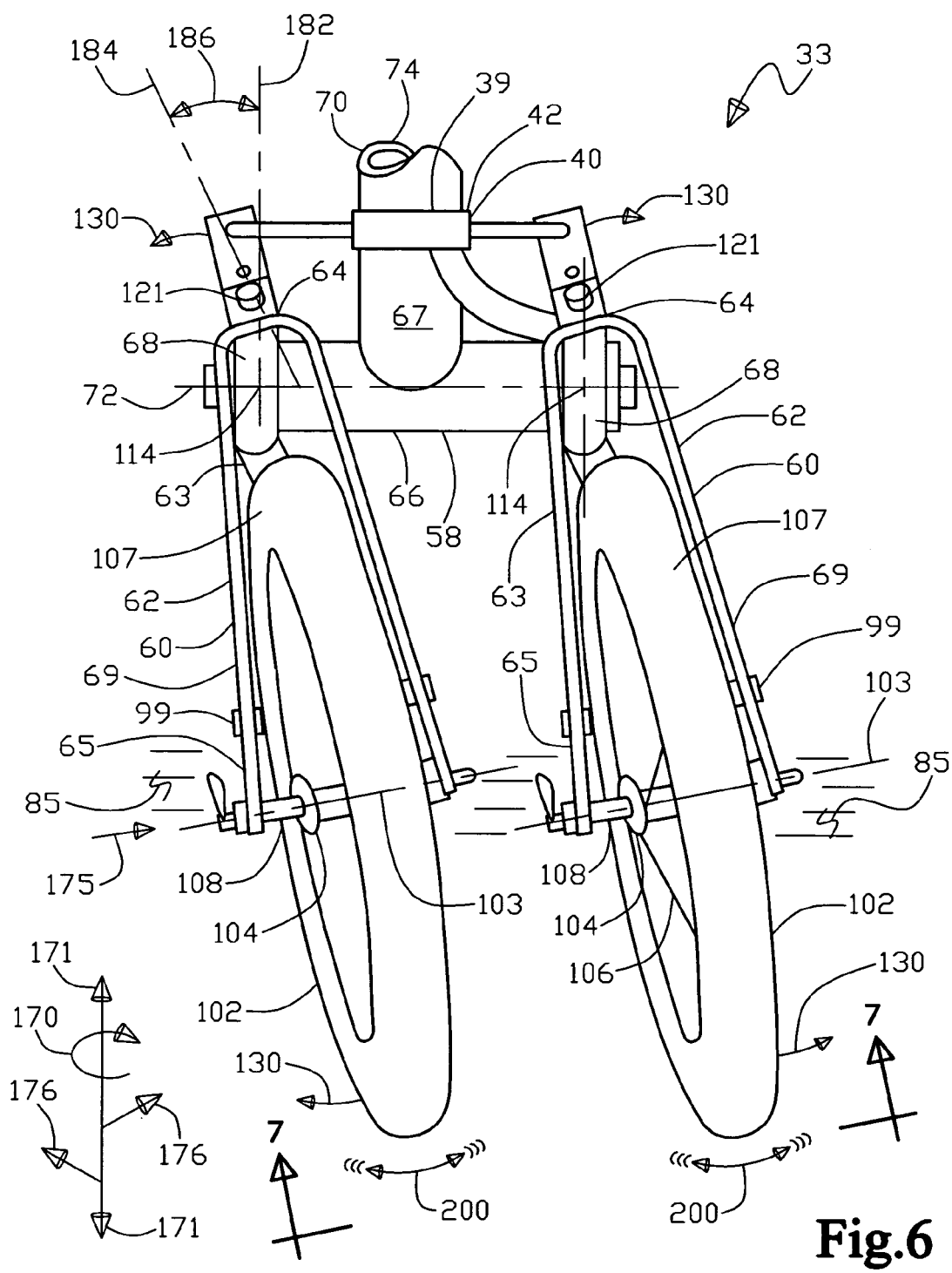
FIG. 6 is a top view, opposite of the surface, of the steerable apparatus with two adjustable arms in a turning mode.
Figure 7:
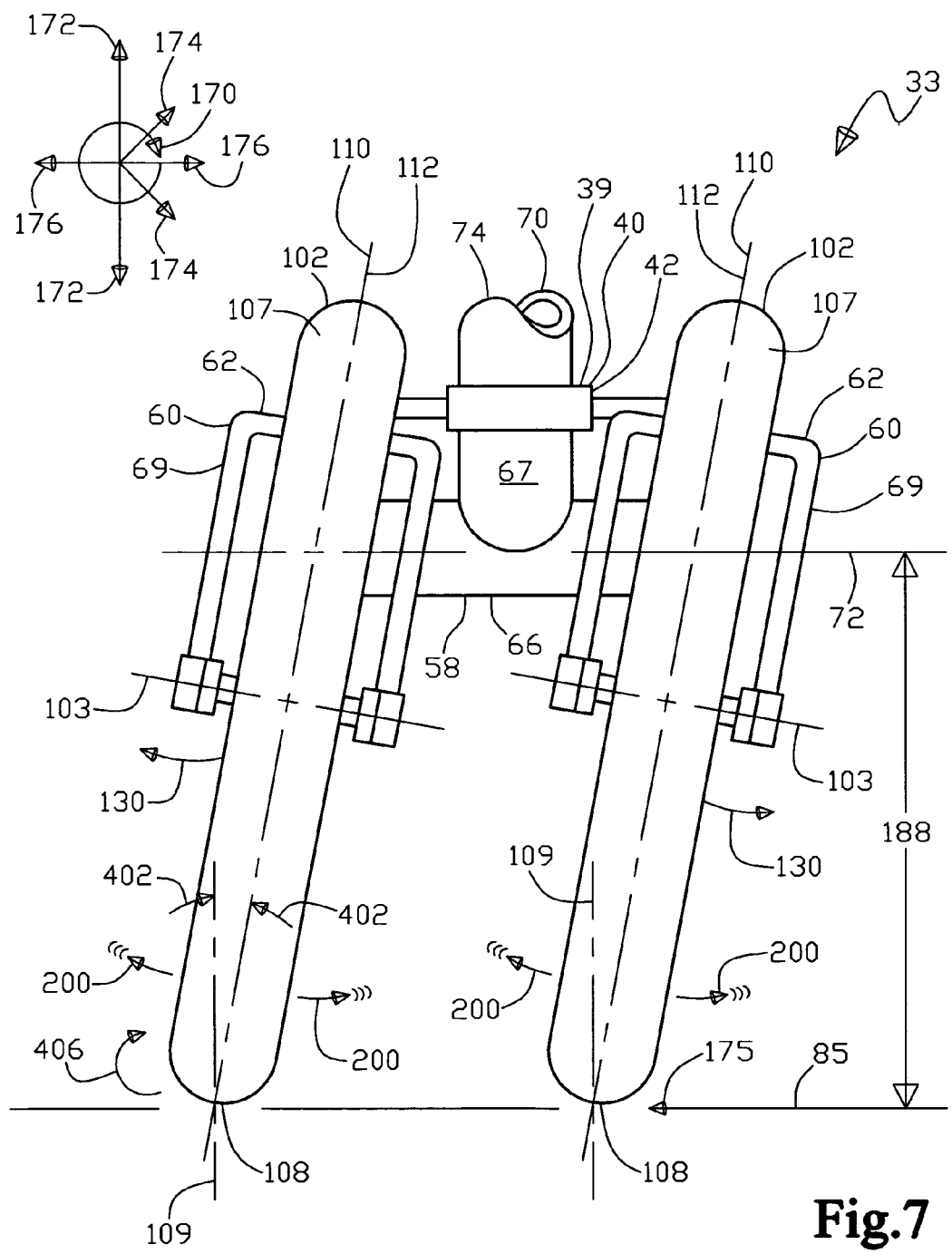
FIG. 7 is view 7-7 from FIG. 6 showing the steerable assembly with two adjustable arms in the turning mode, facing the second rotating elements perpendicular to the rotational axes of the second rotating elements.
Figure 8:
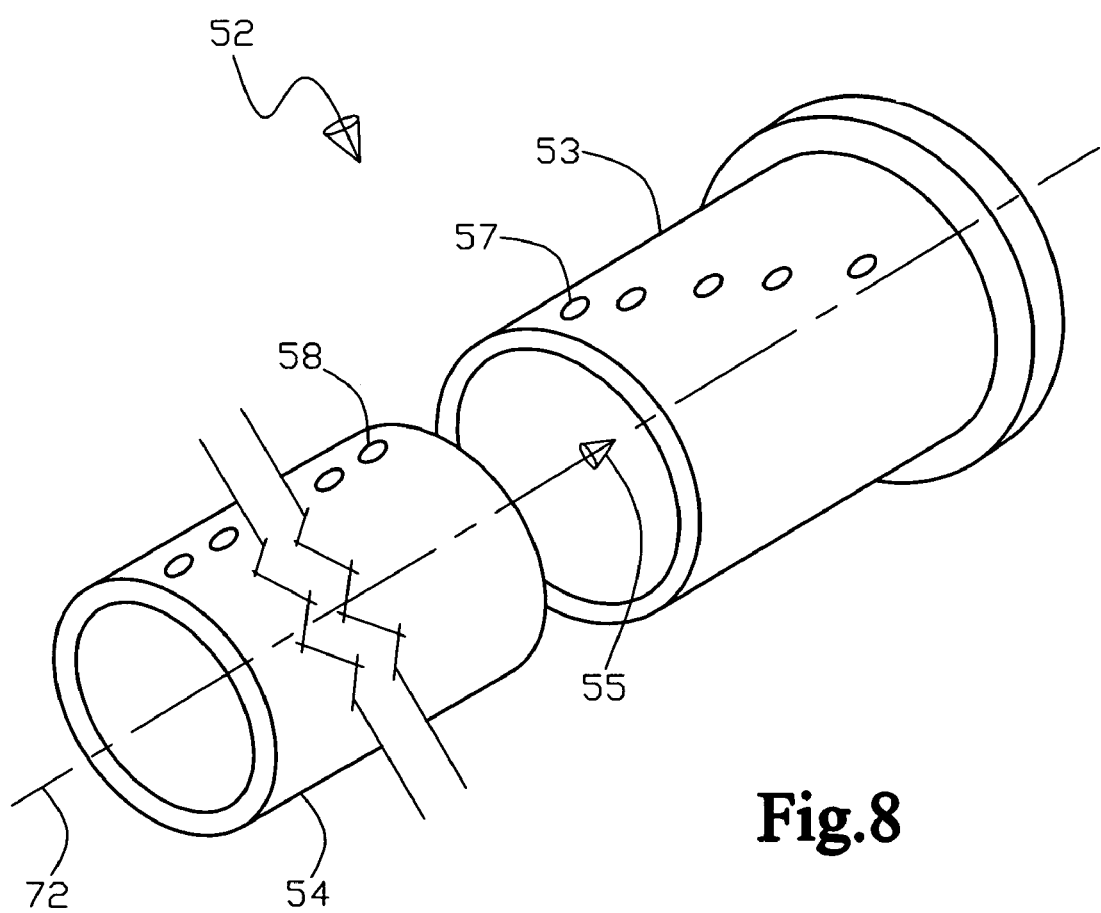
FIG. 8 shows an exploded perspective view of the preferred structure for the manual selectable adjustment of an obtuse rake angle.
Figure 9:
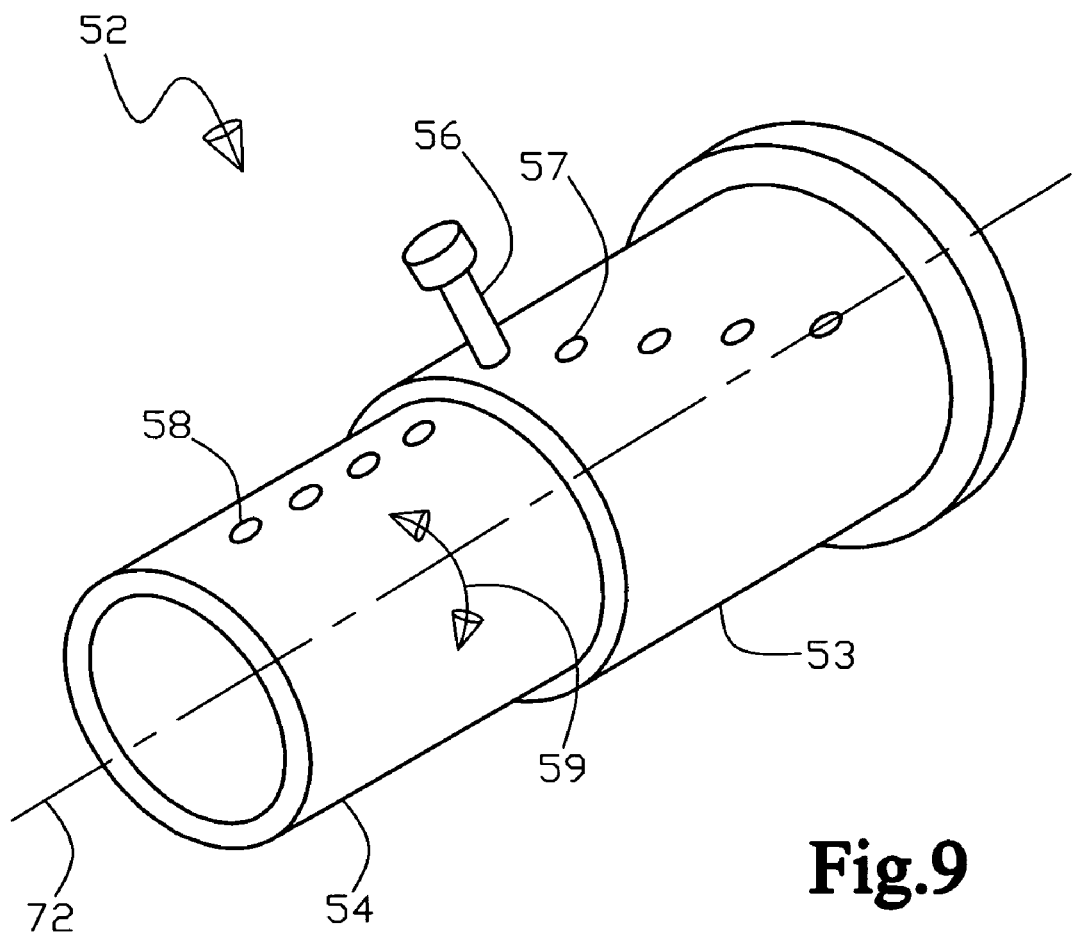
FIG. 9 shows an assembled perspective view of the preferred structure for the manual selectable adjustment of the obtuse rake angle.
Figure 10:
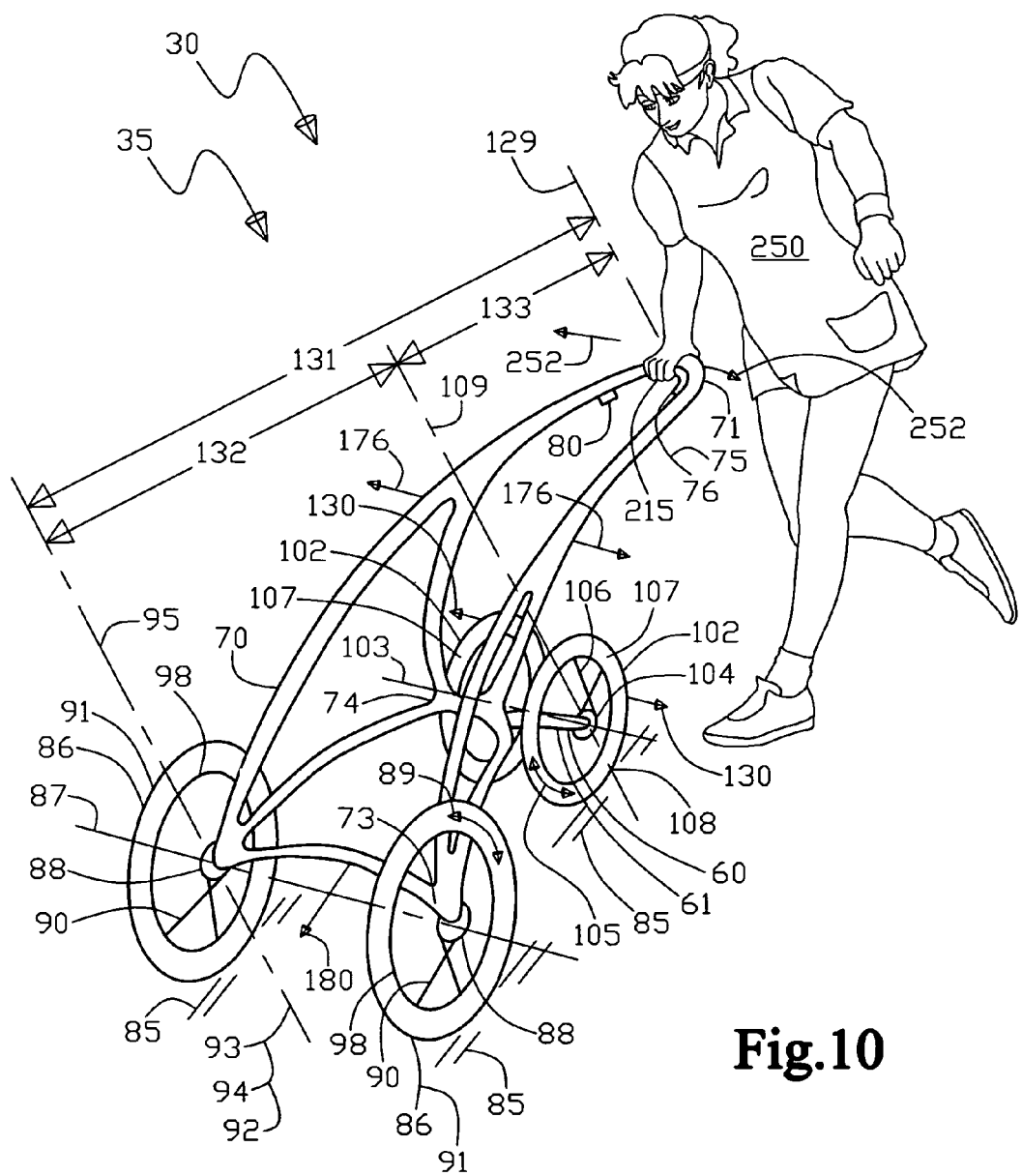
FIG. 10 is a use view of the steerable carriage apparatus showing the user pushing the steerable carriage apparatus while jogging.
Figure 18:
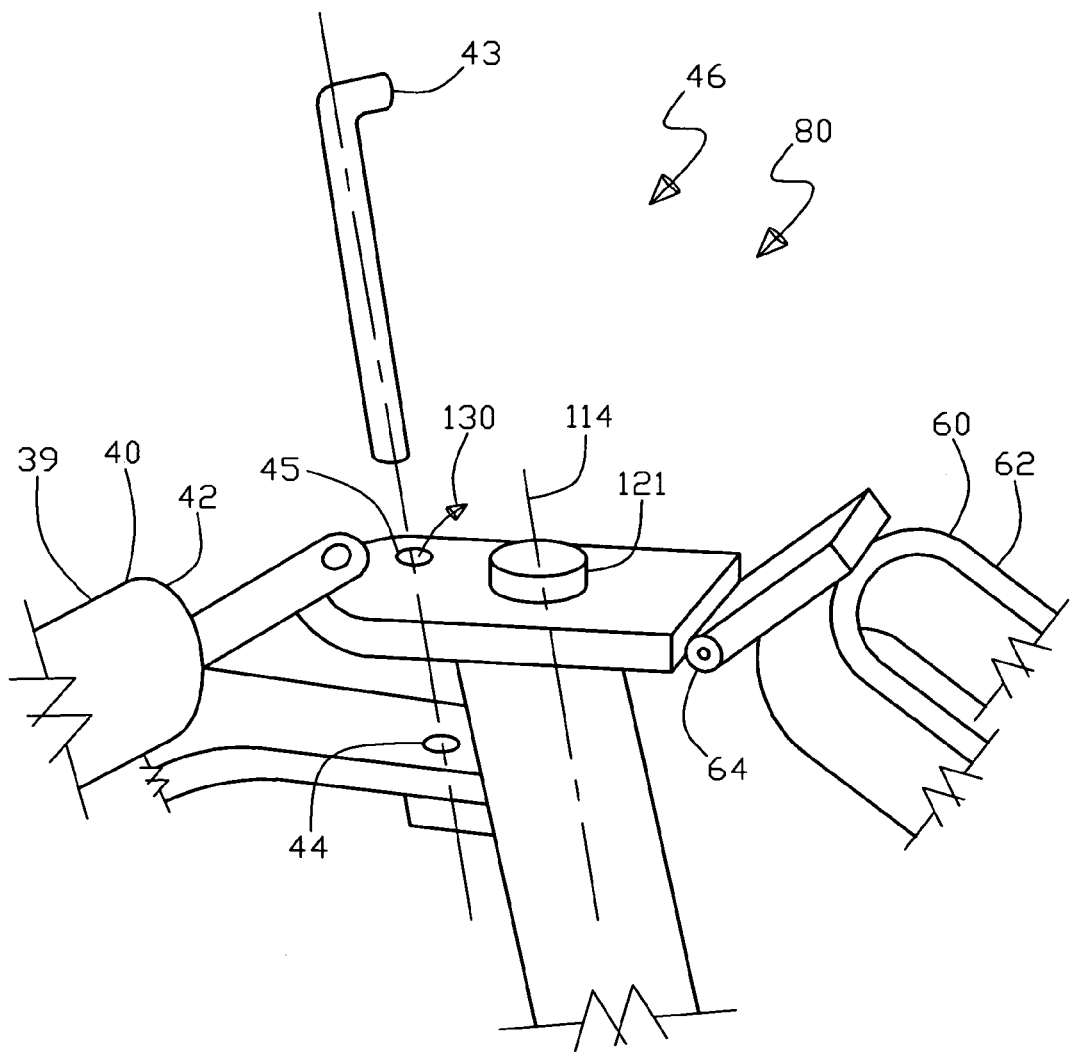
FIG. 18 shows an exploded perspective view of a pivotal movement restriction assembly.
Figure 19:
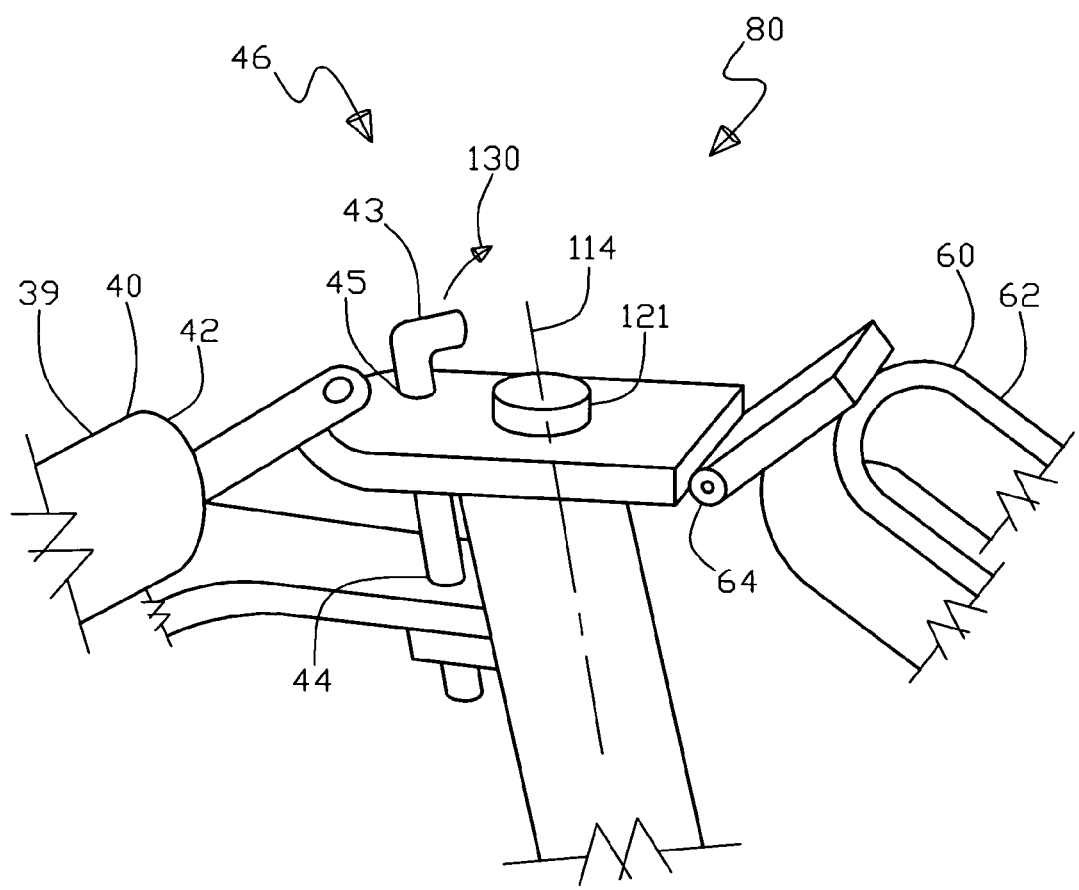
FIG. 19 shows an assembled perspective view of the pivotal movement restriction assembly.

Further, FIG. 4 shows a perspective view of the steerable apparatus 33 with two adjustable arms 62 in the non turning mode, also as previously described, FIG. 5 shows a side view of the steerable apparatus 31 with an adjustable arm 62 in the non turning mode, again as previously described, and FIG. 6 shows a top view, opposite of the surface 85, of the steerable apparatus 33 with two adjustable arms 62 in a turning mode, being defined as the turn angle 186 not equaling zero. Continuing, FIG. 7 is view 7-7 from FIG. 6 showing the steerable assembly 33 with two adjustable arms 62 in the turning mode, as previously described, wherein FIG. 7 is viewed facing the second rotating elements 102 perpendicular to the rotational axes 103 of the second rotating elements 102. FIG. 8 shows an exploded perspective view of the preferred structure or means 52 for the manual selectable adjustment of an obtuse rake angle 119 and FIG. 9 shows an assembled perspective view of the preferred structure or means 52 for the manual selectable adjustment of the obtuse rake angle 119. FIG. 10 shows a use view of the steerable carriage apparatus 30 showing the user 250 pushing the steerable carriage apparatus 30 in movement 180 while jogging. FIG. 18 shows an exploded perspective view of a pivotal movement 130 restriction assembly 46 and FIG. 19 shows an assembled perspective view of the pivotal movement 130 restriction assembly 46.

Figure 11:
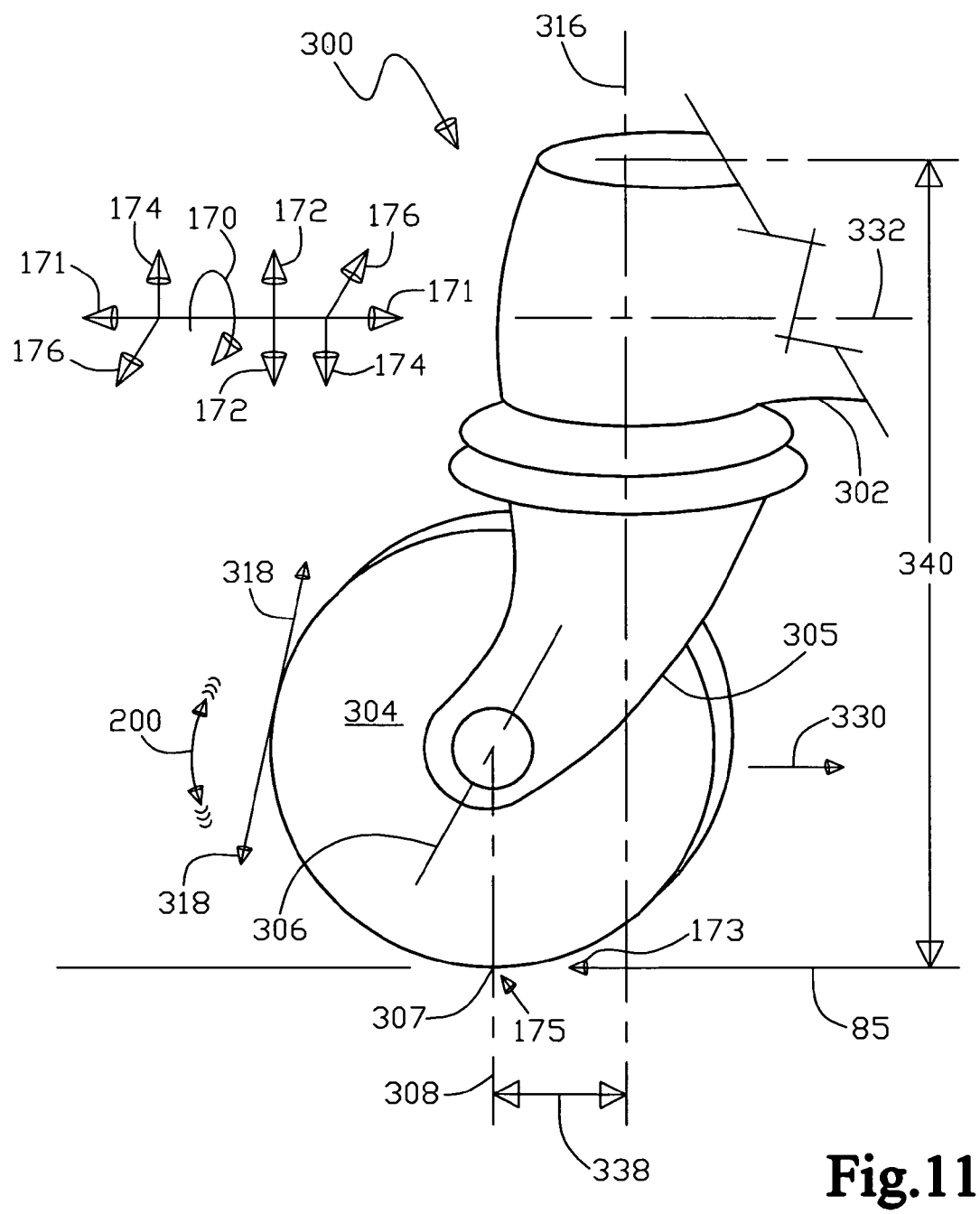
FIG. 11 shows a side view of a prior art castor steerable wheel assembly.
Figure 12:
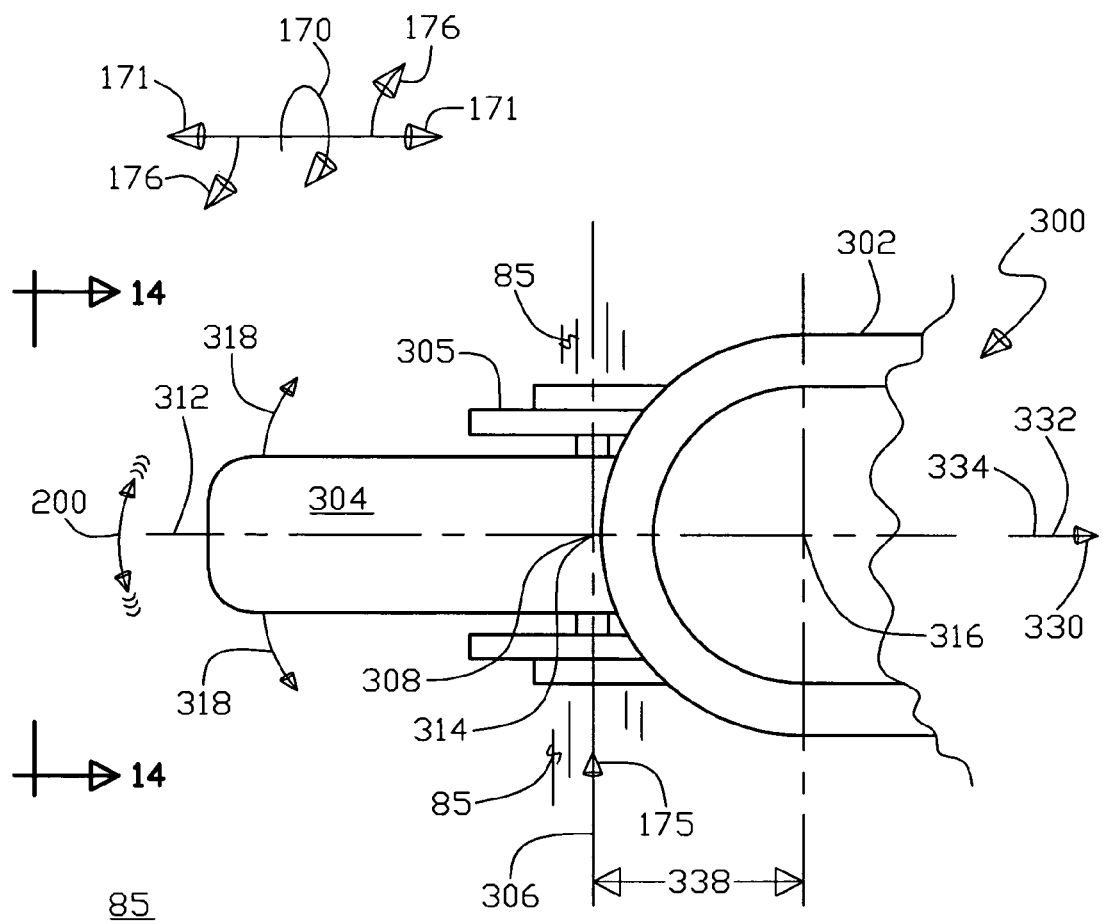
FIG. 12 shows a top view, opposite of the surface, of the prior art castor steerable wheel assembly in the non turning mode.
Figure 13:
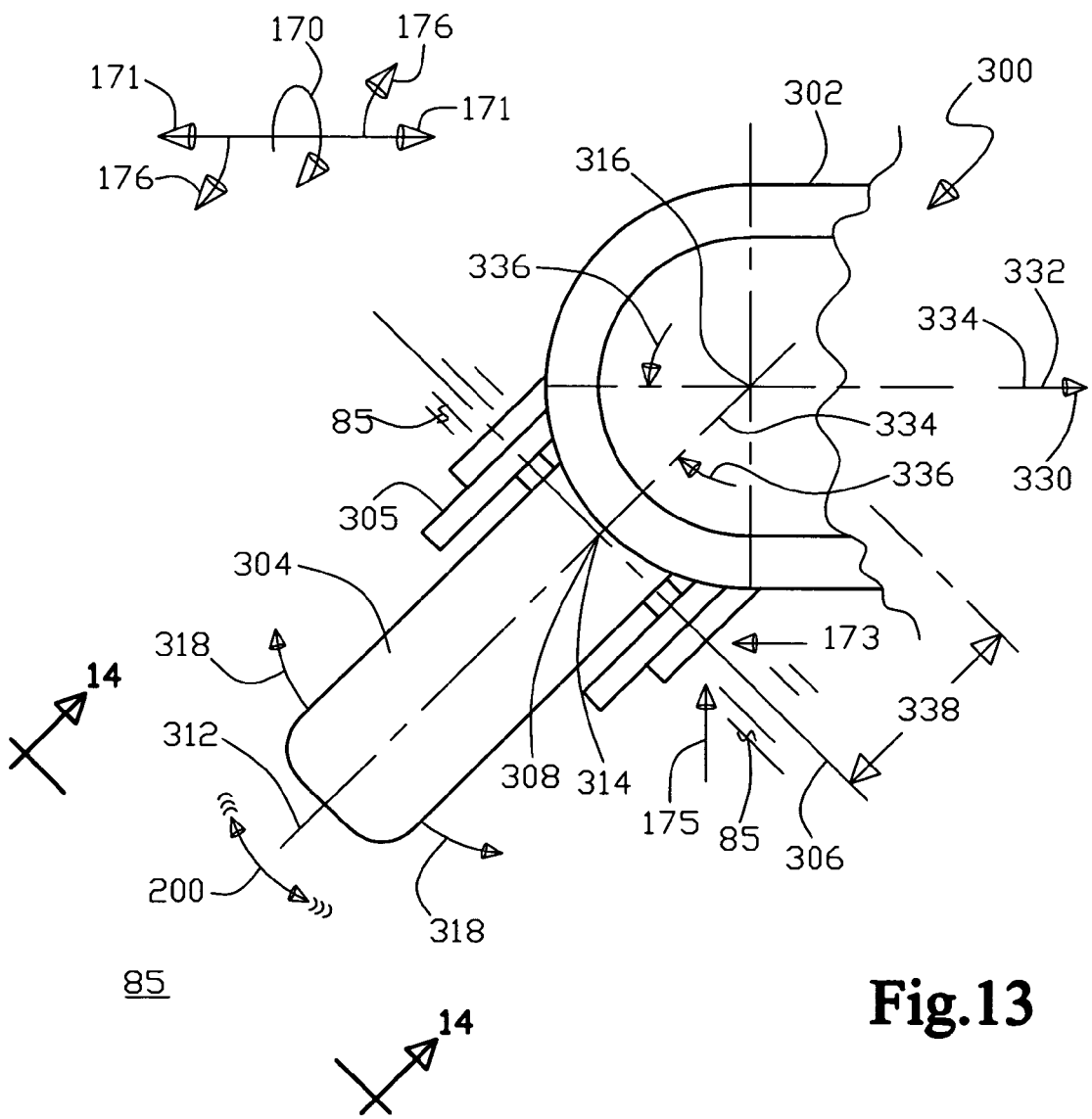
FIG. 13 shows a top view, opposite of the surface, of the prior art castor steerable wheel assembly in the tuning mode.
Figure 14:
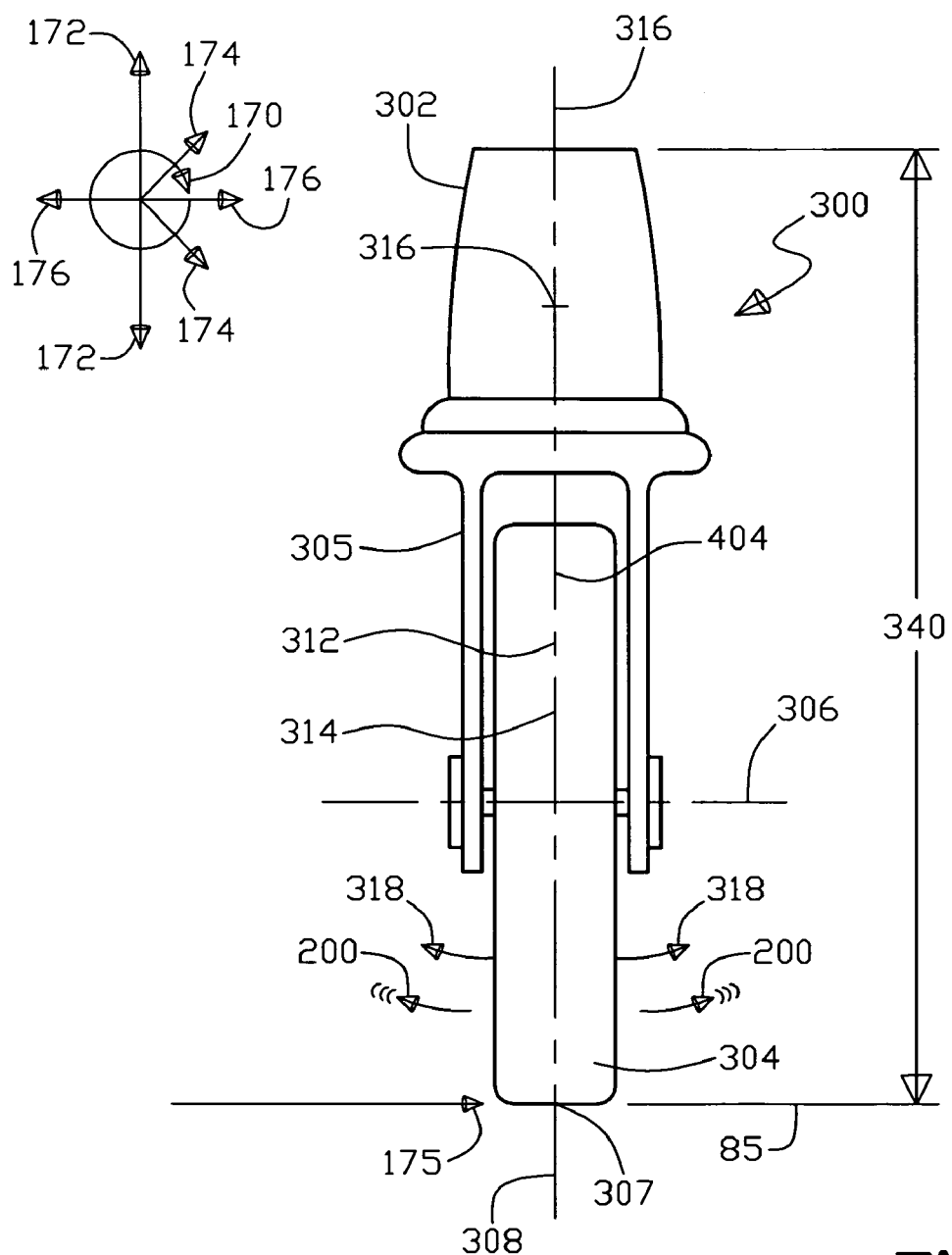
FIG. 14 shows view 14-14 from FIGS. 12 and 13 of the prior art castor steerable wheel assembly in representing the turning and non turning modes, facing a prior art castor steerable wheel perpendicular to the rotational axis of the prior art castor steerable wheel.
Figure 15:
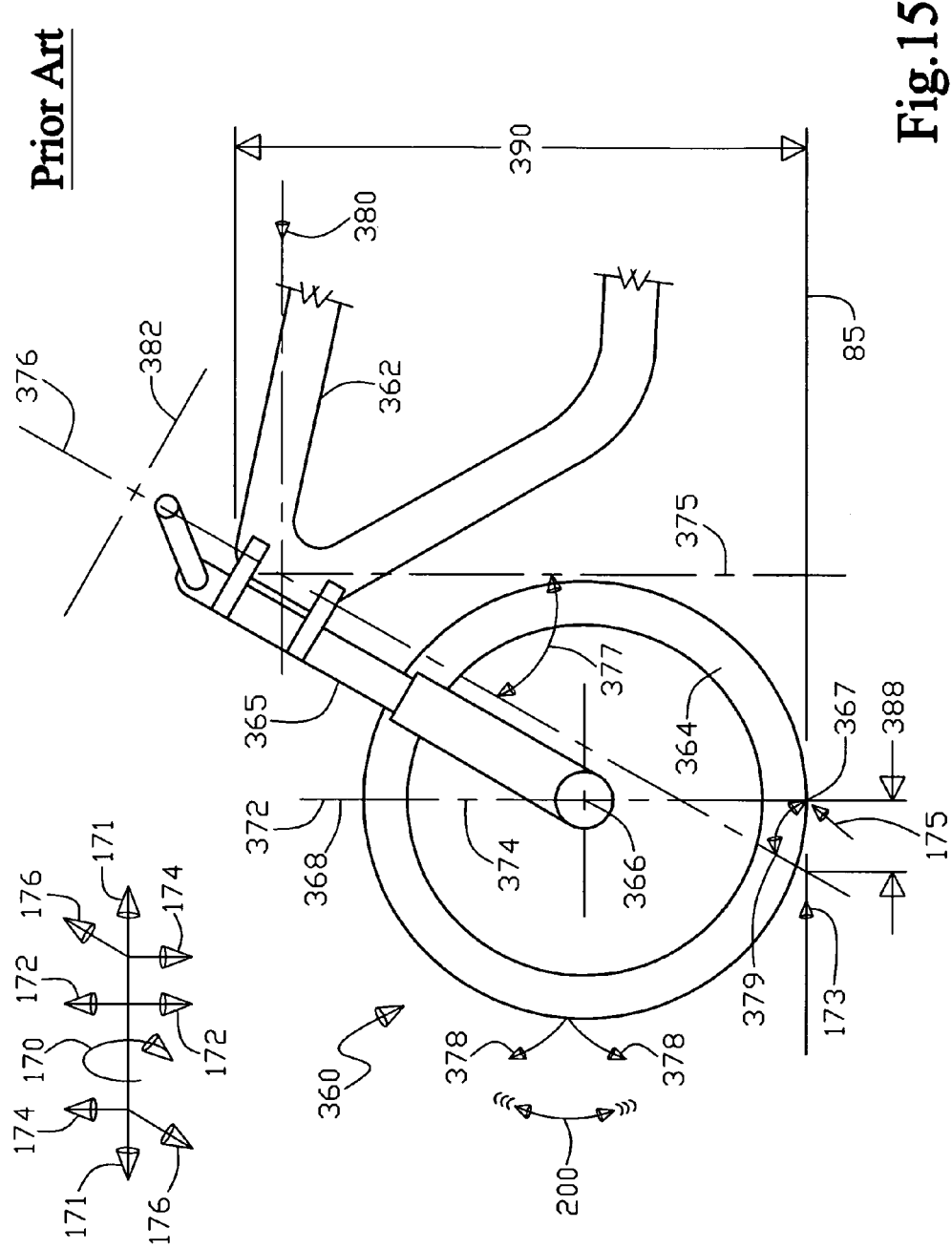
FIG. 15 shows a side view of the prior art motorcycle steerable wheel assembly.
Figure 16:
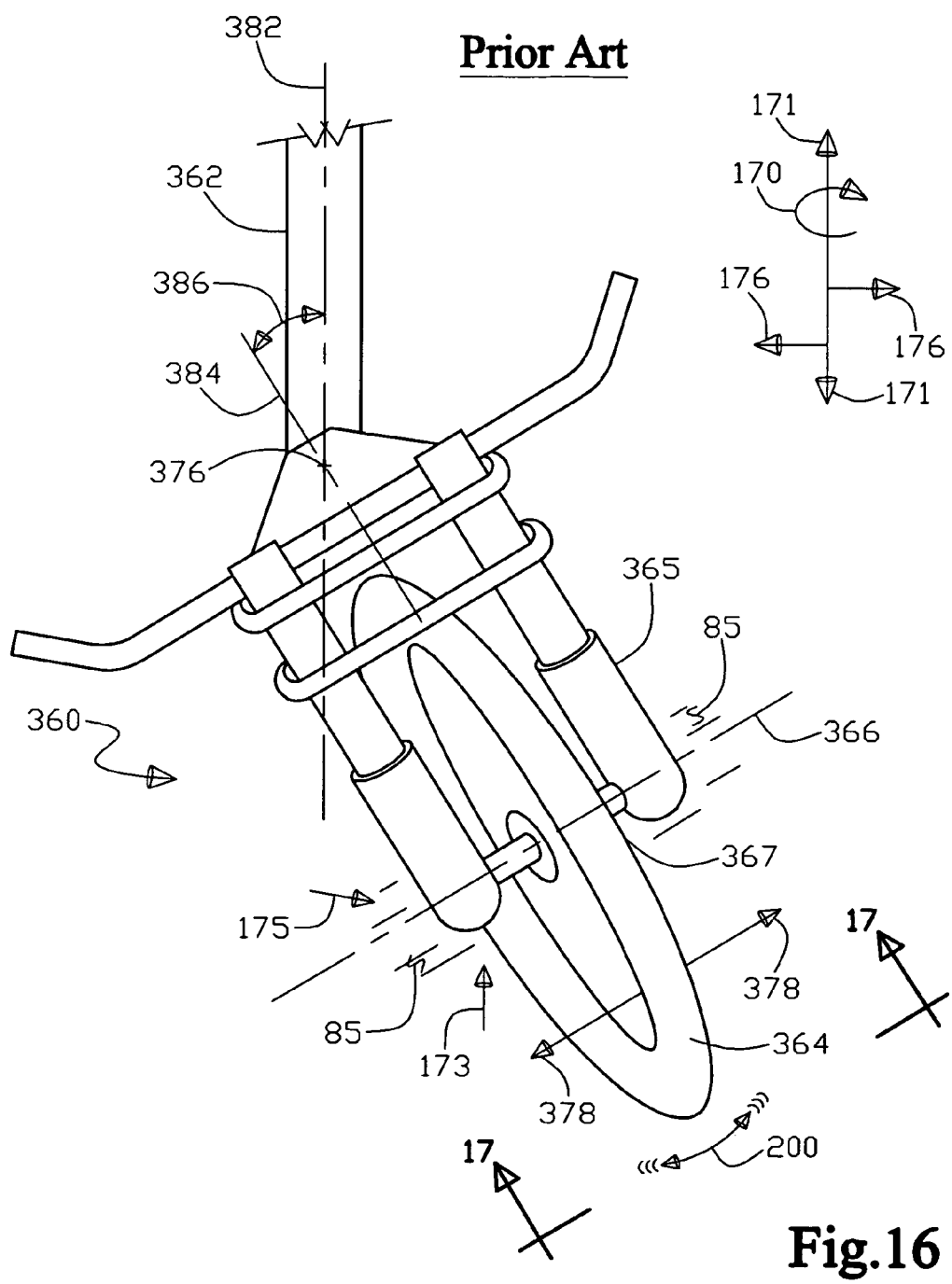
FIG. 16 shows a top view, opposite of the surface, of the prior art motorcycle steerable wheel assembly in a tuning mode.
Figure 17:
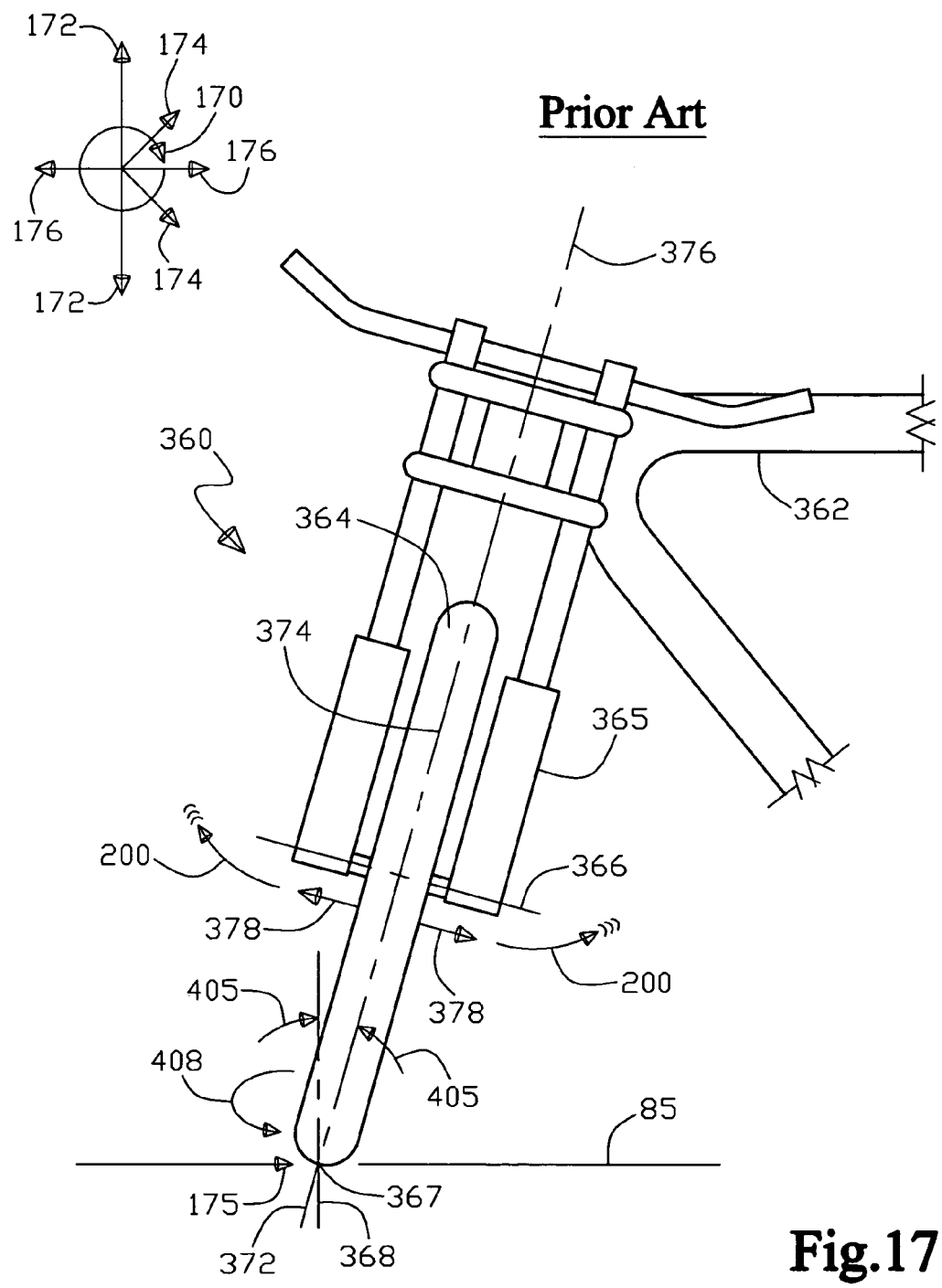
FIG. 17 shows view 17-17 from FIG. 16 of the prior art motorcycle steerable wheel assembly in representing the tuning mode, facing a prior art motorcycle steerable wheel perpendicular to the rotational axis of the prior art motorcycle steerable wheel.

Moving to the prior art for comparison, starting with FIG. 11, shown is a side view of a prior art castor steerable wheel assembly 300, FIG. 12 shows a top view, opposite of the surface 85, of the prior art castor steerable wheel assembly 300 in the non turning mode, being defined as the turn angle 336 equaling zero, and FIG. 13 shows a top view, opposite of the surface 85, of the prior art castor steerable wheel assembly 300 in the tuning mode, being defined as turn angle 336 not equaling zero. Further, on the prior art comparison, FIG. 14 shows view 14-14 from FIGS. 12 and 13 of the prior art castor steerable wheel assembly 300 in representing the non turning and turning modes respectively, both as previously described, wherein FIG. 14 is viewed facing a prior art castor steerable wheel 304 perpendicular to the rotational axis 306 of the prior art castor steerable wheel 304. Continuing on the prior art comparison, for a motorcycle steerable front wheel castor, FIG. 15 shows a side view of the prior art motorcycle steerable wheel assembly 360 in a non tuning mode, being defined as turn angle 386 equaling zero, FIG. 16 shows a top view, opposite of the surface 85, of the prior art motorcycle steerable wheel assembly 360 in a turning mode, being defined as turn angle 386 not equaling zero. Further, on the prior art motorcycle castor steerable wheel assembly 360, FIG. 17 shows view 17-17 from FIG. 16 of the prior art motorcycle steerable wheel assembly 360 in representing the tuning mode as previously described, wherein FIG. 17 is viewed as facing a prior art motorcycle steerable wheel 364 perpendicular to the rotational axis 366 of the prior art motorcycle steerable wheel 364.

Figure 20:
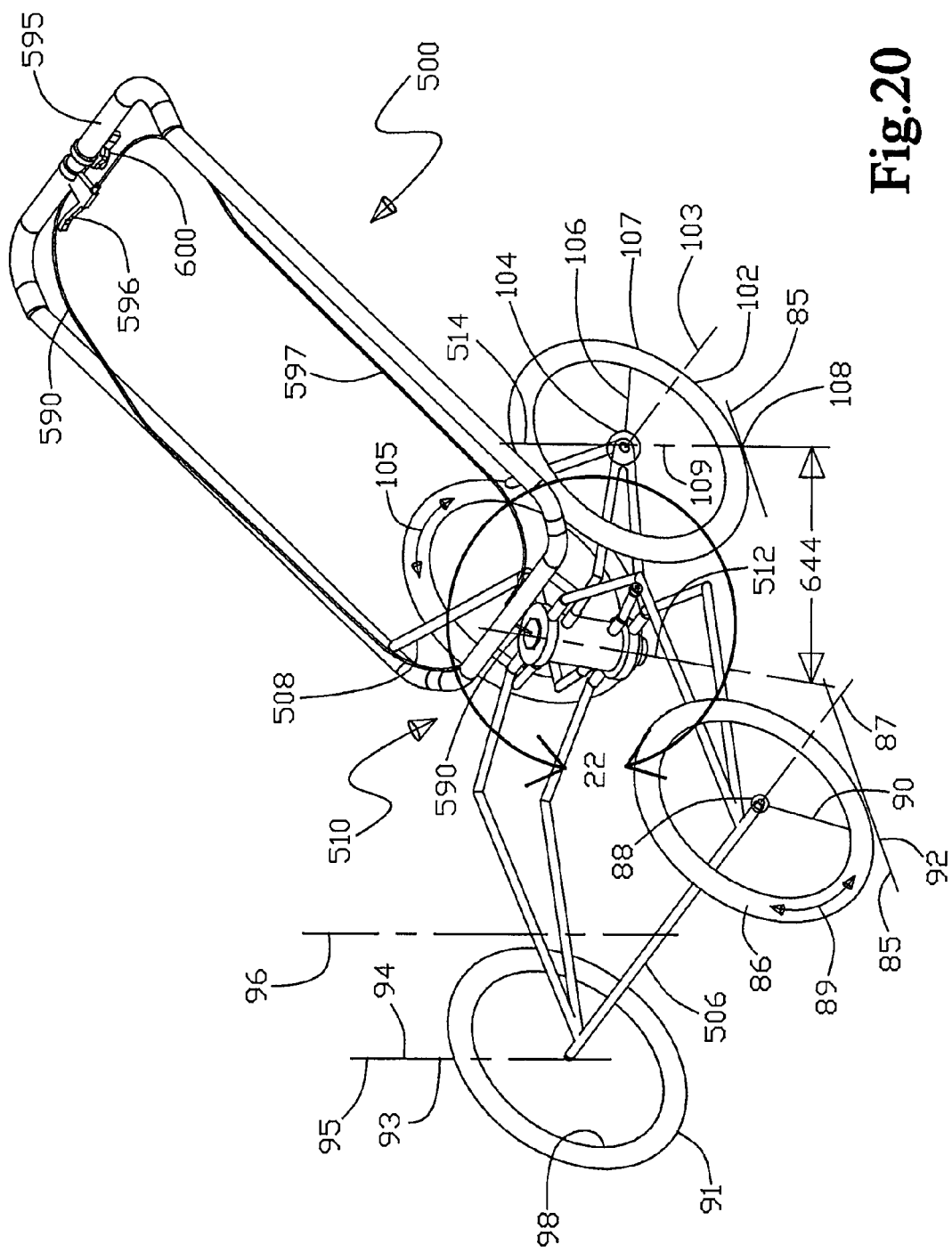
FIG. 20 shows a perspective view of the articulated steerable carriage apparatus in the rear turning embodiment in a non-turned mode.
Figure 21:
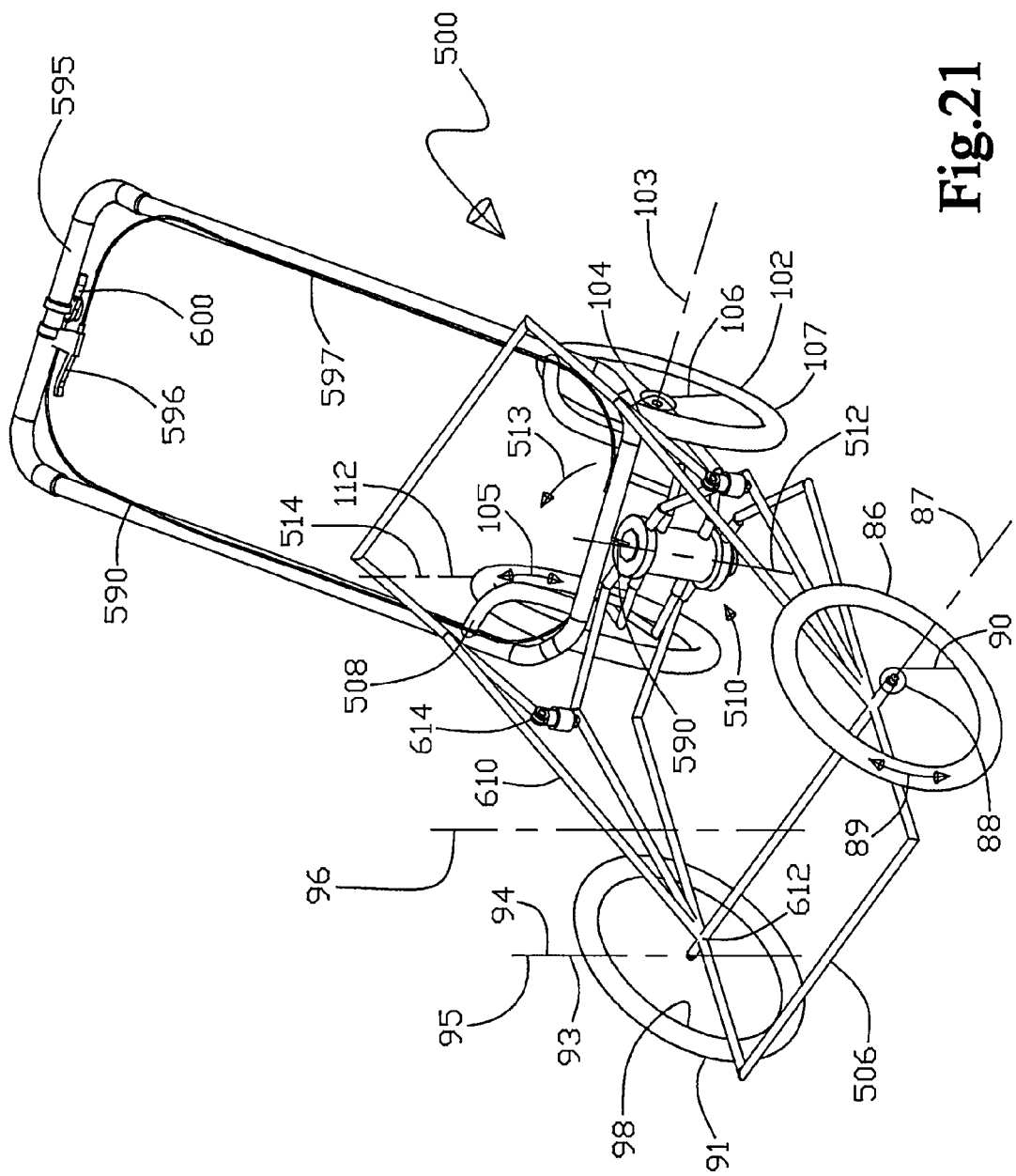
FIG. 21 shows a perspective view of the articulated steerable carriage apparatus in the rear turning embodiment in a turned mode with the rear wheels and the handle turned.
Figure 22:
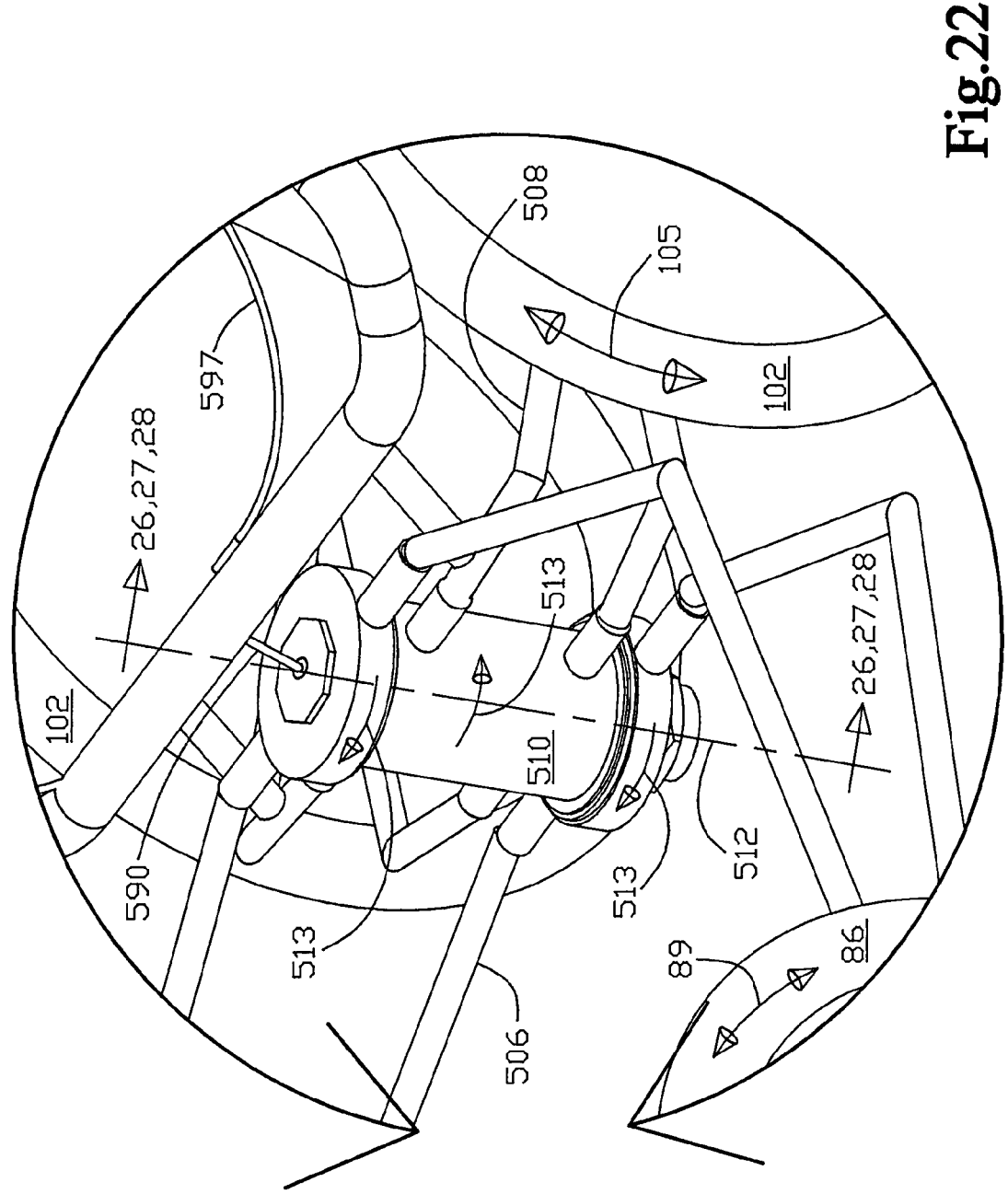
FIG. 22 shows an expanded perspective view 22 from FIG. 20 of the yoke assembly and associated first and second frame portions, handle, and with the first and second rotating elements all in the non-turned mode.
Figure 23:
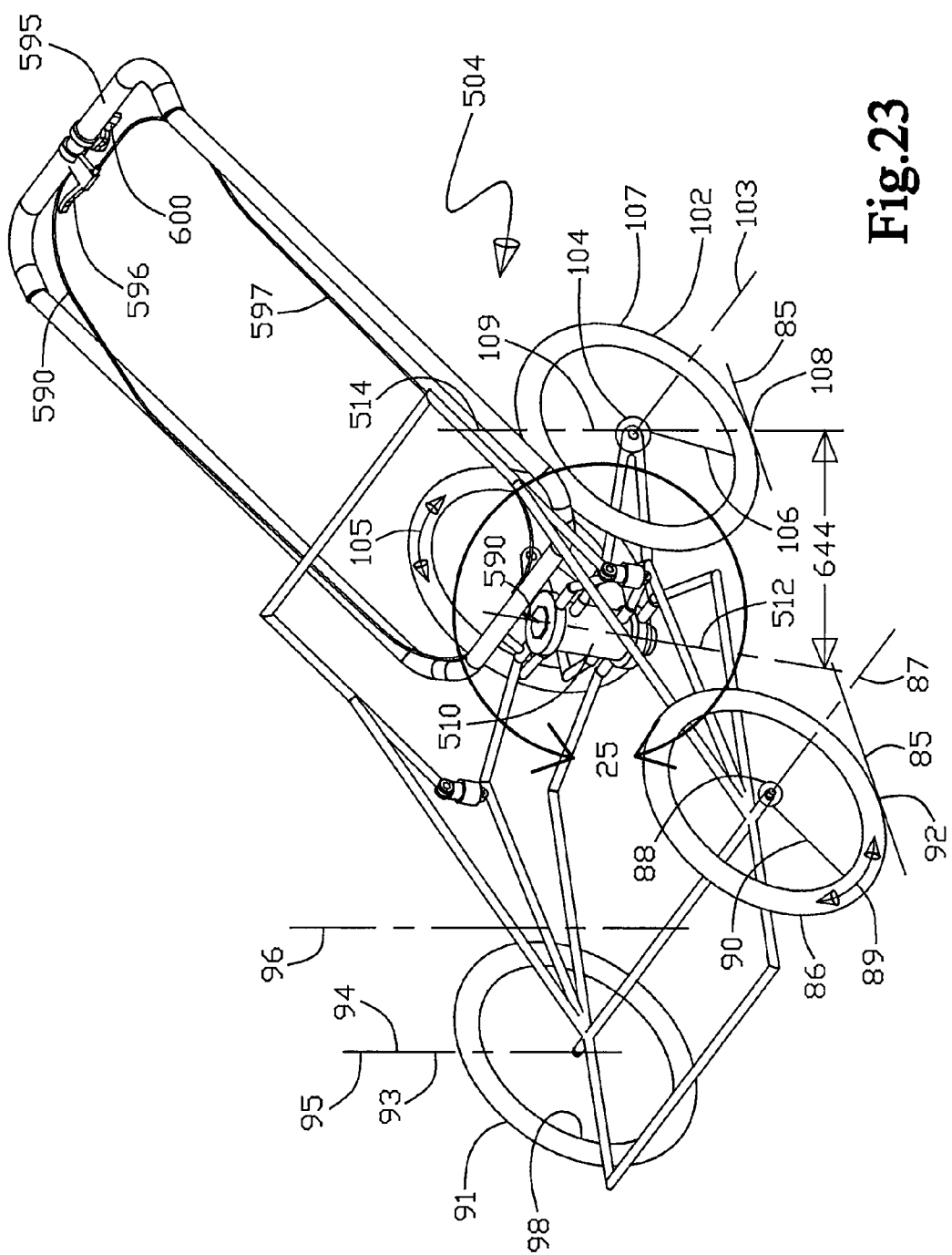
FIG. 23 shows a perspective view of the articulated steerable carriage apparatus in the front turning embodiment in a non-turned mode.
Figure 24:
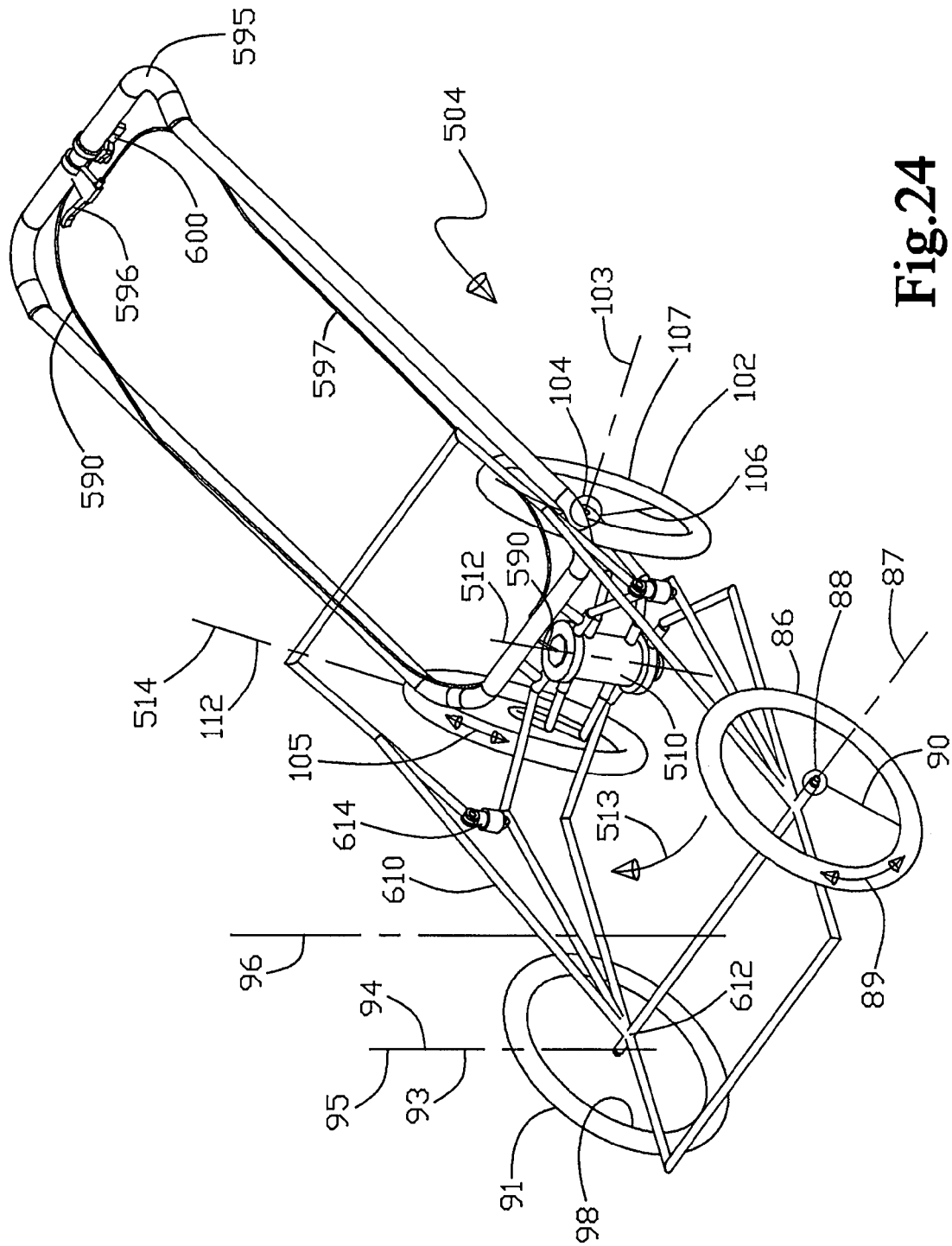
FIG. 24 shows a perspective view of the articulated steerable carriage apparatus in the front turning embodiment in a turned mode with the front wheels and the handle turned.
Figure 25:
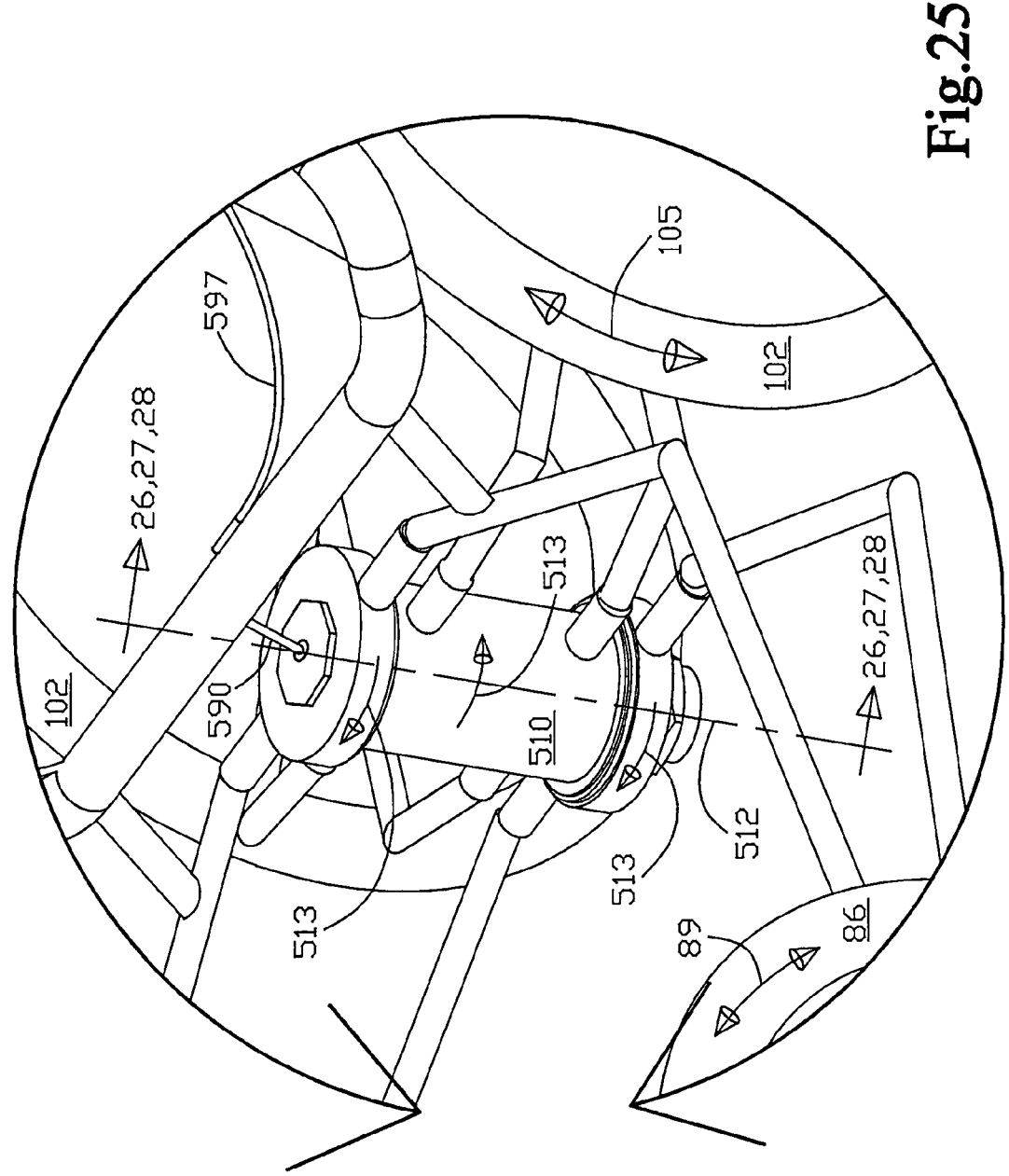
FIG. 25 shows an expanded perspective view 25 from FIG. 23 of the yoke assembly and associated first and second frame portions, handle, and with the first and second rotating elements all in the non-turned mode.

Continuing to FIG. 20 shown is a perspective view of the articulated steerable carriage apparatus 500 in the rear turning embodiment in a non-turned mode, FIG. 21 shows a perspective view of the articulated steerable carriage apparatus 500 in the rear turning embodiment in a turned mode with the rear wheels 102 and the handle 595 turned, and FIG. 22 shows an expanded perspective view 22 from FIG. 20 of the yoke assembly 510 and associated first 506 and second 508 frame portions, handle 595, and with the first 86 and second 102 rotating elements all in the non-turned mode. Further, FIG. 23 shows a perspective view of the articulated steerable carriage apparatus 504 in the front turning embodiment in a non-turned mode, FIG. 24 shows a perspective view of the articulated steerable carriage apparatus 504 in the front turning embodiment in a turned mode with the front wheels 86 and the handle turned 595, and FIG. 25 shows an expanded perspective view 25 from FIG. 23 of the yoke assembly and associated first 506 and second 508 frame portions, handle 595, and with the first 86 and second 102 rotating elements all in the non-turned mode. Next, FIG. 26 shows yoke 510 cross section 26 from FIGS. 22 and 25 including a shuttle ring 522 positioned to place the yoke 510 in a pivotal movement 513 substantially locked state, FIG. 27 shows yoke 510 cross section 27 from FIGS. 22 and 25 including the shuttle ring 522 positioned to place the yoke 510 in a biased state for pivotal movement 513 thus urging the pivotal movement 513 to the non-turning mode for the articulated steerable carriage 500 or 504, and FIG. 28 shows yoke 510 cross section 28 from FIGS. 22 and 25 including the shuttle ring 522 positioned to place the yoke in a free pivotal movement 513 state.

Figure 27:
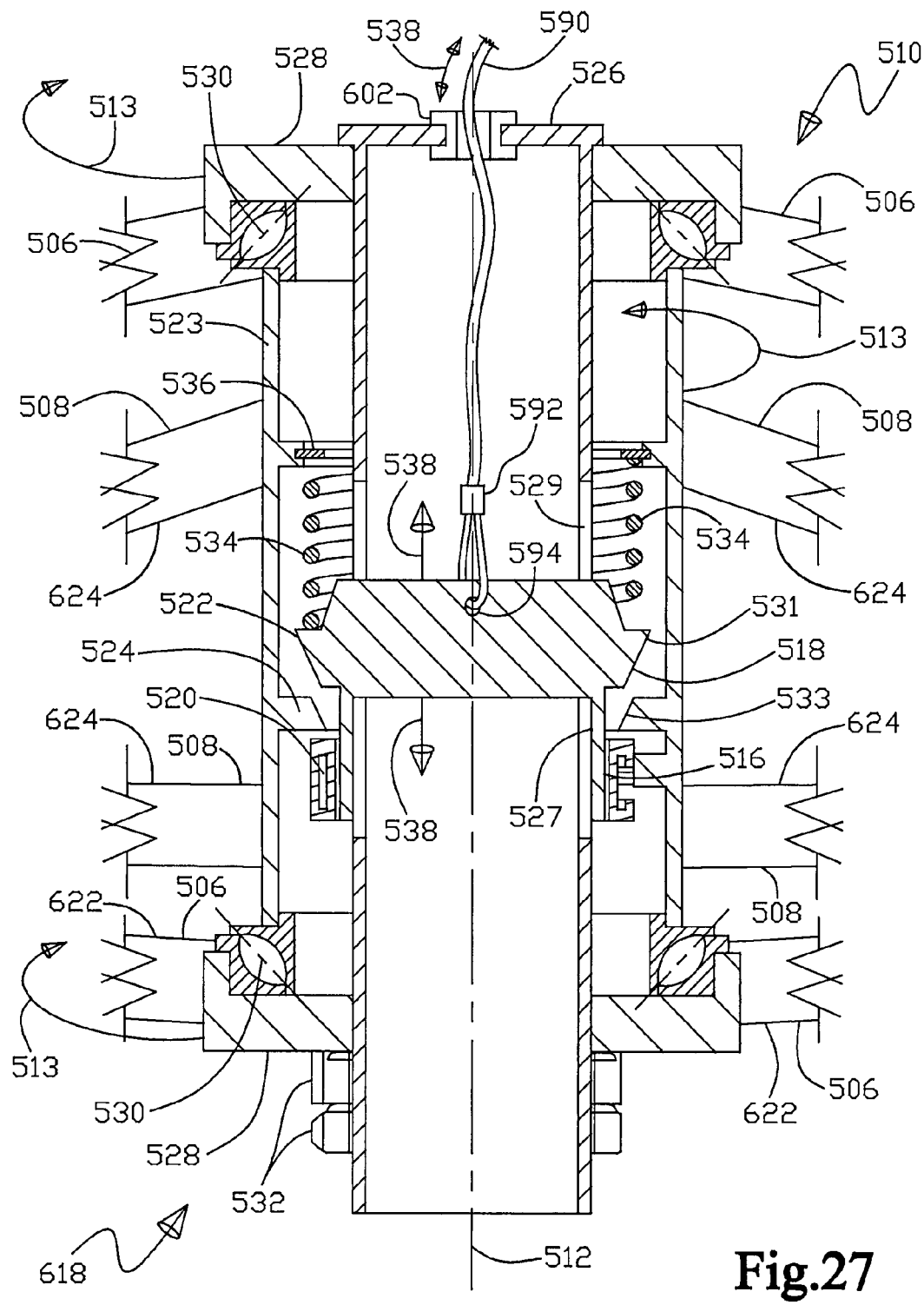
FIG. 27 shows yoke cross section 27 from FIGS. 22 and 25 including the shuttle ring positioned to place the yoke in a biased state for pivotal movement thus urging the pivotal movement to the non-turning mode for the articulated steerable carriage.
Figure 28:
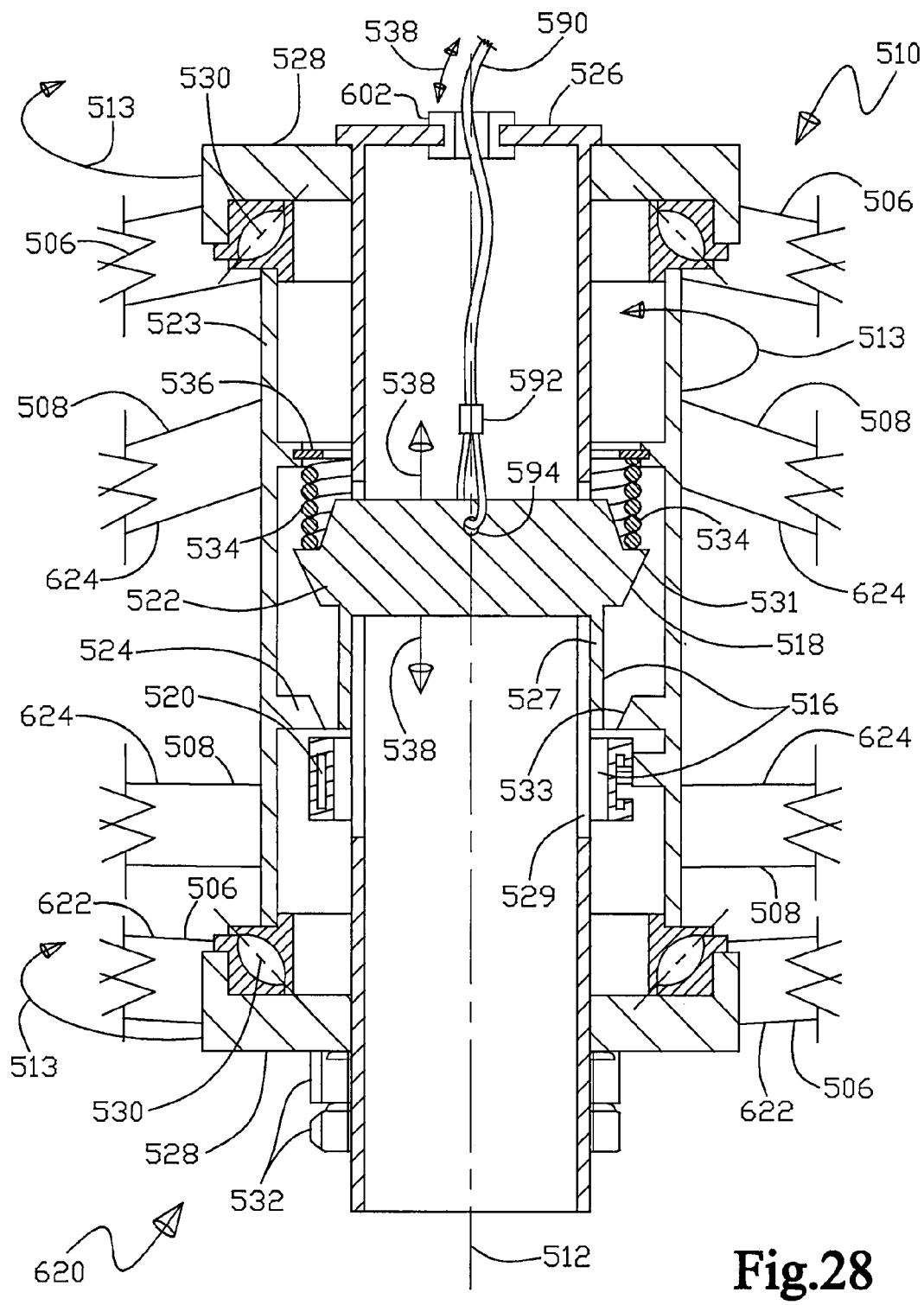
FIG. 28 shows yoke cross section 28 from FIGS. 22 and 25 including the shuttle ring positioned to place the yoke in a free pivotal movement state.
Figure 29:
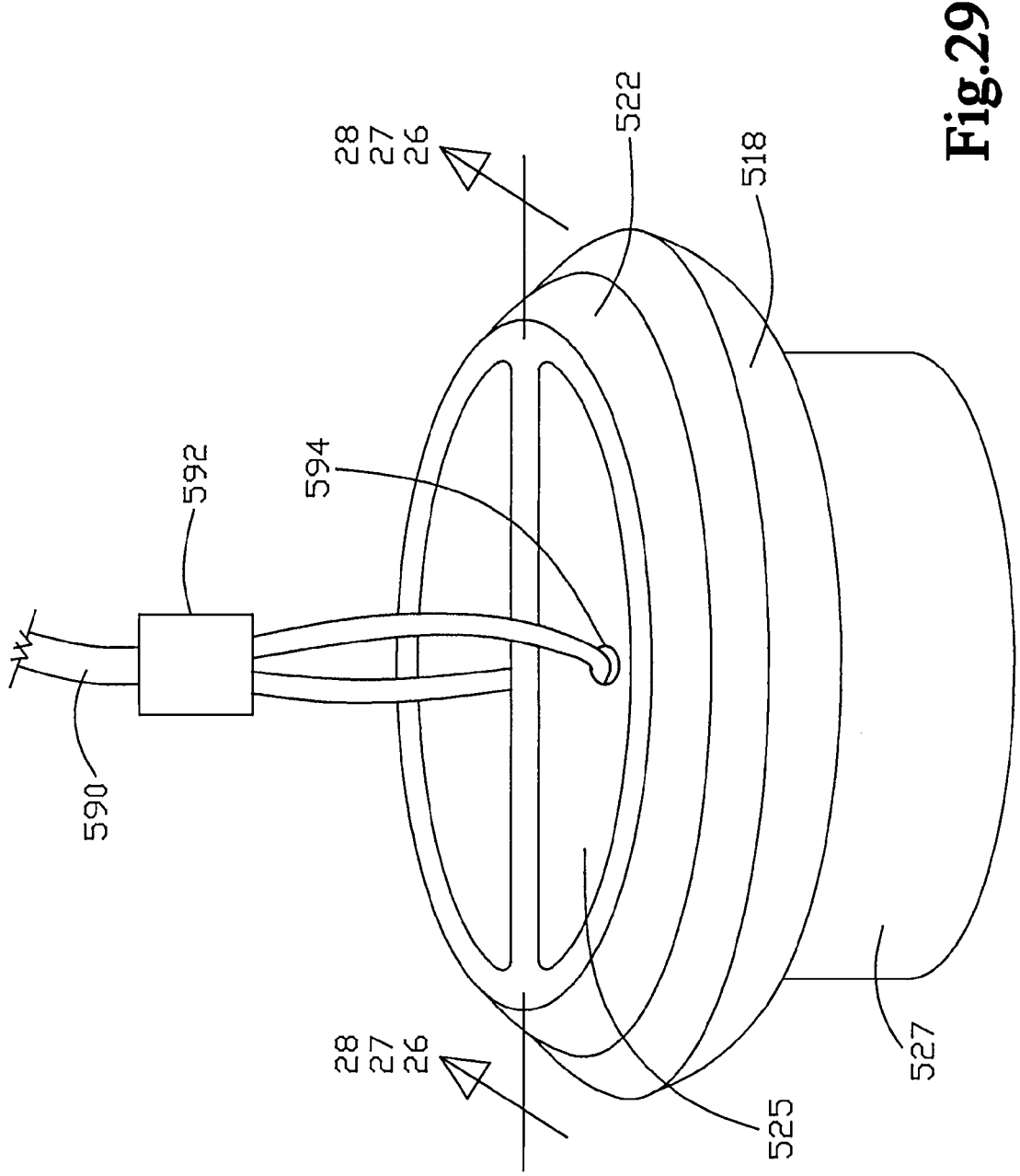
FIG. 29 shows a perspective view of the shuttle ring including a control cable and a swivel for selectively placing the shuttle ring in selected axial positions for the operational states identified in FIGS. 26, 27, and 28.
Figure 30:
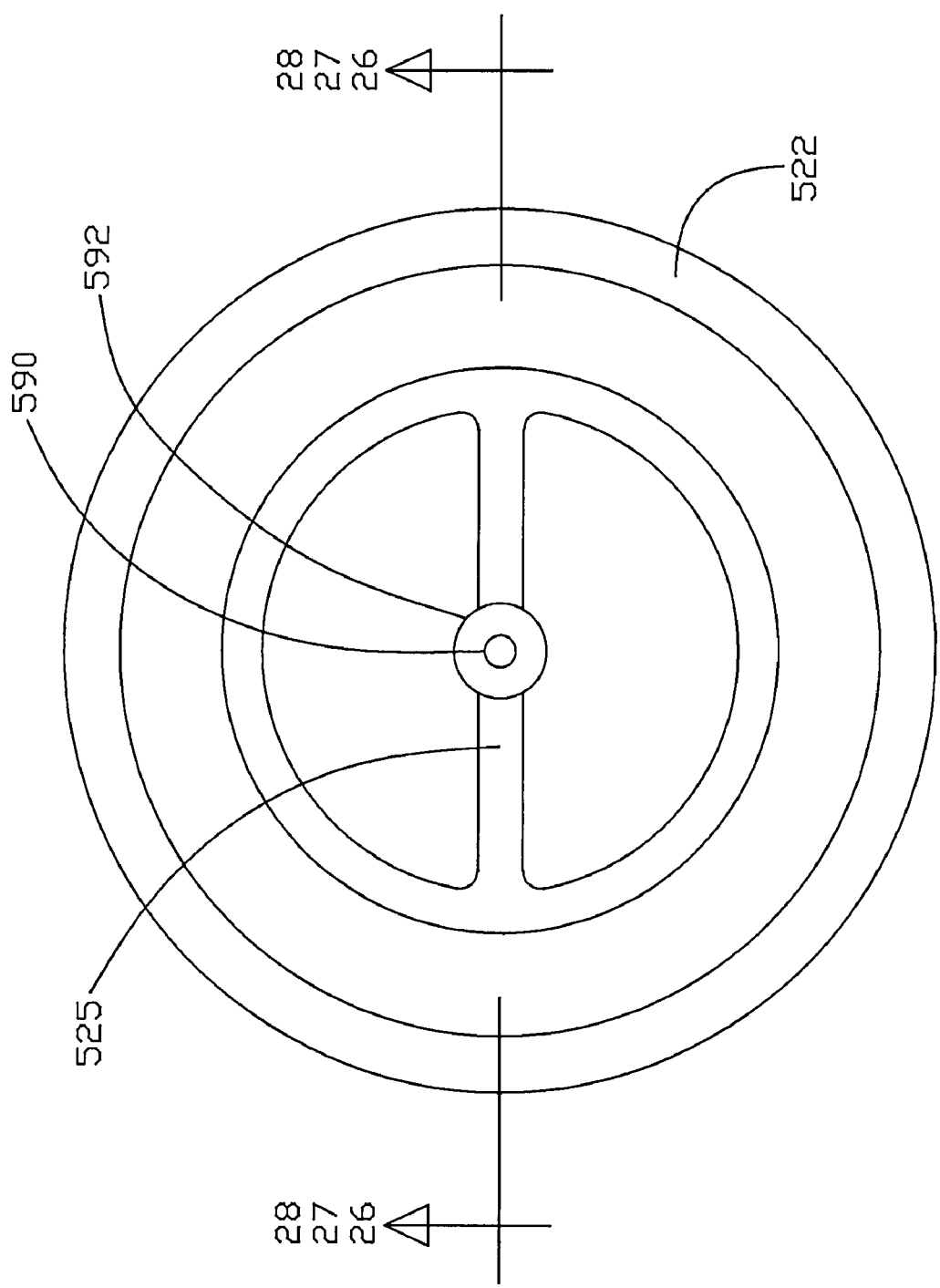
FIG. 30 shows a top view of the shuttle ring including a control cable and a swivel for selectively placing the shuttle ring in selected axial positions for the operational states identified in FIGS. 26, 27, and 28.
Figure 31:
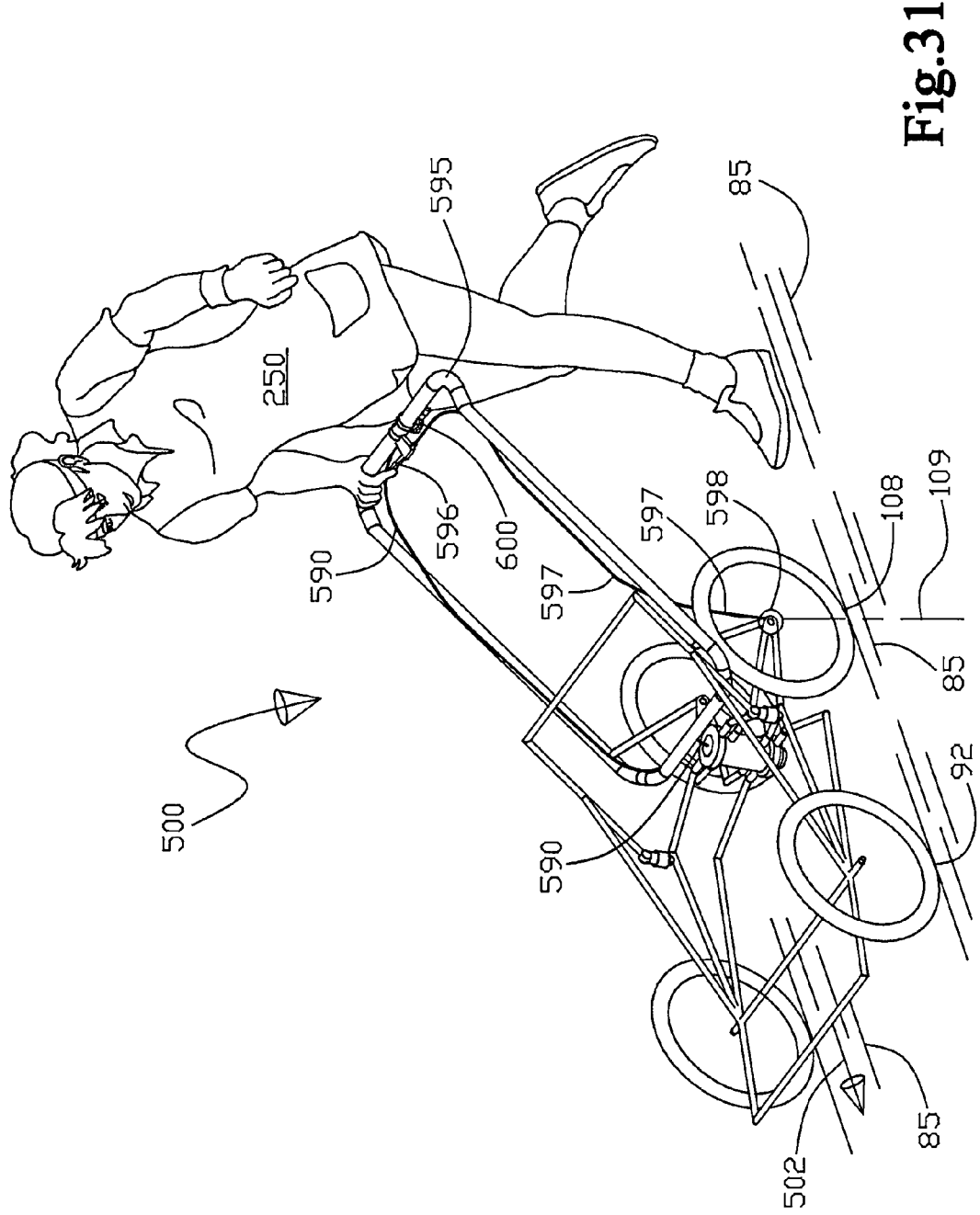
FIG. 31 shows a perspective use view of the articulated steerable carriage apparatus in the rear wheel turning embodiment manually being pushed at jogging speed across a surface by a user in the non-turning mode.
Figure 32:
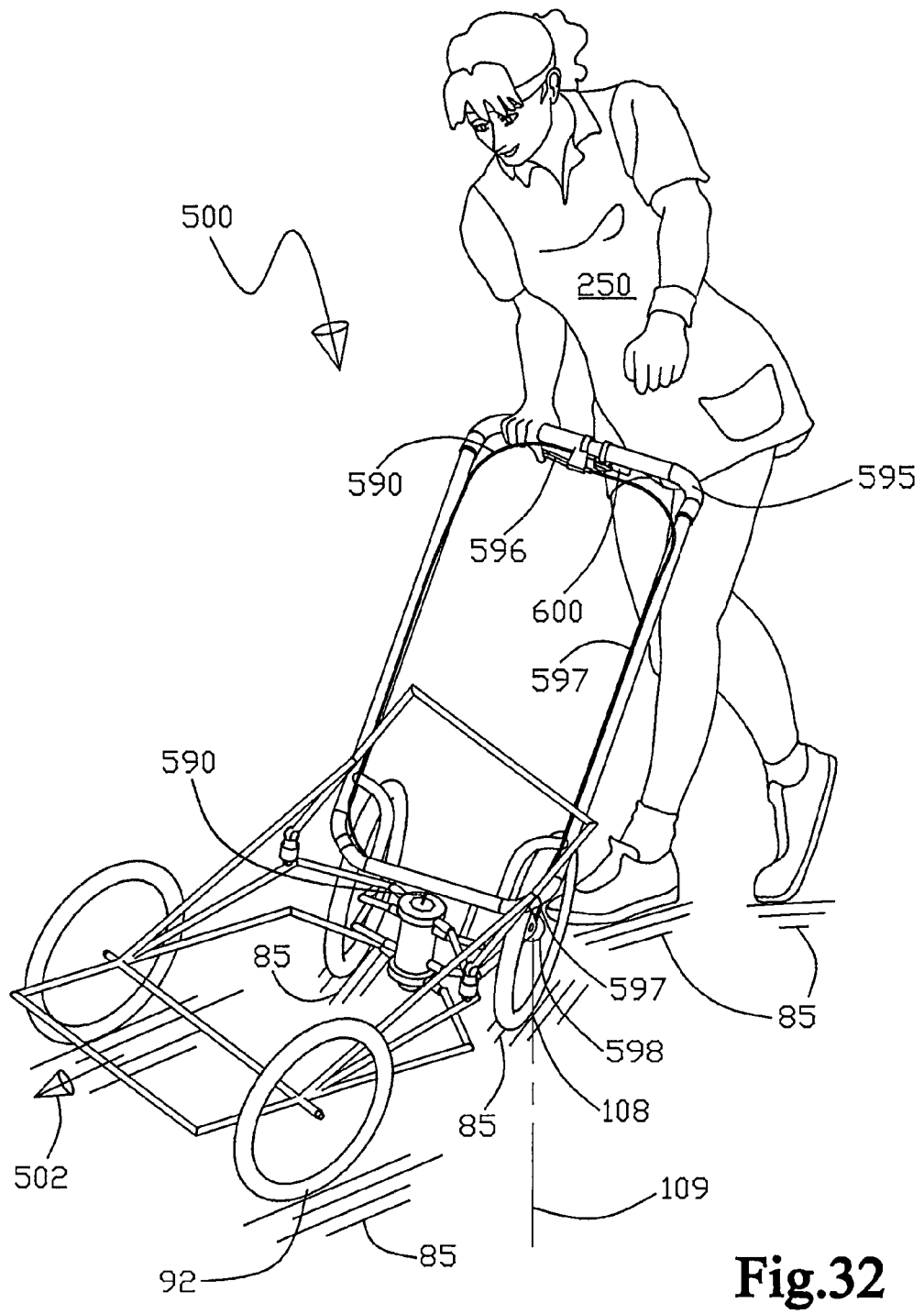
FIG. 32 shows a perspective use view of the articulated steerable carriage apparatus in the rear wheel turning embodiment manually being pushed at walking speed across a surface by a user in the turning mode.
Figure 33:
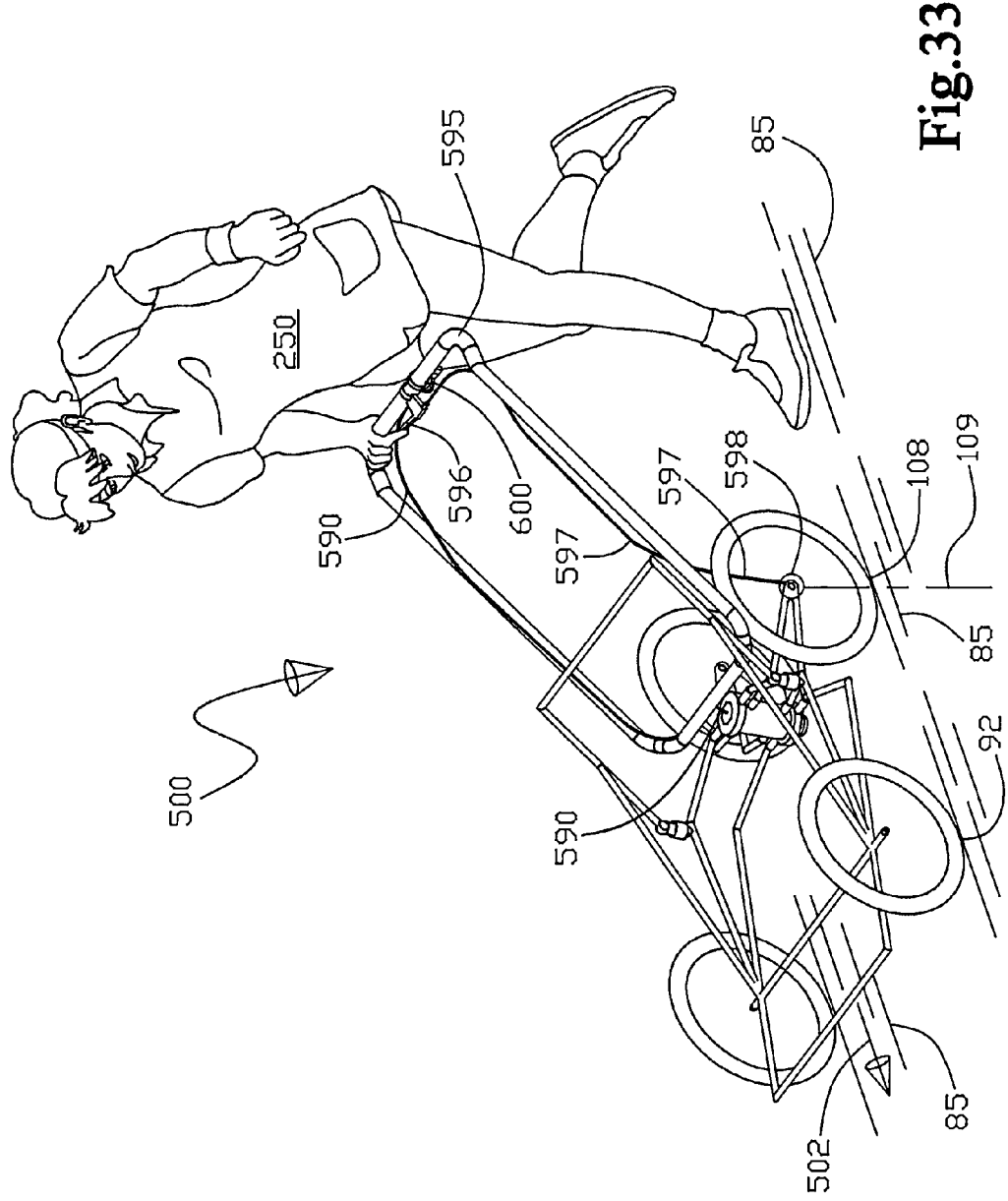
FIG. 33 shows a perspective use view of the articulated steerable carriage apparatus in the front wheel turning embodiment manually being pushed at jogging speed across a surface by a user in the non-turning mode.
Figure 34:
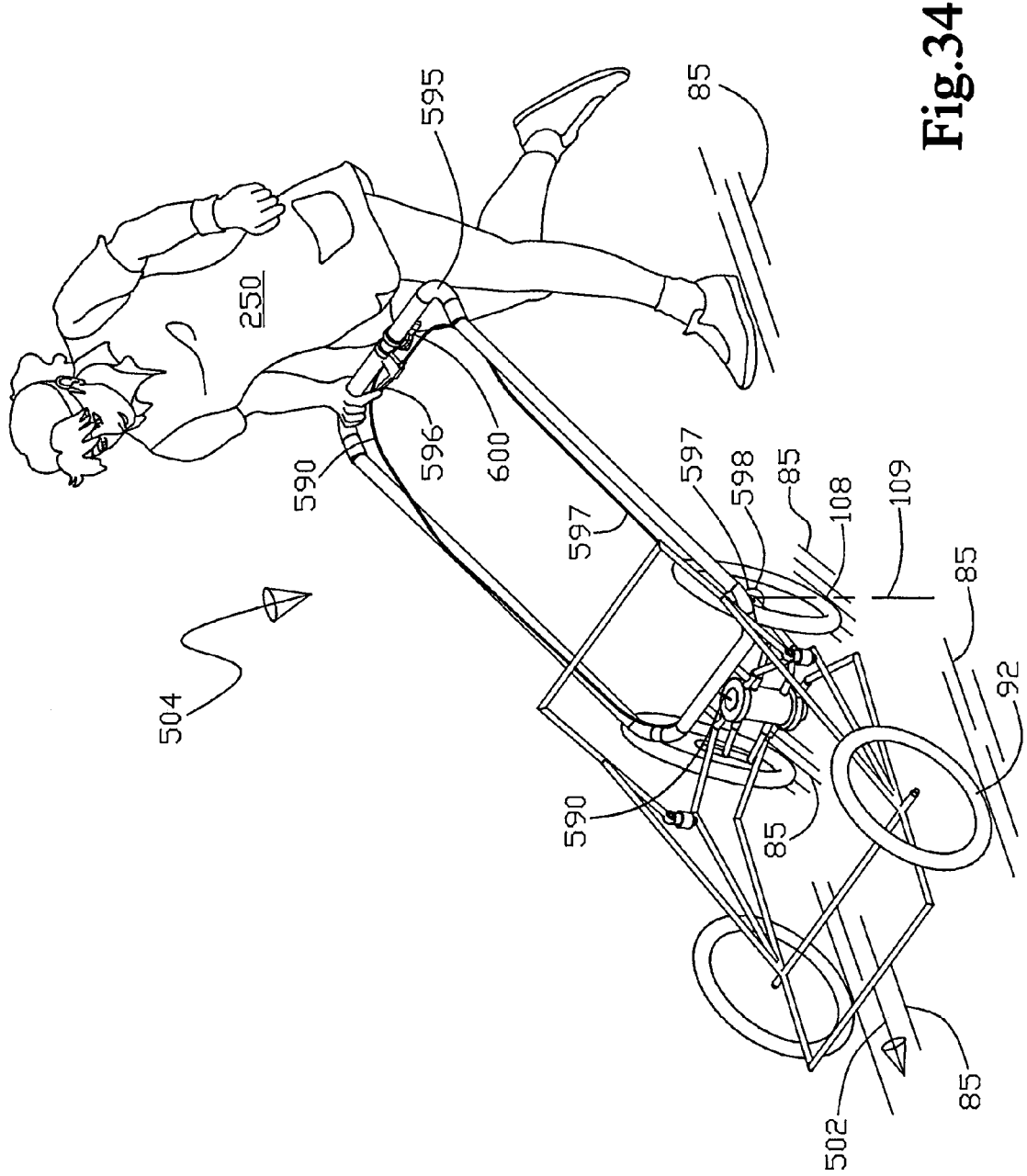
FIG. 34 shows a perspective use view of the articulated steerable carriage apparatus in the front wheel turning embodiment manually being pushed at jogging speed across a surface by a user in the turning mode.

Yet further, FIG. 29 shows a perspective view of the shuttle ring 522 including a control cable 590 and a swivel 592 for selectively placing the shuttle ring 522 in selected axial positions for the operational states identified in FIGS. 26, 27, and 28. Continuing FIG. 30 shows a top view of the shuttle ring 522 including a control cable 590 and a swivel 592 for selectively placing the shuttle ring 522 in selected axial positions for the operational states identified in FIGS. 26, 27, and 28. Further continuing, FIG. 31 shows a perspective use view of the articulated steerable carriage apparatus 500 in the rear wheel turning embodiment manually being pushed at jogging speed 502 across a surface 85 by a user 250 in the non-turning mode. Moving forward, FIG. 32 shows a perspective use view of the articulated steerable carriage apparatus 500 in the rear wheel turning embodiment manually being pushed at walking speed 502 across a surface 85 by a user 250 in the turning mode. Next, FIG. 33 shows a perspective use view of the articulated steerable carriage apparatus 504 in the front wheel turning embodiment manually being pushed at jogging speed 502 across a surface 85 by a user 250 in the non-turning mode. Continuing, FIG. 34 shows a perspective use view of the articulated steerable carriage apparatus 504 in the front wheel turning embodiment manually being pushed 502 at jogging speed across a surface 85 by a user 250 in the turning mode.

Figure 35:
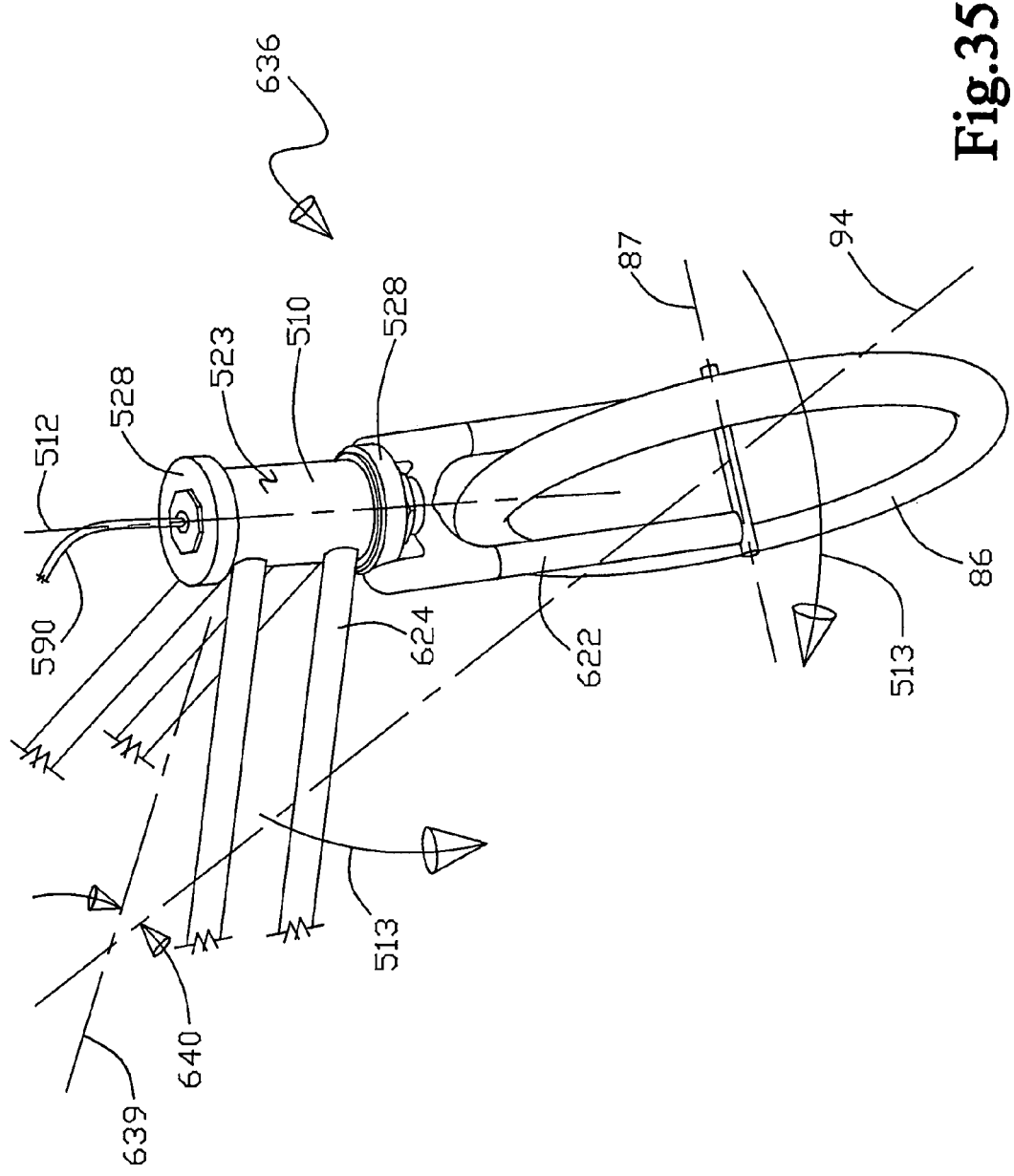
FIG. 35 shows a perspective view of the yoke utilized as a first rotating element steering control for the adapted carriage.
Figure 36:
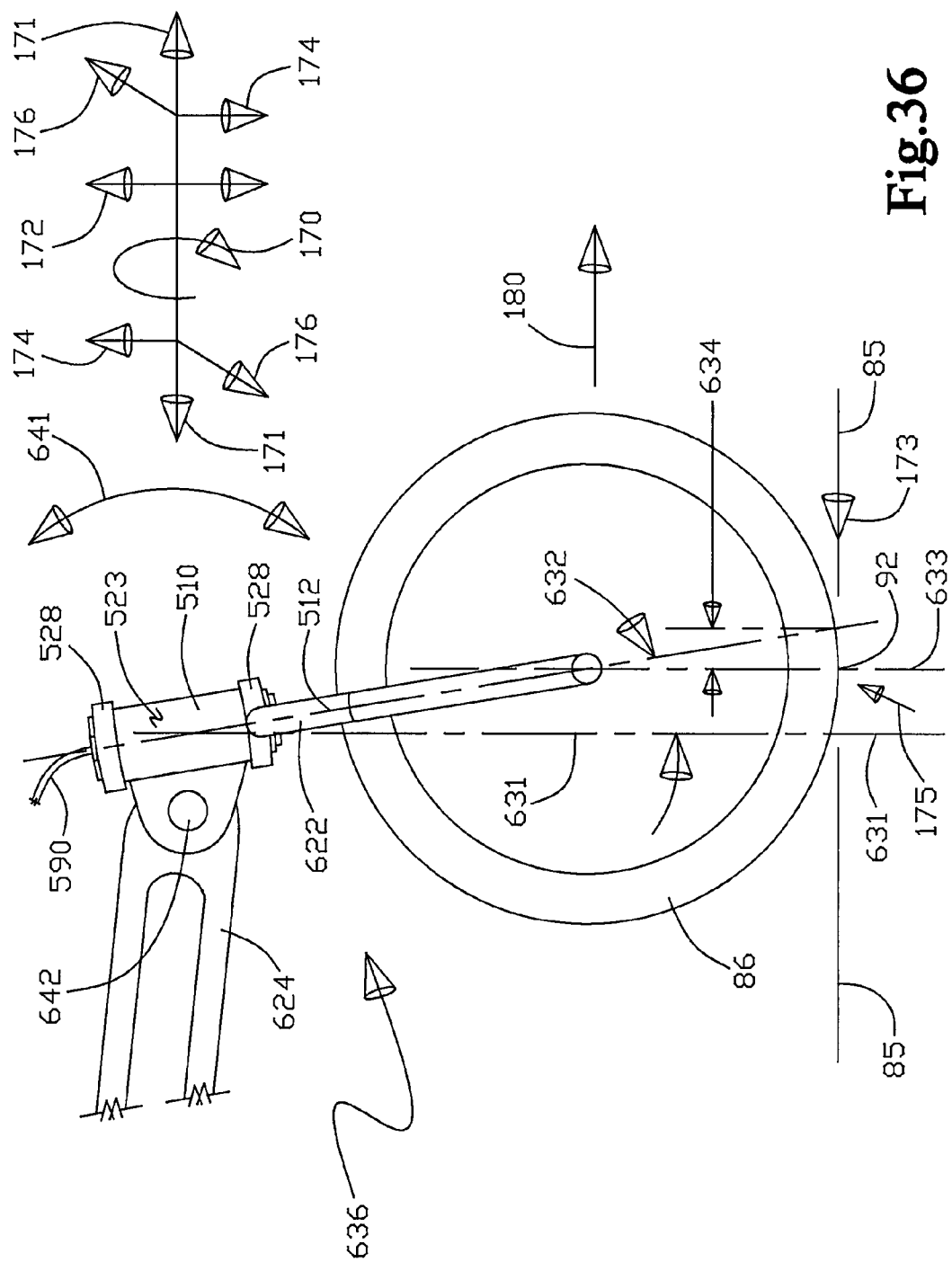
FIG. 36 shows a side view of the yoke utilized as a first rotating element steering control for the adapted carriage including a selectively lockable pivot that allows the rake angle to be adjusted.
Figure 37:
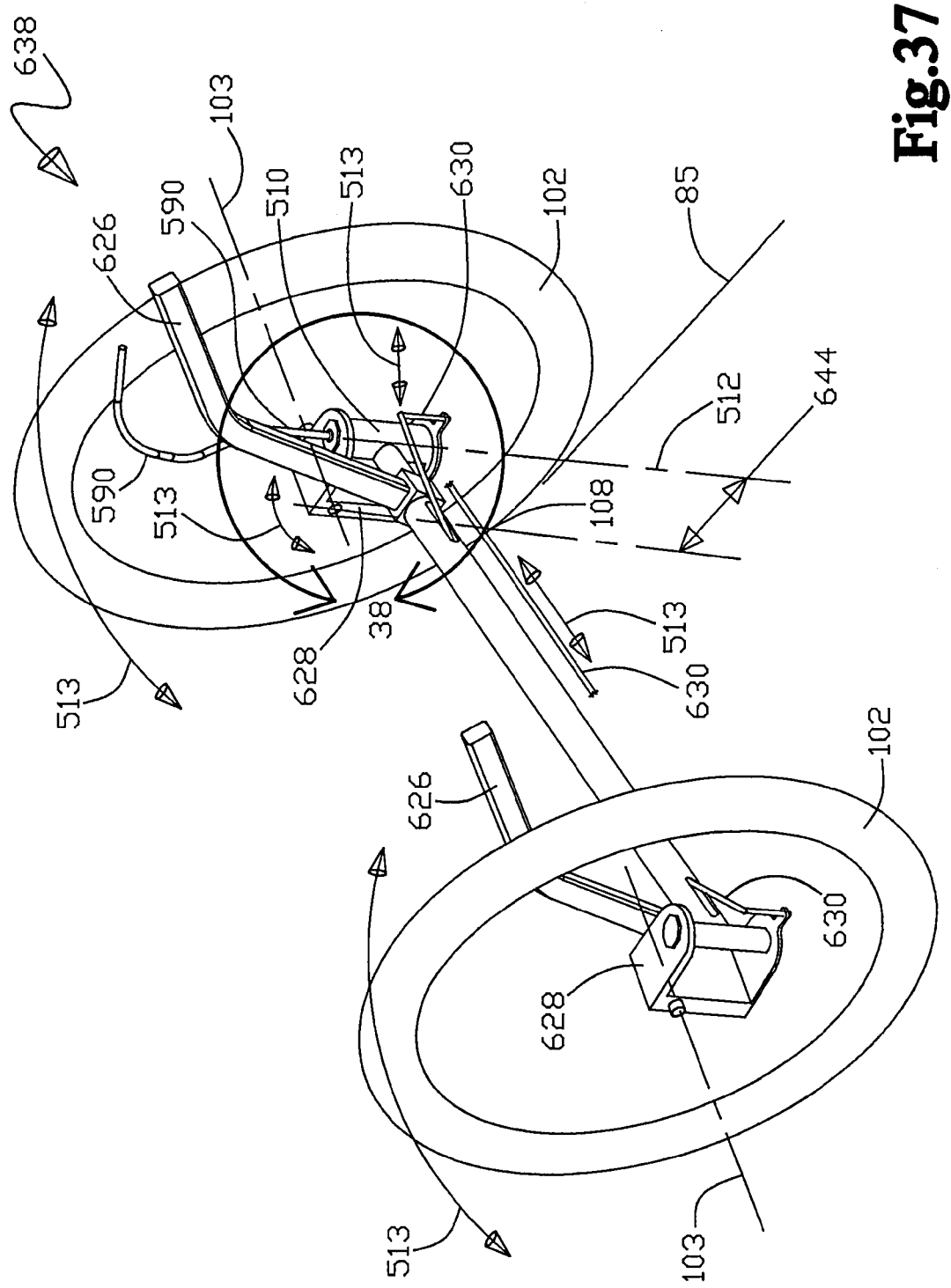
FIG. 37 shows a perspective view of the yoke utilized as a second rotating element steering control linking a pair of second rotating elements for the adapted carriage.
Figure 38:
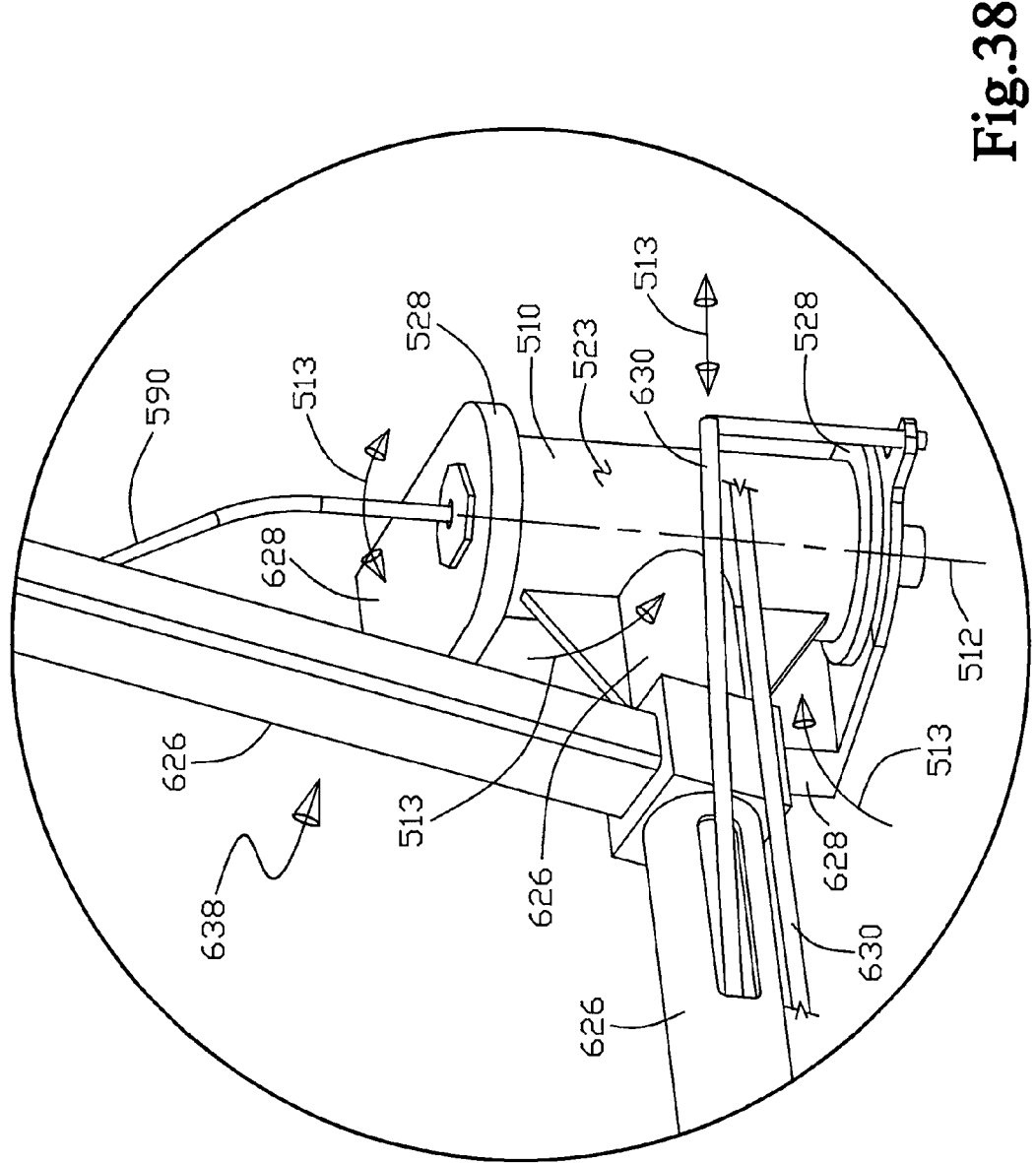
FIG. 38 shows an expanded view 38 from FIG. 38 showing a close up the yoke disposed adjacent to the adapted carriage.

Further continuing, FIG. 35 shows a perspective view of the yoke 510 utilized as a first rotating element 86 steering control for the adapted carriage 636 and FIG. 36 shows a side view of the yoke 510 utilized as a first rotating element 86 steering control for the adapted carriage 636 including a selectively lockable pivot 642 that allows the rake angle 632 to be adjusted. Next, FIG. 37 shows a perspective view of the yoke 510 utilized as a second rotating element 102 steering control linking 630 a pair of second rotating elements 102 for the adapted carriage 638 and FIG. 38 shows an expanded view 38 from FIG. 38 showing a close up the yoke 510 disposed adjacent to the adapted carriage 638.

Referring to FIGS. 1-10, broadly, the present invention of a steerable carriage apparatus 30 is for the user 250 to manually (see FIG. 10) transport a payload 84 (not shown) across a surface 85 at a velocity or speed relative to the surface 85 from a slow walk (1-2 miles per hour) to a fast jog or run (up to 15-20 miles per hour), with the steerable carriage apparatus 30 moving across the surface 85 in a substantially smooth and steerable manner due to the novel steerable apparatus 31, 32, 33, or 34 design. The steerable carriage apparatus 30 includes a frame assembly 70 that has a frame assembly 70 first end portion 73 and a frame assembly 70 second end portion 74, also included is a first rotating element 86 rotationally attached to the frame first end portion 73 and forming a first contact 92 on the surface 85. Additionally, included is an arm assembly 60 having a pivotal attachment 121 to the frame second end portion 74, the pivotal attachment 121 having a pivotal axis 114 that is at an obtuse angle 119 in relation to the surface 85. The pivotal attachment 121 is operational to allow pivotal movement 130 of the arm 60 in relation to the frame second end portion 74. A second rotating element 102 is included that is rotationally attached to the arm 60 and forming a second contact 108 on the surface 85, wherein the obtuse angle 119 is adjacent to the second contact 108, with the second rotating element 102 being steerable by the pivotal attachment 121 about the steering pivotal axis 114 resulting in steering movement 130. Alternatively, the frame 70 can include a hand grip portion 71, wherein the hand grip portion 71 extends from the frame 70 second end portion 74 being oppositely disposed from the frame 70 first end portion 73, as best shown in FIGS. 1 and 10.

Preferably, as applicable to the steerable carriage apparatus 30 or the steerable apparatus 31, 32, 33, or 34 (second rotating element 102 only), both the first rotating element 86 and the second rotating element 102 are conventional bicycle type wheels that include for the first rotating element 86 a first wheel hub 88 that is rotationally attached to the frame first end portion 73 about rotational axis 87, wherein the hub 88 has spokes 90 extending therefrom to a rim 98 that mounts a pneumatic tire 91. Correspondingly, the second rotating element 102 includes a second wheel hub 104 that is rotationally attached to the frame second end portion 74 about rotational axis 103, wherein the hub 104 has spokes 106 extending therefrom to a rim 113 that mounts a pneumatic tire 107. Also, preferably the first tire 91 size is a sixteen (16) inch diameter by one and three quarter (1¾) inch width, however, other rim sizes and widths for the first tire 91 would be acceptable. In accordance, preferably the second tire 107 size is a sixteen (16) inch diameter by one and three quarter (1¾) inch width, however, other rim sizes and widths for the second tire 107 would be acceptable. In addition, other configurations for the first rotating element 86 and the second rotating element 102 would be acceptable such as solid or spoked (could be webbed) plastic, composite, or metal wheels and solid rubber tires or any other alternatives that meet the functional requirements of the first rotating element 86 and the second rotating element 102. Additionally, the first wheel assembly 86 and the second wheel assembly 102 are preferably arranged in having a pair of first wheel assemblies 86 and a pair of second wheel assemblies 102, as best shown in FIGS. 1 and 10. Alternatively, the first wheel assembly 86 and the second wheel assembly 102 could each be singular on the carriage 30 apparatus or the steerable apparatus 31, 32, 33, or 34 (second rotating element 102 only) or more than two each of the first wheel assembly 86 and the second wheel assembly 102 on the carriage apparatus 30 or the steerable apparatus 31, 32, 33, or 34 (second rotating element 102 only) or in combination of a singular first rotating element 86 with a plurality of second rotating elements 102 or a singular second rotating element 102 with a plurality of first rotating elements 86.

Optionally, the steerable carriage apparatus 30 or the steerable apparatus 31, 32, 33, or 34 can further include a means 39 for urging the arm 60 into a non turning mode, as previously defined, through the pivotal movement 130, thus if the arm 60 pivots in pivotal movement 130 about the pivotal axis 114 that is angled by the acute rake angle 118 or obtuse rake angle 119 both in relation to surface 85 (as best shown in FIGS. 2, 4, and 6), the arm 60 will be urged to return to the straight ahead position or non turning mode either when the steerable carriage apparatus 30 not moving or is being in movement 180 (either direction) across the surface 85. Operationally, the means 39 assists in the steering correction from the turning mode as previously defined to the non turning mode, also as previously defined, whereas other geometric factors in the steering apparatus 31, 32, 33, or 34 that are active during movement 180 or the carriage 30 across the surface 85 also assist in urging the arm 60 to the non turning mode, as will be described later in the description. Also, operationally the means 39 can help overcome optional dampening of the pivotal movement 130 for the convenience of the user 250 in steering control especially at slower or lower speeds of walking fast or slow (1-4 miles per hour) of the carriage 30 across the surface 85. The means 39 is preferably a conventional lateral spring with a spring rate of sixty (60) pounds per inch, and is disposed between the arm 60 (pivotally moving 130) and the frame second end portion 74 (fixed), although other spring rates would be acceptable depending on the parameters of steering geometries, carriage 30 weight and size, carriage 30 speeds across the surface 85, and the like. Alternatively, a torsional spring could be used, or any other apparatus that could meet the functional requirements resulting in the user 250 having more convenient operation of the carriage 30, given the aforementioned spring rate parameters.

Also optionally, the steerable carriage apparatus 30 or the steerable apparatus 31, 32, 33, or 34 could further include a dampener 40, wherein the dampener is operational to dampen pivotal movement 130, being to lessen the effects of castor resonance 200 or what is termed shimmy of the second rotating element 102 while the carriage 30 is moved in movement 180 across the surface 85 in a non turning mode, as previously described or in a turning mode, also as previously described wherein the speed of the carriage 30 across the surface 85 is typically higher or faster from the user 250 jogging (about 5-20 miles per hour). The dampener 40 is preferably hydraulic having the moving rod extending through the dampener body type as is known in the art, having a dampening rate of about two (2) (pound-seconds) per foot, and is disposed between the arm 60 (pivotally moving 130) and the frame second end portion 74 (fixed), although other dampening rates would be acceptable depending on the parameters of steering geometries, carriage 30 weight and size, carriage 30 speeds across the surface 85, and the like. Alternatively, frictional, hydraulic, pneumatic, or any other dampener 40 types would be acceptable that could meet the functional requirements resulting in the user 250 having more convenient operation of the carriage 30, given the aforementioned dampening rate parameters.

Again, optionally the steerable carriage apparatus 30 or the steerable apparatus 31, 32, 33, or 34 could further include a variable dampener 42 that could be used either alone or in conjunction with the dampener 40, wherein the variable dampener 42 is operational to variably dampen the pivotal movement 130 in relation to a pivotal movement rate. In other words, a variable dampener 42 attempts to have a higher dampening rate at a high pivotal movement 130 rates and a lower dampening rate at a lower pivotal movement 130 rates to further optimize the carriage 30 steering control for the user 250. Wherein typically when the carriage 30 is pushed by the user 250 at the aforementioned higher speeds across the surface 85 usually results in faster steering movements and correspondingly higher pivotal movement 130 rates, higher dampening is usually desired and at the aforementioned lower speeds of the carriage 30 across the surface 85 lower dampening is usually desired to make the steering of the carriage 30 easier by the user 250 at the aforementioned lower speeds of the carriage 30 across the surface 85. The variable dampener 42 is preferably hydraulic having the moving rod extending through the dampener body type as is known in the art, having a dampening rate range of about one quarter (0.25) to five (5) (pound-seconds) per foot, and is disposed between the arm 60 (pivotally moving 130) and the frame second end portion 74 (fixed), although other dampening rate ranges would be acceptable depending on the parameters of steering geometries, carriage 30 weight and size, carriage 30 speeds across the surface 85, and the like. Alternatively, frictional, hydraulic, pneumatic, or any other variable dampener 42 types would be acceptable that could meet the functional requirements resulting in the user 250 having more convenient operation of the carriage 30, given the aforementioned dampening rate parameters.

Further, optionally the steerable carriage apparatus 30 or the steerable apparatus 31, 32, 33, or 34 could include a means 52 for manual selectable adjusting of the obtuse angle 119, wherein the means for adjusting the obtuse angle 119 is operational to optimize steering geometries, specifically trail 120, depending upon the desired usage of the carriage 30, that includes carriage 30 speed across the surface 85, surface 85 type (rough, smooth, etc.), size and weight of the carriage, and the like. Referring particularly to FIGS. 2 and 4, the manual selectable adjusting of the obtuse angle is accomplished by pivoting about axis 72 that effectively changes both the acute rake angle 118 and the obtuse rake angle 119 and the position of the contact patch 108 on the surface 85 along axis 171 parallel to the direction of carriage 30 travel. In other words, a larger obtuse rake angle 119 results in shifting the contact patch 108 on the surface away from axis 72 and having a reduced trail 120 when the arm 60 is in the non turning mode, as previously defined. Other steering geometries come into effect when the arm 60 is pivoted through movement 130 about axis 114 resulting in the turning mode as will be later described. Referring specifically to FIGS. 8 and 9, the means 52 is preferably accomplished by a positively locking and incremental angular apparatus about axis 72 that utilizes a rod 56 that inserts through a plurality of apertures 57 in an outer tube 53 and the rod 56 intersecting a plurality of apertures 58 in an inner tube 54 to positively lock a plurality of selectable angles of the obtuse rake angle 119. The inner tube 54 is a slip fit into the outer tube 53 allowing both axial movement 55 and rotational (angular) movement 59, wherein the rod 56 can preferably have a snap fit retention once inserted through both the apertures 57 and 58 by a spring loaded ball projecting from the rod 56 and the like, and with the rod 56 inserted through both apertures 57 and 58 (see FIG. 9) both axial movement 55 and rotational (angular) movement 59 are fixed. Note that in FIG. 9, the inner tube 54 is exposed for clarity only, normally the inner tube 54 is disposed within the outer tube 53 when the rod 56 is inserted through apertures 57 and 58. Alternative structure for the means 52 would be acceptable as long as the requirements of being able to positively lock a plurality of selectable angles of the obtuse rake angle 119 were met. Preferably the acute angle 118 is about 20-25 degrees resulting in the obtuse angle 119 being about 110-115 degrees, and thus equating to a trail 120 of about six (6) inches, with the aforementioned rake angles 118/119 and trail 120 measurements taken when the turn angle 186 substantially equals zero. However, acute angles 118 and the resulting obtuse angles 119 and the resultant trail 120 range could be more or less than the aforementioned ranges depending upon the parameters of the optional use of the means for urging 39 and the spring rates or strength, optional use of either dampening 40 or variable dampening 42 and the dampening rates, carriage 30 weight and size, carriage 30 speeds across the surface 85, and the like would be acceptable that could meet the functional requirements resulting in the user 250 having more convenient operation of the carriage 30, given the aforementioned parameters.

Referring in particular to FIGS. 2 and 3, and as applicable to the steerable carriage apparatus 30 or the steerable apparatus 31, 32, 33, or 34, the arm 60 is a fixed arm 61, wherein in utilizing the means 52 for manual selectable adjusting of the obtuse angle 119 about axis 72 results in a distance 188 increasing or decreasing relative to the surface 85, in other words when the obtuse angle 119 is increased, distance 188 decreases, conversely when obtuse angle 119 is decreased, distance 188 increases. Whenever distance 188 changes, the frame 70 height above the surface 85 changes and will pivot about the first rotating element 86 rotational axis 87 (in a pitch movement 174) tending to cause an angular positioning of the carriage 30 relative to the surface 85. For smaller changes of the obtuse angle 119 this angular positioning of the carriage 30 will be acceptable, however, for larger changes of the obtuse angle 119 the angular positioning of the carriage 30 may be excessive and thus it would be desirable to have distance 188 remain substantially unchanged when the obtuse angle 119 is changed. To accomplish this the optional use of the adjustable arm 62 is utilized as shown in FIGS. 4, 5, 6, and 7, wherein the obtuse angle 119 can be selectably changed while the distance 188 remains substantially unchanged, while still facilitating a selectable change in trail 120 coinciding with a selectable change in obtuse angle 119 that may be desirable due to the aforementioned parameters. The adjustable arm 62 utilizes a first pivot 63 adjacent to one end of the pivotal axis 114 and a second pivot 64 adjacent to an opposing end of the pivotal axis 114, wherein the first pivot 63 connects to a first fork 65 on one end and the first fork 65 opposing end connects to the second rotational element 102 at the rotational axis 103. Further, a second fork 69 connects to the second pivot 64 on one end and the second fork 69 opposing end connects to the first fork 65 through a slidable engagement 99 as best shown in FIGS. 4, 5, 6, and 7. Thus, resulting in a selectable change of the obtuse angle 119 without a substantial change in distance 188.

Continuing, referring to FIGS. 2, 3, 4, 5, 6, 10, 18, and 19 optionally the steerable carriage apparatus 30 or the steerable apparatus 31, 32, 33, or 34 can further include a means 80 for manual selectable substantial restriction of the pivotal movement 130, the purpose of this optional capability is for the situation wherein the carriage 30 is lifted up over curbs, steps, and the like, or additionally when the user 250 is manually pushing the carriage 30 straight ahead along the surface 85, such that the turn angle 186 substantially equals zero. The user 250 would push downward on the handle portion 71 toward the surface 85 to elevate the first rotating element 86 up onto the curb for instance while at the same time pivoting upon the surface 85 on the second rotating element 102, this situation can possibly cause an instability in yaw 176 movement as the pivotal movement 130 about the pivotal axis 114 can allow free yaw 176 movement while the carriage 30 is balanced on the surface 85 solely on the second rotating element 102, thus it could be preferable for the user 250 to selectably substantially restrict the pivotal movement 130 about the axis 114. The means 80 is preferably accomplished by what is shown in FIGS. 18 and 19 primarily and what is shown in FIGS. 2, 3, 4, 5, and 6 with means 80 integrated into the steerable carriage apparatus 30 or the steerable apparatus 31, 32, 33, or 34. A pin 43 has a slip fit into pivotal aperture 45 and continues into fixed aperture 44, when the pin 43 is inserted through aperture 45 onward through aperture 44 (in going from FIG. 18 to FIG. 19) pivotal movement 130 is restricted, wherein pivotal movement 130 is free to move in FIG. 18 and pivotal movement 130 is restricted in FIG. 19. Alternative structure for accomplishing means 80 would be acceptable, such as a pawl and/or pendulum remaining plumb disposed on the frame 70 that reacts to the force of gravity as an activating mechanism when the user 250 pushes on the handle portion 71 with their hand 215 toward the surface 85 as previously described, or any other structure that functionally meets the aforementioned functional requirements. Yet, further optionally in referring to FIG. 10, the steerable carriage apparatus 30 can further include a means 75 for an automatic conditional substantial restriction of a first rotating element 86 rotational movement 89 or alternatively or in conjunction a means 76 for an automatic conditional substantial restriction of a second rotating element 102 rotational movement 105 as applicable to the steerable carriage apparatus 30 or the steerable apparatus 31, 32, 33, or 34. The purpose of means 75 and/or means 76 is what is termed as the "Dead Man Brake" in the art wherein if the user 250 of the carriage 30 where to trip or fall or simply leave the carriage 30 unattended, which in any case would result in the user 250 not having their hand 215 securely grasping the carriage 30 handle portion 71 to keep the carriage 30 under control, the carriage 30 would be restricted in its ability to have movement 180 along the surface 85 without the user 250 having a secure grasp on the handle portion 71 from their hand 215 for enhanced safety reasons. Thus, if the user 250 losses control of the carriage 30, the restriction of rotational movement 89 of the first rotating element 86 and/or restriction of rotational movement 105 of the second rotational element 102 would automatically be initiated. The means 75 is preferably accomplished by a conventional wheel brake as is known in the art to restrict rotational movement 89 of the first rotating element 86, wherein the brake is activated by the user 250 losing or removing their hand 215 grip on the carriage 30 handle portion 71 or an equivalent structure to indicate the user not being in control of the steerable apparatus 31, 32, 33, or 34. Alternative structure for accomplishing means 75 would be acceptable that functionally meets the aforementioned situational requirements. The means 76 is preferably accomplished by a conventional wheel brake as is known in the art to restrict rotational movement 105 of the second rotating element 102, wherein the brake is activated by the user 250 losing or removing their hand 215 grip on the carriage 30 handle portion 71 or an equivalent structure to indicate the user not being in control of the steerable apparatus 31, 32, 33, or 34.

Alternative structure for accomplishing means 76 would be acceptable that functionally meets the aforementioned situational requirements.

As an optional retrofit structure, the steerable apparatus 31, 32, 33, or 34 and in referring to FIGS. 2-9, the steerable apparatus 31, 32, 33, and 34 can be adapted to attach to an existing carriage 35 that either has no steering capabilities or having the prior art castor 300 type steering wherein the turning pivotal axis 316 is perpendicular to the surface 85, by replacing the carriage 35 existing rear set of wheels with the steerable apparatus being either steerable apparatus 31, 32, 33, or 34. Thus, in retro fitting an existing carriage 35, which is defined as the carriage 30 less the existing rear set of wheels, can be enhanced by adding the steerable apparatus 31, 32, 33, or 34 for the user 250 to manually (see FIG. 10) transport a payload 84 (not shown) across the surface 85 at a velocity or speed relative to the surface 85 from a slow walk (1-2 miles per hour) to a fast jog or run (up to 20 miles per hour), with the steerable carriage apparatus 35 moving across the surface 85 in a substantially smooth and steerable manner due to the novel steerable apparatus 31, 32, 33, or 34 design. The steerable apparatus 31, 32, 33, or 34 includes a structure assembly 66 that has a structure assembly 66 first end portion 67 and a structure assembly 66 second end portion 68. Additionally, included is an arm assembly 60 having a pivotal attachment 121 to the structure second end portion 68, the pivotal attachment 121 having a pivotal axis 114 that is at an obtuse angle 119 in relation to the surface 85. The pivotal attachment 121 is operational to allow pivotal movement 130 of the arm 60 in relation to the structure second end portion 68. A second rotating element 102 is included that is rotationally attached to the arm 60 and forming a second contact 108 on the surface 85, wherein the obtuse angle 119 is adjacent to the second contact 108, with the second rotating element 102 being steerable by the pivotal attachment 121 about the steering pivotal axis 114 resulting in steering movement 130.

As an alternative embodiment, the articulated steerable carriage apparatus 500 and 504 as generally shown in FIGS. 20-25 for structure and in FIGS. 31-34 for use is disclosed for manually transporting 502 a payload 84 (not shown for pictorial clarity) across a surface 85, includes specifically for the steerable carriage apparatus 500 as best shown in FIGS. 20-22 for structure and FIGS. 31 and 32 for use that places the handlebar 595 as being adjacent to the second frame portion 508 for rear wheel steering, see FIG. 32 for the best example, as compared to the articulated steerable carriage 504 that has the handlebar 595 adjacent to the first frame portion 506 for front wheel steering as best shown structurally in FIGS. 23 and 24 and use wise in FIGS. 33 and 34, with the front wheel steering best shown in FIG. 34. Thus the following disclosure related to the remainder of the articulated steerable carriage apparatus 500 applies equally well to the articulated steerable carriage apparatus 504. The articulated steerable carriage apparatus 500 has the payload 84 (not shown) carried by a frame 610 having a pivotal connection 612 from the frame 610 to the first frame portion 506. As a dynamic connection between the frame 610 and the first frame portion a shock absorber 614 spring/damper unit absorbs a portion of the movement between the first frame portion 506 and the frame 610 to cushion the payload from excessive shock from undulations in the surface 84 as the carriage 500 or 504 moves 502 across the surface 85.

The articulated steerable carriage apparatus 500 basically includes the first frame portion 506, the second frame portion 508, and the yoke assembly 510. The steerable carriage apparatus 500 yoke assembly 510 further includes a pivotal axial axis 512, with the yoke assembly 510 being disposed adjacent to the first frame portion 506 and the second frame portion 508, with the yoke 510 facilitating pivotal movement 513 about the pivotal axial axis 512 between the first frame portion 506 and the second frame portion 508. Also included in the steerable carriage apparatus 500 is the first rotating element 86 rotationally attached to the first frame portion 506 and forming a first contact 92 on the surface 85 and furthermore the second rotating element 102 is rotationally attached to the second frame portion 508 forming a second contact 108 on the surface 85, with the second rotating element 102 and the second frame portion 508 being operational to be steerable through the pivotal movement 513 as best shown in comparing FIGS. 20 and 21.

Optionally, the articulated steerable carriage apparatus 500 can further include a handlebar 595 that is adjacent to the second frame portion 508, wherein the handlebar 595 is operational to steer the second rotating element 102 through pivotal movement 513 as best shown in FIG. 21 and FIG. 32 being in use. A further option for the articulated steerable carriage apparatus 500 is to further include a means 596 for an automatic conditional substantial rotational restriction of the second rotating element 102 rotational movement 105. Continuing, the steerable carriage apparatus 500 means 596 for an automatic conditional substantial rotational restriction is a control 596 adjacent to the handlebar 595 that must have a compressive grasp by the user 250, see FIGS. 31 and 32, for free rotation 105 of the second rotating element 102, wherein operationally if the user 250 releases the grasp then the second rotational element 102 has substantial rotational 105 restriction. Thus the means 596 is commonly known as a "dead man brake" and is an ancillary safety feature should the user 250 trip and fall losing their grip on the handle 595 potentially allowing the articulated steerable carriage apparatus 500 to freely move 502 across the surface 85 without control by the user 250 and automatically causing the articulated steerable carriage apparatus 500 to cease movement 502 across the surface 85. Preferably, the means 596 in accomplished by a conventional squeeze handle for use with a handle bar 595 actuated through a cable 597 to a conventional wheel 102 brake 598, or any other alternative that accomplishes the aforementioned functional requirements for the means 596.

As a further optional operational control and referring in particular to FIGS. 26, 27, and 28 for cross sections of the yoke assembly 510, the articulated steerable carriage apparatus 500 can further include a means 516 for urging the first frame portion 506 and the second frame portion 508 into a non-turning mode, as best shown in FIG. 20. Preferably the means 516 for urging the first frame portion 506 and the second frame portion 508 into a non-turning mode includes a torsional spring pack 520 that is in rotational engagement contact with the shuttle ring 522 that is disposed within the yoke assembly 510. Also preferably the shuttle ring 522 further includes an extension 527 that is selectively axially movable 538 along the yoke axial axis 512, as this is the distinction between FIGS. 26, 27, and 28 being the different axial positions of the shuttle ring 522 through movement 538. Wherein operationally the extension 527 selectively has the rotational engagement contact with the torsional spring pack 520 to place the yoke 510 in a biased state or urging state to urge through the pivotal movement 513 the first frame portion 506 and the second frame portion 508 are moved into the non-turning mode, as best shown in FIG. 27 resulting in the biased or urged state 618. The spring pack 520 is rotationally engaged to the outer tube 523 to create the relative pivotal movement 513 between the spring pack 520 and the shuttle ring 522, which utilizes a web 525 as discussed below to couple the rotational movement of the shuttle ring 522 to the inner tube 526. The extension 527 being selectively axially movable 538 to not have the rotational engagement contact with the torsional spring pack 520, as best shown in FIG. 28, thus creating the free pivotal movement state 620 to place the yoke 510 in a non-biased or non-urged state to not urge through the pivotal movement 513 the first frame portion 506 and the second frame portion 508 into the non-turning mode. The yoke 510 also includes neck bearings 530 that facilitate the pivotal movement between the inner tube 526 and the outer tube 523 and outer bracket 528 combination that is axially clamped by retaining nuts set 532. Preferably the neck bearing 530 is a three inch diameter, however other sizes are acceptable as per the required function.

Continuing, in referring specifically to FIGS. 29 and 30, the shuttle ring 522 further includes a web 525 that is rotationally engaged against the pivotal movement 513 relative to a yoke inner tube 526. Wherein the web 525 is disposed within an elongated slot type aperture 529 in the inner tube 526 that is operational to allow selectable axial movement 538 of the shuttle ring 522 along the yoke 510 axial axis 512 while limiting the shuttle ring 522 rotational movement about axis 512 relative to the inner tube 526 to further allow the extension 527 to be selectively axially movable 538 along the yoke 510 axial axis 512. Thus the rotational movement of the shuttle ring 522 about axis 512 is limited the same as the inner tube 526 being rotationally engaged to the outer bracket 528 which is rotationally engaged to the first frame portion 506. Further as another option, the articulated steerable carriage apparatus 500 can have the selectably axially movable 538 shuttle ring 522 and extension 527 includes structure 600 to be remotely controlled from the handlebar 595 by a user 250 as shown in FIGS. 20 and 21, also FIGS. 31 and 32, this structure to be remotely controlled preferably includes a control 600 similar to a conventional handlebar lever mounted on the handlebar 595 that is connected through a cable 590 going through a bushing 602 on the yoke 510 as best shown in FIGS. 26, 27, and 28 with the cable 590 connecting to the shuttle ring 522 web 525 at the attachment 594 utilizing a swivel 592 that allows the shuttle ring to have some pivotal movement 513 relative to the cable 590 to effectuate user 250 handlebar 595 controlled movement 538 of the shuttle ring 522 disposed within the yoke assembly 510. Other structure to effectuate the above mentioned control 600 would be acceptable as long as the disclosed functional requirement is achieved.

An additional option for the steerable carriage apparatus 500 yoke assembly 510 is a selectable means 518 for substantially locking and unlocking the pivotal movement 513. The means 518 is preferably accomplished by including the shuttle ring 522 that selectively removably engages and disengages an outer tube 523 of the yoke 510 as best shown in FIGS. 26 and 27. Further, the shuttle ring 522 includes a frustoconical outside diameter 531 that selectively removably engages and disengages a mating frustoconical inside diameter 533 of the outer tube 523. Thus as best shown in FIG. 26 the frustoconical outside diameter 531 is selectively removably engaged to the frustoconical inside diameter 533 of the outer tube 523, effectively substantially restricting pivotal movement 513 and subsequently relative movement between the first frame portion 506 and the second frame portion 508. This creates the pivotally locked state 616 as shown in FIG. 26. The means 518 is further facilitated by the previously described shuttle ring 522 further including a web 525 that is rotationally engaged against the pivotal movement 513 relative to the yoke inner tube 526, wherein the web 525 is disposed within the elongated slot type aperture 529 in the inner tube 526 that is operational to allow selectable axial movement 538 of the shuttle ring 522 along the yoke 510 axial axis 512 while limiting the shuttle ring 522 rotational movement relative to the inner tube 526 to further allow the frustoconical outside diameter 531, which is rotationally engaged by ring 524 to the outer tube 523 to removably engage the mating frustoconical inside diameter 533, thus allowing free pivotal movement 513 as best shown in FIGS. 27 and 28. Other structure to accomplish the aforementioned means 518 would be acceptable if it meets the described functional requirements.

Further, an option is possible for the articulated steerable carriage apparatus 500 for the selectable means 518 for substantially locking the pivotal movement 513 includes an element 600 to be remotely controlled from the handlebar 595 by the user 250 as shown in FIGS. 20 and 21, also FIGS. 31 and 32, this structure to be remotely controlled preferably includes a control 600 similar to a conventional handlebar lever mounted on the handlebar 595 that is connected through a cable 590 going through a bushing 602 on the yoke 510 as best shown in FIGS. 26, 27, and 28 with the cable 590 connecting to the shuttle ring 522 web 525 at the attachment 594 utilizing a swivel 592 that allows the shuttle ring to have some pivotal movement 513 relative to the cable 590 to effectuate user 250 handlebar 595 controlled movement 538 of the shuttle ring 522 disposed within the yoke assembly 510 for the purpose of the selectable means 518 for substantially locking the pivotal movement 513. As can be deducted at this point the handlebar 595 mounted control 600 could be combined or separate for the user 250 in selectively controlling either of both the means 516 and/or means 518 as previously described. Thus in either control 600 case the yoke 510 uses a spring 534 that acts as a means for urging between a slip joint 536 and the shuttle ring 522 first into engagement with the torsional spring pack 520 for urging pivotal movement and then continuing onto substantially locking pivotal movement 513 be engaging the frustoconical outer diameter 531 and the frustoconical inner diameter 533, wherein the cable 590 opposing the spring 534 urging by axially holding a position along the axis 512 for the shuttle ring 522 to achieve the three operational states as previously described for FIGS. 26, 27, and 28. Other structure to accomplish the aforementioned yoke assembly 510 functions would be acceptable as long as the previously described yoke 510 functions were substantially complied with. The articulated steerable carriage apparatus 500 can also further include a plurality of first rotating elements 86 and independently include a plurality of second rotating elements 102.

As a further additional embodiment, in referring specifically to FIGS. 35 and 36, the yoke 510 can be adapted to the steerable carriage apparatus 636 for the first rotating element 86 that includes a head frame portion 624 and a fork 622 for manually transporting a payload 84 across a surface 85 that includes the yoke assembly 510. The yoke assembly 510 further includes a pivotal axial axis 512, with the yoke assembly 510 being disposed adjacent to the head frame portion 624 and the fork 622, with the yoke 510 facilitating pivotal movement 513 about the pivotal axial axis 512 between the head frame portion 624 and the fork 622, Also included in the adapted steerable carriage apparatus 636 is the first rotating element 86 rotationally attached to the fork 622 and forming a first contact 92 on the surface 85, with the first rotating element 86 being operational to be steerable through the pivotal movement 513 as best shown in comparing FIG. 35. Wherein the pivotal movement 513 results in particular turn angles 640 as referenced to the central axis 639 of the head frame portion 624 as seen in FIG. 35. Also, a trail distance 634 is measure from the first rotating element 86 contact patch 92 at axis 633 perpendicularly intersecting the surface 85 and the intersection of the axis 512 and the surface 85.

In referring in particular to FIGS. 26, 27, and 28 for cross sections of the yoke assembly 510, the adapted steerable carriage apparatus 636 further includes a means 516 for urging the head frame portion 624 and the fork 622 into a non-turning mode, as best shown in FIG. 36. Preferably the means 516 for urging the head frame portion 624 and the fork 622 into a non-turning mode includes a torsional spring pack 520 that is in rotational engagement contact with the shuttle ring 522 that is disposed within the yoke assembly 510. Also preferably the shuttle ring 522 can further include an extension 527 that is selectively axially movable 538 along the yoke axial axis 512, as this is the distinction between FIGS. 26, 27, and 28 being the different axial positions of the shuttle ring 522 through movement 538. Wherein operationally the extension 527 selectively has the rotational engagement contact with the torsional spring pack 520 to place the yoke 510 in a biased state or urging state to urge through the pivotal movement 513 the head frame portion 624 and the fork 622 are moved into the non-turning mode, as best shown in FIG. 36 resulting in the biased or urged state 618, see FIG. 27 for the yoke 510 detail. The spring pack 520 is rotationally engaged to the outer tube 523 to create the relative pivotal movement 513 between the spring pack 520 and the shuttle ring 522, which utilizes a web 525 as discussed below to couple the rotational movement of the shuttle ring 522 to the inner tube 526. The extension 527 being selectively axially movable 538 to not have the rotational engagement contact with the torsional spring pack 520, as best shown in FIG. 28, thus creating the free pivotal movement state 620 to place the yoke 510 in a non-biased or non-urged state to not urge through the pivotal movement 513 the head frame portion 624 and the fork 622 into the non-turning mode. The yoke 510 also includes neck bearings 530 that facilitate the pivotal movement between the inner tube 526 and the outer tube 523 and outer bracket 528 combination that is axially clamped by retaining nuts set 532. Preferably the neck bearing 530 is a three inch diameter; however other sizes are acceptable as per the required function.

Continuing, in referring specifically to FIGS. 29 and 30, the shuttle ring 522 further includes a web 525 that is rotationally engaged against the pivotal movement 513 relative to a yoke inner tube 526. Wherein the web 525 is disposed within an elongated slot type aperture 529 in the inner tube 526 that is operational to allow selectable axial movement 538 of the shuttle ring 522 along the yoke 510 axial axis 512 while limiting the shuttle ring 522 rotational movement about axis 512 relative to the inner tube 526 to further allow the extension 527 to be selectively axially movable 538 along the yoke 510 axial axis 512. Thus the rotational movement of the shuttle ring 522 about axis 512 is limited the same as the inner tube 526 being rotationally engaged to the outer bracket 528 which is rotationally engaged to the head frame portion 624. Further as another option, the adapted steerable carriage apparatus 636 can have the selectably axially movable 538 shuttle ring 522 and extension 527 includes structure 590 to be remotely controlled by a user 250 as shown in FIGS. 35 and 36. Preferably the structure 590 is a cable 590 going through a bushing 602 on the yoke 510 as best shown in FIGS. 26, 27, and 28 with the cable 590 connecting to the shuttle ring 522 web 525 at the attachment 594 utilizing a swivel 592 that allows the shuttle ring to have some pivotal movement 513 relative to the cable 590 to effectuate user 250 controlled movement 538 of the shuttle ring 522 disposed within the yoke assembly 510. Other structure to effectuate the above mentioned control 590 would be acceptable as long as the disclosed functional requirements are achieved.

An additional option for the adapted steerable carriage apparatus 636 yoke assembly 510 is a selectable means 518 for substantially locking and unlocking the pivotal movement 513. The means 518 is preferably accomplished by including the shuttle ring 522 that selectively removably engages and disengages an outer tube 523 of the yoke 510 as best shown in FIGS. 26 and 27. Further, the shuttle ring 522 includes a frustoconical outside diameter 531 that selectively removably engages and disengages a mating frustoconical inside diameter 533 of the outer tube 523. Thus as best shown in FIG. 26 the frustoconical outside diameter 531 is selectively removably engaged to the frustoconical inside diameter 533 of the outer tube 523, effectively substantially restricting pivotal movement 513 and subsequently relative movement between the first frame portion 506 and the second frame portion 508. This creates the pivotally locked state 616 as shown in FIG. 26. The means 518 is further facilitated by the previously described shuttle ring 522 further including a web 525 that is rotationally engaged against the pivotal movement 513 relative to the yoke inner tube 526, wherein the web 525 is disposed within the elongated slot type aperture 529 in the inner tube 526 that is operational to allow selectable axial movement 538 of the shuttle ring 522 along the yoke 510 axial axis 512 while limiting the shuttle ring 522 rotational movement relative to the inner tube 526 to further allow the frustoconical outside diameter 531, which is rotationally engaged by ring 524 to the outer tube 523 to removably engage the mating frustoconical inside diameter 533, thus allowing free pivotal movement 513 as best shown in FIGS. 27 and 28. Other structure to accomplish the aforementioned means 518 would be acceptable if it meets the described functional requirements.

Further, an option is possible for the adapted steerable carriage apparatus 636 for the selectable means 518 for substantially locking the pivotal movement 513 includes an element 590 to be remotely controlled by the user 250 as shown in FIGS. 35 and 36, this structure to be remotely controlled preferably includes a cable 590 going through a bushing 602 on the yoke 510 as best shown in FIGS. 26, 27, and 28 with the cable 590 connecting to the shuttle ring 522 web 525 at the attachment 594 utilizing a swivel 592 that allows the shuttle ring to have some pivotal movement 513 relative to the cable 590 to effectuate user 250 controlled movement 538 of the shuttle ring 522 disposed within the yoke assembly 510 for the purpose of the selectable means 518 for substantially locking the pivotal movement 513. As can be deducted at this point the control 590 could be combined or separate for the user 250 in selectively controlling either of both the means 516 and/or means 518 as previously described. Thus in either control 590 case the yoke 510 uses a spring 534 that acts as a means for urging between a slip joint 536 and the shuttle ring 522 first into engagement with the torsional spring pack 520 for urging pivotal movement and then continuing onto substantially locking pivotal movement 513 be engaging the frustroconical outer diameter 531 and the frustroconical inner diameter 533, wherein the cable 590 opposing the spring 534 urging by axially holding a position along the axis 512 for the shuttle ring 522 to achieve the three operational states as previously described for figures 26, 27, and 28. Other structure to accomplish the aforementioned yoke assembly 510 functions would be acceptable as long as the previously described yoke 510 functions were substantially complied with.

An alternate option for the adapted steerable carriage apparatus 636 in referring specifically to FIG. 36 is to further comprise a selectively lockable pivot 642 disposed between the yoke assembly 510 and the head frame portion 624, wherein the selectively lockable pivot 642 is operational to allow a rake angle 632 to be selectively adjustable, with the selectively lockable pivot having movement 641 with the rake angle 632 formed between the yoke pivotal axial axis 512 and an axis 631 that is substantially perpendicular to the surface 85. The selectively lockable pivot 642 can be a conventional pin pivot type similar to a door hinge with a lock to effectuate restriction of the pivotal movement 641 that can be an additional pin transverse to the conventional pin pivot or a compression clamp or any other structure to accomplish the aforementioned lockable pivot 642 functions. Note that the adapted carriage 636 is primarily designed to be a retrofit for an existing carriage already having the head frame portion 624 and the fork 622 with the first rotating element 86, wherein the yoke assembly 510 is added to the existing carriage 636 to further add control to the steering 513 function to the existing carriage by way of the selectively controllable means 516 and/or 518.

Further, for another alternative embodiment in referring to FIGS. 37 and 38 the adapted steerable carriage apparatus 638 includes a wheel frame portion 626 and a support element 628 for manually transporting a payload 84 across a surface 85, for the second rotating element 102 that includes a wheel frame portion 626 and a support element 628 for manually transporting a payload 84 across a surface 85 that includes the yoke assembly 510. The yoke assembly 510 further includes a pivotal axial axis 512, with the yoke assembly 510 being disposed adjacent to the wheel frame portion 626 and the support element 628, with the yoke 510 facilitating pivotal movement 513 about the pivotal axial axis 512 between the wheel frame portion 626 and the support element 628. Also included in the adapted steerable carriage apparatus 638 is the second rotating element 102 rotationally attached to the support element 628 and forming a second contact 108 on the surface 85, with the second rotating element 102 being operational to be steerable through the pivotal movement 513 as best shown in comparing FIG. 37.

In referring in particular to FIGS. 26, 27, and 28 for cross sections of the yoke assembly 510, the adapted steerable carriage apparatus 638 further includes a means 516 for urging the head frame portion 624 and the fork 622 into a non-turning mode, as best shown in FIG. 37. Preferably the means 516 for urging the head frame portion 624 and the fork 622 into a non-turning mode includes a torsional spring pack 520 that is in rotational engagement contact with the shuttle ring 522 that is disposed within the yoke assembly 510. Also preferably the shuttle ring 522 can further include an extension 527 that is selectively axially movable 538 along the yoke axial axis 51 2, as this is the distinction between FIGS. 26, 27, and 28 being the different axial positions of the shuttle ring 522 through movement 538. Wherein operationally the extension 527 selectively has the rotational engagement contact with the torsional spring pack 520 to place the yoke 510 in a biased state or urging state to urge through the pivotal movement 513 the head frame portion 624 and the fork 622 are moved into the non-turning mode, as best shown in FIG. 36 resulting in the biased or urged state 618, see FIG. 27 for the yoke 510 detail. The spring pack 520 is rotationally engaged to the outer tube 523 to create the relative pivotal movement 513 between the spring pack 520 and the shuttle ring 522, which utilizes a web 525 as discussed below to couple the rotational movement of the shuttle ring 522 to the inner tube 526. The extension 527 being selectively axially movable 538 to not have the rotational engagement contact with the torsional spring pack 520, as best shown in FIG. 28, thus creating the free pivotal movement state 620 to place the yoke 510 in a non-biased or non-urged state to not urge through the pivotal movement 513 the head frame portion 624 and the fork 622 into the non-turning mode. The yoke 510 also includes neck bearings 530 that facilitate the pivotal movement between the inner tube 526 and the outer tube 523 and outer bracket 528 combination that is axially clamped by retaining nuts set 532. Preferably the neck bearing 530 is a three inch diameter; however other sizes are acceptable as per the required function.

Continuing, in referring specifically to FIGS. 29 and 30, the shuttle ring 522 further includes a web 525 that is rotationally engaged against the pivotal movement 513 relative to a yoke inner tube 526. Wherein the web 525 is disposed within an elongated slot type aperture 529 in the inner tube 526 that is operational to allow selectable axial movement 538 of the shuttle ring 522 along the yoke 510 axial axis 512 while limiting the shuttle ring 522 rotational movement about axis 512 relative to the inner tube 526 to further allow the extension 527 to be selectively axially movable 538 along the yoke 510 axial axis 512. Thus the rotational movement of the shuttle ring 522 about axis 512 is limited the same as the inner tube 526 being rotationally engaged to the outer bracket 528 which is rotationally engaged to the head frame portion 624. Further as another option, the adapted steerable carriage apparatus 636 can have the selectably axially movable 538 shuttle ring 522 and extension 527 includes structure 590 to be remotely controlled by a user 250 as shown in FIGS. 35 and 36. Preferably the structure 590 is a cable 590 going through a bushing 602 on the yoke 510 as best shown in FIGS. 26, 27, and 28 with the cable 590 connecting to the shuttle ring 522 web 525 at the attachment 594 utilizing a swivel 592 that allows the shuttle ring to have some pivotal movement 513 relative to the cable 590 to effectuate user 250 controlled movement 538 of the shuttle ring 522 disposed within the yoke assembly 510. Other structure to effectuate the above mentioned control 590 would be acceptable as long as the disclosed functional requirements are achieved.

An additional option for the adapted steerable carriage apparatus 636 yoke assembly 510 is a selectable means 518 for substantially locking and unlocking the pivotal movement 513. The means 518 is preferably accomplished by including the shuttle ring 522 that selectively removably engages and disengages an outer tube 523 of the yoke 510 as best shown in FIGS. 26 and 27. Further, the shuttle ring 522 includes a frustroconical outside diameter 531 that selectively removably engages and disengages a mating frustroconical inside diameter 533 of the outer tube 523. Thus as best shown in FIG. 26 the frustroconical outside diameter 531 is selectively removably engaged to the frustroconical inside diameter 533 of the outer tube 523, effectively substantially restricting pivotal movement 513 and subsequently relative movement between the first frame portion 506 and the second frame portion 508. This creates the pivotally locked state 616 as shown in FIG. 26. The means 518 is further facilitated by the previously described shuttle ring 522 further including a web 525 that is rotationally engaged against the pivotal movement 513 relative to the yoke inner tube 526, wherein the web 525 is disposed within the elongated slot type aperture 529 in the inner tube 526 that is operational to allow selectable axial movement 538 of the shuttle ring 522 along the yoke 510 axial axis 512 while limiting the shuttle ring 522 rotational movement relative to the inner tube 526 to further allow the frustoconical outside diameter 531, which is rotationally engaged by ring 524 to the outer tube 523 to removably engage the mating frustoconical inside diameter 533, thus allowing free pivotal movement 513 as best shown in FIGS. 27 and 28. Other structure to accomplish the aforementioned means 518 would be acceptable if it meets the described functional requirements.

Further, an option is possible for the adapted steerable carriage apparatus 636 for the selectable means 518 for substantially locking the pivotal movement 513 includes an element 590 to be remotely controlled by the user 250 as shown in FIGS. 37 and 38, this structure to be remotely controlled preferably includes a cable 590 going through a bushing 602 on the yoke 510 as best shown in FIGS. 26, 27, and 28 with the cable 590 connecting to the shuttle ring 522 web 525 at the attachment 594 utilizing a swivel 592 that allows the shuttle ring to have some pivotal movement 513 relative to the cable 590 to effectuate user 250 controlled movement 538 of the shuttle ring 522 disposed within the yoke assembly 510 for the purpose of the selectable means 518 for substantially locking the pivotal movement 513. As can be deducted at this point the control 590 could be combined or separate for the user 250 in selectively controlling either of both the means 516 and/or means 518 as previously described. Thus in either control 590 case the yoke 510 uses a spring 534 that acts as a means for urging between a slip joint 536 and the shuttle ring 522 first into engagement with the torsional spring pack 520 for urging pivotal movement and then continuing onto substantially locking pivotal movement 513 be engaging the frustoconical outer diameter 531 and the frustoconical inner diameter 533, wherein the cable 590 opposing the spring 534 urging by axially holding a position along the axis 512 for the shuttle ring 522 to achieve the three operational states as previously described for FIGS. 26, 27, and 28. Other structure to accomplish the aforementioned yoke assembly 510 functions would be acceptable as long as the previously described yoke 510 functions were substantially complied with.

Another option for the adapted steerable carriage apparatus 638, also in referring to FIGS. 37 and 38 is to further comprise a linkage 630 assembly pivotally connected to the support element 628 to couple the pivotal movement 513 to an additional support element 628 that is pivotally connected to the head frame portion 626 as best shown in FIG. 37, wherein a pair of support elements 628 would engage in like pivotal movement 513. Note that the linkage 630 could be fully external to the head frame portion 626 or partially enclosed by the head frame portion 626 as shown in both FIGS. 37 and 38. In addition, note that the adapted carriage 638 is primarily designed to be a retrofit for an existing carriage already having the head frame portion 626 and the second rotating elements 102, wherein the yoke assembly 510 is added to the existing carriage 638 to further add control to the steering 513 function to the existing carriage by way of the selectively controllable means 516 and/or 518.

GENERAL DESCRIPTION OF STEERING EFFECTS

Note, that the following parameters of the structural aspects of the steerable carriage assembly 30, or the steerable apparatus 31, 32, 33, 34, 500, 504, 636, or 638, although for clarity only the basic carriage assembly 30 is described, wherein the following discussion would apply to all of the aforementioned steerable apparatus. The steerable carriage assembly 30 including the frame assembly 70, that are not considered for steering effects because they are seen as having a somewhat deminimis or less important influence on the steering dynamics of the steerable carriage assembly 30, especially as the manually operated steerable carriage assembly 30 operates at relatively lower speeds and loads as compared to a motorcycle, automobile, aircraft, and the like. Also, not considered are the second rotating element 102 or second wheel assembly 102 which includes a second wheel hub 104, second wheel spokes 106, and a second wheel tire 107 combination of stiffness and hysteresis (dampening), second wheel tire 107 skidding (loss of static second wheel tire 107 contact patch 108 friction with the surface 85, in other words assuming static (not dynamic) frictional contact between the second wheel tire 107 contact patch 108, and the surface 85), second wheel tire 107 imperfections (out of roundness, and the like), second wheel hub 104, second wheel spokes 106, and second wheel tire 107 combination imbalance. In addition to second wheel assembly 102 suspension travel and dampening, second wheel assembly 102 gyroscopic and inertia effects (including steering inertia 160), surface 85 undulations (gravel, grooves, ruts, potholes, etc.), nor aerodynamics are also not considered because they are seen as having a somewhat deminimis or less important influence on the steering dynamics of the steerable carriage assembly 30, especially as the manually operated steerable carriage assembly 30 operates at relatively lower speeds and loads as compared to a motorcycle, automobile, aircraft, and the like.

Also, the parameters of the first rotating element 86 or first wheel assembly 86, which includes a first wheel hub 88, first wheel spokes 90, and a first wheel tire 91 combination of stiffness and hysteresis (dampening), first wheel tire 91 skidding (loss of static first wheel tire 91 contact patch 92 friction with the surface 85, in other words assuming static (not dynamic) frictional contact between the first wheel tire 91 contact patch 92 and the surface 85). Also, first wheel tire 91 imperfections (out of roundness, and the like), first wheel hub 88, first wheel spokes 90, and first wheel tire 91 combination imbalance, in addition to first wheel assembly 86 suspension travel and dampening, first wheel assembly 86 gyroscopic and inertia (including steering) effects, surface 85 undulations (gravel, grooves, ruts, potholes, etc.), nor aerodynamics are not considered because they are seen as having a somewhat deminimis or less important influence on the steering dynamics of the steerable carriage assembly 30, especially as the manually operated steerable carriage assembly 30 operates at relatively lower speeds and loads as compared to a motorcycle, automobile, aircraft, and the like.

Parameters having an influence upon the steering dynamics of the steerable carriage apparatus 30 or as applicable to the steerable apparatus 31, 32, 33, or 34 are a composite center of gravity 151 position as defined by a composite center of gravity 151; X axis position 152, Y axis position 154, and Z axis position 156, (see FIG. 1) effective trail 120, 634, or 644, fixed steering dampening 162, variable steering dampening 164, acute rake angle 118 or 632 as rake angle 118 associated with the obtuse rake angle 119, camber angle 402, roll movement 170, pitch movement 174, and yaw movement 176, as having in combination an effect upon the steering dynamics of the steerable carriage assembly 30 or as applicable to the steerable apparatus 31, 32, 33, or 34 which predominately include castor wheel resonance 200 of the second rotating element 102, or the first rotating element 86 as applicable see FIGS. 2-7 and 20-38. However, with the parameters of effective trail distance 120, 644, 634 and rake angle 118 or 632 being associated with the obtuse rake angle 119 (angle 118 only) as having a predominately significant influence on the castor wheel resonance 200 of the second rotating element 102, or first rotating element 86 especially as the manually operated steerable carriage assembly 30 or as applicable to the steerable apparatus 31, 32, 33, or 34 operates at relatively lower speeds and loads as compared to a motorcycle, automobile, aircraft, and the like. Optimization of the trail distance 120, 644, or 634 with the aforementioned assumptions is a function of the position of the center of gravity 151 (being primarily the weight loading on the second wheel 102 rotational axis), the speed (to the second power or squared) of steerable carriage assembly 30 or as applicable to the steerable apparatus 31, 32, 33, or 34 across the surface 85, and the rake angle 119 or 632. Thus, the rake angle 119 or 632 and trail 120, 644, or 634 are associated through the arm 60, for fork 622 pivot 642 i.e. changing one changes the other, resulting in having to optimize the rake angle 119 or 632 and the trail 120, 644, or 634 simultaneously, wherein empirical (field) testing can be useful in determining the optimal rake angle 119 or 632 and trail 120, 644, or 634.

Dynamically, parameters of steering dampening being either fixed steering dampening 162 or variable steering dampening 164, wherein dampening in general is defined as the restriction of pivotal movement 130 about the steering pivotal axis 114 at the rake angle 118 which can help reduce the occurrence of castor wheel resonance 200 of the second rotating element 102. However, excessive fixed steering dampening 162 can interfere with the individual 250 or steerable carriage assembly 30 or as applicable to the steerable apparatus 31, 32, 33, or 34, user 250 ability to easily steer being defined as pivotal movement 130 about the steering pivotal axis 114 at the rake angle 118, resulting in the steering of the steerable carriage assembly 30 or 35 being difficult. Thus, variable steering dampening 164 can be an optional partial solution in attempting to reduce dampening 164 at low pivotal movement 130 pivoting rates being defined as slow steering at lower carriage 30 speeds across the surface 85 and then having higher dampening at higher pivotal movement 130 rates being defined as faster steering at higher carriage 30 speeds across the surface 85. Thus results in an attempted correlation to having reduced dampening 164 when the user 250 manually moves the carriage 30 or 35 across the surface 85 at a lower speed such as walking (about two (2) miles per hour), wherein the user 250 typically slowly steers resulting in easier steering and having a higher dampening 164 when the user 250 manually moves the carriage 30 across the surface 85 at a higher speed (about six (6) miles per hour or more) such as when jogging, wherein the user 250 typically engages in faster steering with the second rotating element 102 being more subject to castor wheel resonance 200 from the higher carriage 30 velocity across the surface 85 as previously described and thus more able to utilize the higher steering dampening 164 that acts to reduce the castor wheel resonance 200. Thus, the variable steering dampening 164 is operational by reacting to the pivotal movement 130 pivoting rate, meaning that at low pivotal movement 130 rates the dampening is reduced and at higher pivotal movement 130 pivoting rates the dampening is increased within a variable dampener 42.

A number of geometries change when the second rotatable element 102 or first rotating element 86 is turned from the straight ahead position, being defined as when turn angle 186 or 640 equals zero (straight ahead position) to being turned, being defined as turn angle 186 formed between axes 182 and 184 (see FIG. 6) does not equal zero, or angle 640 between axes 94 and 639 thus the action of turning about the steering pivotal axis 114 or 512 by varying the turn angle 186 or 640 results in numerous geometry positional differences of the second rotating element 102 or first rotating element 86 and frame assembly 70 (624), due to rake angle 118 (632) defined as the steering pivotal axis 114 (512) not being perpendicular to the surface 85, as compared to the prior art castor wheel assembly 300, (see FIGS. 11-14) wherein the rake angle is zero. In other words the prior art castor 300 steering pivotal axis 316 being perpendicular to the surface 85, as previously described in the grocery cart application.

For comparison, referring to FIGS. 11-14, starting with the basic case of a prior art castor wheel assembly 300, the rake angle is zero, or in other words the steering pivotal axis 316 is perpendicular to the surface 85. Firstly, with the typical castor assembly 300 being positioned in the straight ahead position, wherein turn angle 336 is equal to zero, i.e. axes 332 and 334 are the same, there is an effective trail distance 338, a camber angle 404 of zero, and a distance 340 of the frame assembly 302 from the surface 85 with all of the aforementioned parameters when the prior art castor wheel assembly 300 is in the straight ahead position, where the turn angle 336 is equal to zero with the castor wheel assembly 300 in movement 330 across the surface 85. Thus, the prior art castor wheel assembly 300 works quite well at slower speeds across the surface 85 (such as walking about 2-3 miles per hour) to automatically straighten the wheel 304 when turned, defined as the turn angle 336 not equaling zero, i.e. axis 332 and axis 334 form turn angle 336 (see FIG. 13) by acting through the trail 338 through the contact patch 307 from forces 173 and 175 that causes the wheel 304 and fork 305 to pivot about axis 316 in movement 318 to a position parallel to the movement of the frame 302 across the surface 85. However, the pivotal movement 318 about axis 316 can "overshoot" causing the movement 318 to go further than the wheel 304 rotational axis 306 being parallel to the movement of the frame 302 across the surface 85, which will cause an equal and opposite turning correction in movement 318, and if this continues, resonance 200 will result, being typical when forces 173 and 175 are increased from higher speeds of the castor wheel assembly 300 across the surface 85, being greater than walking speed making the castor wheel assembly 300 undesirable at higher surface speeds 85. Geometrically, when the castor wheel 304 is turned (see FIG. 13) during movement 171, due to the axis 316 being disposed perpendicular to the surface 85 nothing much changes, i.e. the trail 338 is unchanged, the distance 340 or movement 172 does not change, camber angle 404 does not change remaining at zero, thus resulting in axis 308, axis 314, and rotational plane 312 remaining co planar. Thus, pitch 174 and roll 170 movements are not really existent, and yaw 176 movement would only come into play during resonance 200.

Further, in referring to FIGS. 15-17, comparison to the prior art motorcycle steerable wheel assembly 360 brings a number of geometric changes during steering due to the pivotal axis 376 not being perpendicular to the surface 85, (as it is perpendicular to the surface 85 the case of the castor wheel assembly 300), being at a rake angle 377 which is formed between axis 376 and axis 375. As the motorcycle utilizes the front wheel 364 for forward turning or steering, the motorcycle rider controls steering through direct manual input at the motorcycle handlebars, wherein on the steerable carriage 30 the steering is trailing being effectuated by manual movement of the frame 70 at the hand grip 71 by the user 250 causing pivotal movement 130 through the wheel 102 contact patch 108 on the surface 85, being somewhat similar to the castor 300 steering effectuation. Note that the typical motorcycle forms an acute angle 379 adjacent to the contact patch 367, as opposed to the present invention wherein the steerable carriage apparatus 30 has an obtuse angle 119 adjacent to the contact patch 108, with the obtuse angle being formed from the pivotal axis 114 and the surface 85, with the exception being in FIGS. 35 and 36, being similar to a bicycle or motorcycle. When in the non turning mode the motorcycle steerable wheel assembly 360 forms a zero turn angle 386 between axes 382 and 384 that are the same in the non turning mode. The motorcycle steerable wheel assembly 360 typically has a fixed rake angle 377 of about 25 degrees, with the result of a trail 388 distance (being fixed only when turn angle 386 equals zero), being formed between the intersection of axis 376 and the surface 85 and the wheel 364 contact patch 367 on the surface 85, with the wheel 364 rotatably connected through axis 366 to a fork assembly 365 that in turn is pivotally connected through axis 376 to the motorcycle frame 362 as best shown in FIG. 15. When the wheel 364 and fork 365 is turned about axis 376, defined the turn angle 386 not equaling zero, (noting that turn angle 386 is not that large being about 5 degrees when the motorcycle is at normal street or highway speeds) wherein the turn angle 386 is formed between axes 382 and 384 (see FIG. 16), the wheel 364 essentially rolls turning out of the vertical forming an angle to the surface 85 from an axis 368 perpendicular to the surface 85 and intersecting the contact patch 367 that is termed camber. This results in a camber angle 405 being formed between axes 368 and 374, as best shown in FIG. 17, being essentially a wheel rotational plane 372 having vertical angularity with the surface 85. In addition, when the turn angle 386 is not zero the trail 388 reduces as the contact patch 367 moves forward toward the intersection of axis 376 to the surface 85, however also when the wheel 364 is in the turn mode, distance 390 reduces from the non turn mode, effectuating movement 172, i.e. the frame 362 drops to the surface 85 pivoting about the rear wheel axis (not shown), actually resulting in pitch 174 movement, thus moving the intersection of axis 376 and the surface 85 toward the contact patch 376, resulting in trail 388 reducing at each end.

As the motorcycle wheel 364 has movement 380 along the surface 85 also as in the case of the castor wheel 304, wheel 364 resonance 200 can be a concern which is caused by the same trail 388 that helps in creating non turning mode stability at lower speeds can create resonance 200 in the range of about 6-8 hertz around speeds of 30-50 miles per hour. This resonance 200 is controlled by adjusting the rake angle 377 and trail 388, also wheel loading, structural stiffness, dampening, and the like. The steering geometries of the motorcycle wheel 364 due to the pivotal axis being at rake angle 377 have some positive and negative features. The good features are that the trail 388 reduces during the turn mode, (i.e. moving away from the turn angle 386 equaling zero), which lessens the moment arm from forces 173 and 175 in returning the wheel 364 to the non turning mode, helping to reduce the severity of resonance 200 in the yaw 176 movement, which can be important due to the much higher speeds (equating to higher forces 173 and 175) that a motorcycle operates at compared to a manually pushed carriage 30. However, a negative effect is from the reduction in distance 390 i.e. movement along axis 172, from the turn mode (in going from a turn angle 386 of zero to non zero), wherein the weight of the motorcycle causes the wheel 364 to move or fall "into" the turn mode which can give the rider a feeling that the steering is not neutral, but has a mind of its own, sometimes termed "oversteer", wherein the motorcycle wheel 364 turns more than the rider desires. Another negative effect that is essentially contrary to the "falling into the turn" effect as previously described, is from the camber angle 405 (as best seen in FIGS. 16 and 17) that causes the motorcycle to "stand up" out of the turn, in other words, the motorcycle wants to return from the turn mode to the non turn mode due to the camber moment 408 resulting from forces 173 and 175 further causing the frame 362 to have roll 170 movement toward the vertical in relation to the surface 85 and have pitch 174 movement upward of the frame.

In comparison, the present invention of the steerable carriage apparatus 30 and the component steerable apparatus 31, 32, 33, and 34 to the prior art of the castor 300 and the motorcycle front wheel 360 is given to identify the unique feature of the present invention. As has been previously described for the carriage to move across the surface 85 at a speed higher than walking the castor 300 having a pivotal axis that is perpendicular to the surface 85 would be unacceptable due to the quick onset of resonance 200 at just above walking speed across the surface 85, this is evidenced by the jogging stroller prior art not utilizing castors 300 for turning, as previously described. In comparing to motorcycle wheel 360 geometry the carriage 30 and the component steerable apparatus 31, 32, 33, and 34 operate at considerable lower speeds being around 2-15 miles per hour as compared to motorcycles being around 35-75 miles per hour or more, thus different aspects of controlling resonance 200 are required. As the present invention has the second rotating element 102 that is rotatably attached through the second rotating element rotational axis 103 to the fork assembly 60 that is pivotally attached about the steering pivotal axis 114 at rake angle 118 (formed between axes 116 and 114) to the frame assembly 70, wherein the rake angle 118 is not perpendicular to the surface 85, see FIGS. 2-5. As the forces 173 and 175 are lower and the turn angle 186 is higher for the present invention as compared to motorcycles, coupled with the desirability of rear wheel steering for easy maneuverability of a manually pushed carriage 30, a different design steering geometry was desired, which is basically due to the fact that the typical motorcycle forms an acute angle 379 adjacent to the contact patch 367, as opposed to the present invention wherein the steerable carriage apparatus 30 has an obtuse angle 119 (that is associated with rake angle 118) adjacent to the contact patch 108, with the obtuse angle being formed from the pivotal axis 114 and the surface 85.

This results in some differences between motorcycle steering geometries and the present invention steering geometries. When the present invention moves from a turn angle 186 of zero to a turn angle 186 of up to about 45 degrees, the trail 120 lengthens as the contact patch 108 moves away from the pivotal axis 114 and distance 188 increases or movement 172, (causing pitch 174 movement about the first wheel 86 rotational axis 87) both of which lead to increased reaction from forces 173 and 175 and the weight of the carriage to return the second wheel 102 to a turn angle 186 of zero, however, with decreasing force to return the second wheel 102 to a turn angle 186 of zero as the trail 120 decreases as the second wheel 102 approaches a turn angle 186 of zero, which helps to prevent resonance 200, i.e. overshoot of the second wheel 102 returning to a turn angle 186 of zero. Thus, in optimizing the smooth and stable steering of the carriage 30 or steerable apparatus 31, 32, 33, and 33 the geometries of the rake angle 119 and trial 120 (as previously disclosed preferred values) are adjusted as well as the composite center of gravity 151 (see FIG. 1); X axis position 152, Y axis position 154, and Z axis position 156 that has an affect the distance 188 or movement 172, causing pitch 174 movement force being essentially the weight split between the first rotational axis 87 and the second rotational axis 103, i.e. wherein the more weight on the second rotational axis results in more force to return to a turn angle 186 of zero. Preferably X axis position (distance) 152 is about sixteen (16) inches, y axis position (distance) 154 is about twenty three (23) inches, and Z axis position (distance) 156 is about twelve (12) inches, resulting in a weight spilt between the first rotating element 86 rotational axis 87 and second rotating element 102 rotational axis 103 of about 50/50. This is as opposed to the previously identified prior art jogging stroller that must of necessity have a heavy weight bias toward the rear wheels (for turning) that compromises handling stability as is known in the art. With other distances for the X axis position 152, Y axis position 154, and Z axis position 156 and resulting weight split between the first rotating element 86 rotational axis 87 and second rotating element 102 rotational axis 103 being acceptable as determined by carriage 30 speed, weight, steering geometries, and the like. Another factor is in adjusting moment arms 132 and 133 (see FIG. 10) for turning ease and stability. Preferably moment arm 132 is about forty six (46) inches and moment arm 133 is about eighteen (18) inches with other distances for moment arms 132 and 133 acceptable as determined by carriage 30 speed, weight, steering geometries, and the like.

Referring to FIG. 7, as with the motorcycle, a camber angle 402 is formed between axes 109 and 112, essentially being the second wheel 102 rotational plane 110 forming an angular vertical orientation to the surface 85 when the turn angle 386 is non zero. This creates a camber moment 406 that results from forces 173 and 175 translating to yaw 176 movements that affect the second rotating element 102, the fork assembly 60, and the frame assembly 70. The camber angle 402 overturning moment 406 occurs when the second rotating element 102 is not in the straight forward steering position, i.e. when the second rotating element 102 is turned and turn angle 186 does not equal zero which takes the camber angle 402 from zero when the turn angle 186 is zero, in other words when the second rotating wheel 102 is turned from the straight ahead position, the second rotating wheel 102 angles in a perpendicular or vertical relation to the surface 85 or could be stated that the second wheel 102 leans into the turn. The camber moment 406 could cause roll 170, pitch 174, yaw 176 movements of the frame 70 and the second wheel 102 to turn more i.e. a higher turn angle 186, however, due to forces 173 and 175 being low due to the lower speeds of the carriage 30 the effect is minimal. As a comparison, the first wheel 86 has no camber angle 400, thus axis 93, 96, and 96 all bisect rotational plane 94. Thus, in summary the three primary differences between the present invention and the motorcycle (wherein both have an angled steering pivotal axis to the surface) are that when turning the present invention has a trail 120 increase, (motorcycle has a trail 388 decrease), the present invention frame 70 rises in height (motorcycle has a frame 362 height decrease), even though both the present invention and the motorcycle have similar camber angle 406 and 405 leaning orientations, the camber moments are reversed, such that the present invention camber moment 406 drives the second wheel 102 into a higher turn 186 angle and the motorcycle camber moment 364 drives the wheel 364 into a lower turn angle 386. An exception exists for the embodiment disclosed in FIGS. 35 and 36 for the steerable carriage 636 wherein the goal is to potentially allow for three operational states of steering being 616, 618, and 620 as previously described with the steering forces as described for prior art bicycles and motorcycles. In addition, for the embodiments in FIGS. 20-25 and 37-38, being the steerable carriage apparatus 500, 504, and 638, the rake angle is substantially perpendicular to the surface 85 similar to the previously described conventional castor, again wherein the goal is to potentially allow for three operational states of steering being 616, 618, and 620 as previously described with the steering forces as described for prior art castors, where the rotational plane 514 remains substantially perpendicular to the surface 85 during turning, i.e. during pivotal movement 513.

METHOD OF USE

In use, the steerable carriage apparatus 30 is grasped at the frame hand grip portion 71 by the user's 250 hand 215 as best shown in FIG. 10, wherein the user 250 pushes the steerable carriage apparatus 30 across the surface 85 in movement 180, initiating first rotating element 86 rotational movement 89 and second rotating element 102 rotational movement 105 at any speed from a slow walk (1-2 miles per hour) to a fast jog (up to 20 miles per hour). Steering is accomplished by the user 250 laterally moving 252 the hand grip portion 71 of the frame assembly 70 that initially causes a moment at the first rotating element 86 rotational axis 87 at the contact patch 92 by way of moment arm 131, at axis 129 which in turn causes a reactionary moment 132 at the second rotating element 102 rotational axis 103 at the contact patch 108 resulting in pivotal movement 130 about the pivotal attachment 121 axis 114 leading to the second rotating element 102 being in the turn mode, defined as the turn angle 186 not equaling zero. The user 250 in turning the steerable carriage apparatus 30 operates through a net moment arm 133 in effectuating a turn of the steerable carriage apparatus 30 initially. This results in the user 250 having somewhat quicker, more responsive, and easier steering of the steerable carriage apparatus 30 by having the rear wheels 102 turn as opposed to the front wheels 86 turning by pushing the frame second end portion 74 by way of the hand grip portion 71 through the turn, also the effective moment arm 133, at axis 129 can be lengthened, by lengthening the hand grip portion 71 to further increase the turning power of the user 250. This is as opposed to a front wheel only steerable carriage wherein all turning must occur through the fixed (non turning only, however rotatable) rear wheels as a pivot point, thus the effective moment arm (in using FIG. 10 as an example) is the net difference of moment arms 132 or 133, resulting in less turning force at the front turning wheel than the user 250 puts into the handle, or if moment arms 132 and 133 are equal then the front wheel turning force equals the force that the user 250 puts into the handle. However, on a carriage apparatus 30 having rear wheel 102 steering and having the front wheels 86 fixed (non turning only, however rotatable) once the turn is initiated by the user 250 and the rear wheels 102 turn as previously described the effective turning moment arm is 131 which is greater resulting in less turning force required by the user 250 at the hand grip portion of the frame 71. This can be easily empirically verified by negotiating a turn with a typical grocery cart by the user 250 pushing the grocery cart on the fixed wheel side (as is typical, more difficult turning) versus pushing the grocery cart on the turnable wheel side (easier turning).

Note that the payload 84 is not shown in the steerable carriage apparatus 30 for clarity nor is it required pertaining to the novelty of the present invention, however, the payload can be a child including the child seat and securing apparatus in the case of the carriage 30 being a stroller, or replacing the child with an adult, wherein the carriage 30 would be a wheel chair, also the carriage 30 could be a utility cart carrying tools, food, audio visual equipment, and the like, basically the carriage 30 can be anything that is manually pushed by a user 250 across a surface 85. In the embodiments in use shown in FIGS. 31-34, 35, and 37 for the steerable carriage apparatus 500, 504, 636, and 638 control of the carriage is by the user 250 grasping the handlebar 595 and optionally compressing the "dead man brake" 596 to allow movement 502 across the surface 85. Also optionally the handlebar 595 mounted control 600 or 590 can selectively effectuate operational states 616, 618, or 620 by the user 250. Wherein typically state 616 would be for fast jogging use, state 618 would be for slower jogging or walking use, and state 620 would be for walking use for all of the steerable carriage apparatus 500, 504, 636, or 638. As state 616 would be desirable to lock out the steering capabilities for the carriage moving 502 across the surface at a higher speed for lateral stability, and the state 618 for biasing or urging the carriage in a non turning mode would be desired at lower speeds of movement 502 across the surface 85 to help reduce the castor resonance effects as previously described and allow some degree of steering movement, and state 620 for low movement 502 speed across the surface 85 wherein castor resonance is minimal as previously described and ease of maneuverability or steering is desired by the user 250. The reason for not showing the payload 84 is as previously described.

CONCLUSION

Accordingly, the present invention of a steerable carriage apparatus 30, 500, 504, 636, and 638 has been described with some degree of particularity directed to the embodiments of the present invention. It should be appreciated, though, that the present invention is defined by the following claims construed in light of the prior art so modifications the changes may be made to the exemplary embodiments of the present invention without departing from the inventive concepts contained therein.

The invention claimed is:

1. An articulated steerable carriage apparatus for manually transporting a payload across a surface, comprising:
    (a) a first frame portion;
    (b) a second frame portion;
    (c) a yoke assembly including a pivotal axial axis, said yoke assembly disposed adjacent to said first frame portion and said second frame portion, said yoke facilitating pivotal movement about said pivotal axial axis between said first frame portion and said second frame portion, said yoke further including a means for urging said first frame portion and said second frame portion into a non-turning mode, wherein said means for urging into non turning mode is operational when said articulated steerable carriage apparatus is static in relation to the surface;
    (d) a first rotating element rotationally attached to said first frame portion and forming a first contact on the surface; and
    (e) a second rotating element rotationally attached to said second frame portion forming a second contact on the surface, said second rotating element and said second frame portion are operational to be steerable through said pivotal movement.

2. An articulated steerable carriage apparatus according to claim 1 further including a handlebar that is adjacent to said second frame portion, wherein said handlebar is operational to steer said second rotating element.

3. An articulated steerable carriage apparatus according to claim 2 further including a means for an automatic conditional substantial rotational restriction of a second rotating element rotational movement.

4. An articulated steerable carriage apparatus according to claim 3 wherein said means for an automatic conditional substantial rotational restriction is a control adjacent to said handlebar that must have a grasp by a user for free rotation of said second rotating element, wherein if said user releases said grasp then said second rotational element has said substantial rotational restriction.

5. An articulated steerable carriage apparatus according to claim 2 wherein said means for urging said first frame portion and said second frame portion into a non-turning mode includes a torsional spring pack that is in rotational engagement contact with a shuttle ring disposed within said yoke assembly.

6. An articulated steerable carriage apparatus according to claim 5 wherein said shuttle ring further includes an extension that is selectively axially movable along said yoke axial axis, wherein operationally said extension selectively has said rotational engagement contact with said torsional spring pack to place said yoke in a biased state to urge through said pivotal movement said first frame portion and said second frame portion into said non-turning mode, and said extension being selectively axially movable to not have said rotational engagement contact with said torsional spring pack to place said yoke in a non-biased state to not urge through said pivotal movement said first frame portion and said second frame portion into said non-turning mode.

7. An articulated steerable carriage apparatus according to claim 6 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said extension to be selectively axially movable along said yoke axial axis.

8. An articulated steerable carriage apparatus according to claim 6 wherein said selectably axially movable shuttle ring extension includes structure to be remotely controlled from said handlebar by a user.

9. An articulated steerable carriage apparatus according to claim 2 further including a selectable means for substantially locking and unlocking said pivotal movement.

10. An articulated steerable carriage apparatus according to claim 9 wherein said selectable means for substantially locking said pivotal movement includes a shuttle ring that selectively removably engages an outer tube of said yoke.

11. An articulated steerable carriage apparatus according to claim 10 wherein said shuttle ring includes a frustroconical outside diameter that selectively removably engages a mating frustroconical inside diameter of said outer tube.

12. An articulated steerable carriage apparatus according to claim 11 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said frustroconical outside diameter to removably engage said mating frustroconical inside diameter.

13. An articulated steerable carriage apparatus according to claim 9 wherein said selectable means for substantially locking said pivotal movement includes an element to be remotely controlled from said handlebar by a user.

14. An articulated steerable carriage apparatus according to claim 1 further including a plurality of first rotating elements.

15. An articulated steerable carriage apparatus according to claim 1 further including a plurality of second rotating elements.

16. An articulated steerable carriage apparatus for manually transporting a payload across a surface, comprising:
    (a) a first frame portion;
    (b) a second frame portion;
    (c) a yoke assembly including a pivotal axial axis, said yoke assembly disposed adjacent to said first frame portion and said second frame portion, said yoke facilitating pivotal movement about said pivotal axial axis between said first frame portion and said second frame portion said yoke further including a means for urging said first frame portion and said second frame portion into a non-turning mode, wherein said means for urging into non turning mode is operational when said articulated steerable carriage apparatus is static in relation to the surface;

(d) a first rotating element rotationally attached to said first frame portion and forming a first contact on the surface; and (e) a second rotating element rotationally attached to said second frame portion forming a second contact on the surface, said first rotating element and said first frame portion are operational to be steerable through said pivotal movement.

17. An articulated steerable carriage apparatus according to claim 16 further including a handlebar that is adjacent to said first frame portion, wherein said handlebar is operational to steer said first rotating element.

18. An articulated steerable carriage apparatus according to claim 17 further including a means for an automatic conditional substantial rotational restriction of a second rotating element rotational movement.

19. An articulated steerable carriage apparatus according to claim 18 wherein said means for an automatic conditional substantial rotational restriction is a control adjacent to said handlebar that must have a grasp by a user for free rotation of said second rotating element, wherein if said user releases said grasp then said second rotational element has said substantial rotational restriction.

20. An articulated steerable carriage apparatus according to claim 17 wherein said means for urging said first frame portion and said second frame portion into a non-turning mode includes a torsional spring pack that is in rotational engagement contact with a shuttle ring disposed within said yoke assembly.

21. An articulated steerable carriage apparatus according to claim 20 wherein said shuttle ring further includes an extension that is selectively axially movable along said yoke axial axis, wherein operationally said extension selectively has said rotational engagement contact with said torsional spring pack to place said yoke in a biased state to urge through said pivotal movement said first frame portion and said second frame portion into said non-turning mode, and said extension being selectively axially movable to not have said rotational engagement contact with said torsional spring pack to place said yoke in a non-biased state to not urge through said pivotal movement said first frame portion and said second frame portion into said non-turning mode.

22. An articulated steerable carriage apparatus according to claim 21 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said extension to be selectively axially movable along said yoke axial axis.

23. An articulated steerable carriage apparatus according to claim 21 wherein said selectably axially movable shuttle ring extension includes structure to be remotely controlled from said handlebar by a user.

24. An articulated steerable carriage apparatus according to claim 17 further including a selectable means for substantially locking and unlocking said pivotal movement.

25. An articulated steerable carriage apparatus according to claim 24 wherein said selectable means for substantially locking said pivotal movement includes a shuttle ring that selectively removably engages an outer tube of said yoke.

26. An articulated steerable carriage apparatus according to claim 25 wherein said shuttle ring includes a frustroconical outside diameter that selectively removably engages a mating frustroconical inside diameter of said outer tube.

27. An articulated steerable carriage apparatus according to claim 26 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said frustroconical outside diameter to removably engage said mating frustroconical inside diameter.

28. An articulated steerable carriage apparatus according to claim 24 wherein said selectable means for substantially locking said pivotal movement includes an element to be remotely controlled from said handlebar by a user.

29. An articulated steerable carriage apparatus according to claim 16 further including a plurality of first rotating elements.

30. An articulated steerable carriage apparatus according to claim 16 further including a plurality of second rotating elements.

31. An adapted steerable carriage apparatus including a head frame portion and a fork for manually transporting a payload across a surface, comprising:

(a) a yoke assembly including a pivotal axial axis, said yoke assembly disposed adjacent to said head frame portion and said fork, said yoke facilitating pivotal movement about said pivotal axial axis between said head frame portion and said fork; and (b) a torsional spring pack that is in selectable rotational engagement contact with a shuttle ring that is disposed within said yoke assembly, said torsional spring pack and said shuttle ring are operational to urge said head frame portion and said fork through said pivotal movement into a non turning mode.

32. An adapted steerable carriage apparatus according to claim 31 wherein said shuttle ring further includes an extension that is selectively axially movable along said yoke axial axis, wherein operationally said extension selectively has said rotational engagement contact with said torsional spring pack to place said yoke in a biased state to urge through said pivotal movement said third frame portion and said fork into said non-turning mode, and said extension being selectively axially movable to not have said rotational engagement contact with said torsional spring pack to place said yoke in a non-biased state to not urge through said pivotal movement said head frame portion and said fork into said non-turning mode.

33. An adapted steerable carriage apparatus according to claim 32 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said extension to be selectively axially movable along said yoke axial axis.

34. An adapted steerable carriage apparatus according to claim 32 wherein said selectably axially movable shuttle ring extension includes structure to be remotely controlled by a user.

35. An adapted steerable carriage apparatus according to claim 31 further including a selectable means for substantially locking and unlocking said pivotal movement.

36. An adapted steerable carriage apparatus according to claim 35 wherein said selectable means for substantially locking said pivotal movement includes said shuttle ring having structure that selectively removably engages an outer tube of said yoke.

37. An adapted steerable carriage apparatus according to claim 36 wherein said shuttle ring structure includes a frustroconical outside diameter that selectively removably engages a mating frustroconical inside diameter of said outer tube.

38. An adapted steerable carriage apparatus according to claim 36 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said frustroconical outside diameter to removably engage said mating frustroconical inside diameter.

39. An adapted steerable carriage apparatus according to claim 35 wherein said selectable means for substantially locking said pivotal movement includes an element to be remotely controlled by a user.

40. An adapted steerable carriage apparatus according to claim 31 further comprising a selectively lockable pivot disposed between said yoke assembly and said head frame portion, wherein said selectively lockable pivot is operational to allow a rake angle to be selectively adjustable, with said rake angle formed between said yoke pivotal axial axis and an axis that is substantially perpendicular to the surface.

41. An adapted steerable carriage apparatus including a wheel frame portion and a support element for manually transporting a payload across a surface, comprising:
  (a) a yoke assembly including a pivotal axial axis, said yoke assembly disposed adjacent to said wheel frame portion and said support element, said yoke facilitating pivotal movement about said pivotal axial axis between said wheel frame portion and said support element; and
  (b) a torsional spring pack that is in selectable rotational engagement contact with a shuttle ring that is disposed within said yoke assembly, said torsional spring pack and said shuttle ring are operational to urge said wheel frame portion and said support element through said pivotal movement into a non turning mode.

42. An adapted steerable carriage apparatus according to claim 41 wherein said shuttle ring further includes an extension that is selectively axially movable along said yoke axial axis, wherein operationally said extension selectively has said rotational engagement contact with said torsional spring pack to place said yoke in a biased state to urge through said pivotal movement said wheel frame portion and said support element into said non-turning mode, and said extension being selectively axially movable to not have said rotational engagement contact with said torsional spring pack to place said yoke in a non-biased state to not urge through said pivotal movement said wheel frame portion and said support element into said non-turning mode.

43. An adapted steerable carriage apparatus according to claim 42 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said extension to be selectively axially movable along said yoke axial axis.

44. An adapted steerable carriage apparatus according to claim 42 wherein said selectably axially movable shuttle ring extension includes structure to be remotely controlled by a user.

45. An adapted steerable carriage apparatus according to claim 41 further including a selectable means for substantially locking and unlocking said pivotal movement.

46. An adapted steerable carriage apparatus according to claim 45 wherein said selectable means for substantially locking said pivotal movement includes said shuttle ring having structure that selectively removably engages an outer tube of said yoke.

47. An adapted steerable carriage apparatus according to claim 46 wherein said shuttle ring structure includes a frustroconical outside diameter that selectively removably engages a mating frustroconical inside diameter of said outer tube.

48. An adapted steerable carriage apparatus according to claim 47 wherein said shuttle ring further includes a web that is rotationally engaged against said pivotal movement relative to a yoke inner tube, wherein said web is disposed within an aperture in said inner tube that is operational to allow selectable axial movement of said shuttle ring along said yoke axial axis while limiting said shuttle ring rotational movement relative to said inner tube to further allow said frustroconical outside diameter to removably engage said mating frustroconical inside diameter.

49. An adapted steerable carriage apparatus according to claim 45 wherein said selectable means for substantially locking said pivotal movement includes an element to be remotely controlled by a user.

50. An adapted steerable carriage apparatus according to claim 41 further comprising a linkage assembly pivotally connected to said support element to couple said pivotal movement to an additional support element that is pivotally connected to said wheel frame portion.

* * * * *